US012496827B2

(12) United States Patent
Tajima

(10) Patent No.: US 12,496,827 B2
(45) Date of Patent: Dec. 16, 2025

(54) LIQUID EJECTING APPARATUS

(71) Applicant: SEIKO EPSON CORPORATION, Tokyo (JP)

(72) Inventor: Kazuya Tajima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 18/309,901

(22) Filed: May 1, 2023

(65) Prior Publication Data

US 2023/0347650 A1 Nov. 2, 2023

(30) Foreign Application Priority Data

May 2, 2022 (JP) ................................ 2022-075789

(51) Int. Cl.
*B41J 2/14* (2006.01)

(52) U.S. Cl.
CPC .... *B41J 2/1433* (2013.01); *B41J 2002/14491* (2013.01); *B41J 2202/05* (2013.01)

(58) Field of Classification Search
CPC ............ B41J 2/1433; B41J 2002/14491; B41J 2202/05; B41J 2/14072; B41J 2002/14362; B41J 2/14201; B41J 2/14024; B41J 2/01; B41J 2/145
See application file for complete search history.

(56) References Cited

U.S. PATENT DOCUMENTS

2020/0062000 A1 2/2020 Tojo
2020/0207110 A1* 7/2020 Nakamura ............... B41J 2/175

FOREIGN PATENT DOCUMENTS

JP 2020-032533 A 3/2020

* cited by examiner

*Primary Examiner* — Lisa Solomon
(74) *Attorney, Agent, or Firm* — WORKMAN NYDEGGER

(57) ABSTRACT

A liquid ejecting apparatus includes: a liquid ejecting head configured to eject a liquid; and a flow channel member including a flow channel coupling member detachably coupled to the liquid ejecting head, a supply channel coupled to a flow channel inside the flow channel coupling member, and a displacement member configured to be displaced between a closing position at which the displacement member closes the supply channel and an opening position at which the displacement member opens the supply channel. The displacement member restricts disconnection of coupling between the liquid ejecting head and the flow channel coupling member when the displacement member is located at the opening position. The displacement member does not restrict disconnection of coupling between the liquid ejecting head and the flow channel coupling member when the displacement member is located at the closing position.

14 Claims, 34 Drawing Sheets

LIQUID EJECTING APPARATUS

The present application is based on, and claims priority from JP Application Serial Number 2022-075789, filed May 2, 2022, the disclosure of which is hereby incorporated by reference herein in its entirety.

BACKGROUND

1. Technical Field

The present disclosure relates to a liquid ejecting apparatus including a liquid ejecting head to eject a liquid, or more specifically, to an ink jet recording apparatus including an ink jet recording head that ejects an ink as the liquid.

2. Related Art

A liquid ejecting apparatus includes a liquid ejecting head that ejects a liquid, and a liquid storage unit that stores the liquid to be supplied to the liquid ejecting head. The liquid from the liquid storage unit is supplied to the liquid ejecting head through a supply channel provided to a supply pipe such as a flexible tube. For example, JP-A-2020-32533 discloses a structure in which a valve capable of closing and opening the supply channel is provided in the middle of the supply pipe.

When the supply pipe in the liquid ejecting apparatus according to JP-A-2020-32533 is detached to replace the liquid ejecting head, the liquid in the supply pipe detached from the liquid ejecting head is kept from leaking by closing the supply channel with the valve.

However, the simple valve disclosed in JP-A-2020-32533 may pose a problem in which an operator inadvertently opens/closes the valve when replacing the liquid ejecting head.

SUMMARY

A liquid ejecting apparatus according to an aspect of the present disclosure to solve the above problem includes: a liquid ejecting head that ejects a liquid; and a flow channel member including a flow channel coupling member detachably coupled to the liquid ejecting head, a supply channel coupled to a flow channel inside the flow channel coupling member, and a displacement member configured to be displaced between a closing position at which the displacement member closes the supply channel and an opening position at which the displacement member opens the supply channel. The displacement member restricts disconnection of coupling between the liquid ejecting head and the flow channel coupling member when the displacement member is located at the opening position. The displacement member does not restrict disconnection of coupling between the liquid ejecting head and the flow channel coupling member when the displacement member is located at the closing position.

DESCRIPTION OF EXEMPLARY EMBODIMENTS

Figure 1:
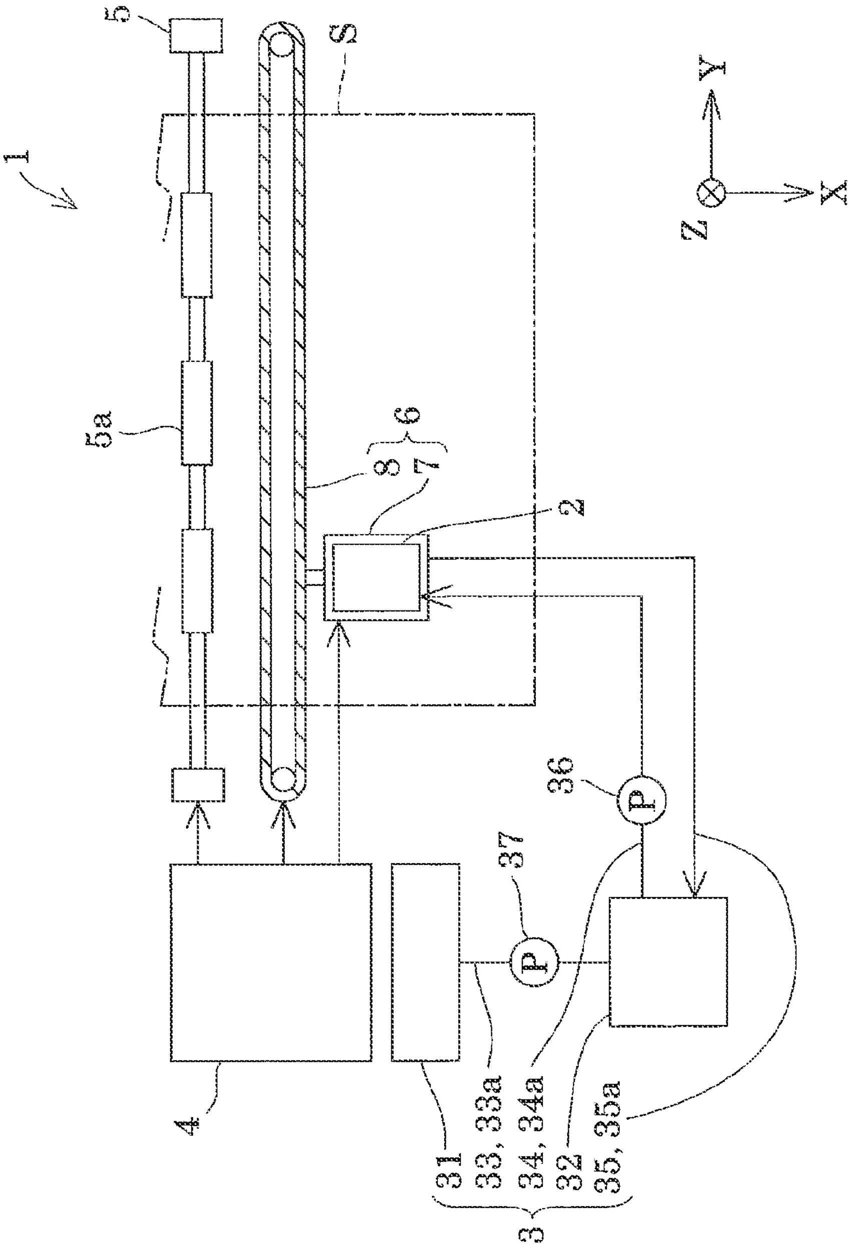
FIG. 1 is a diagram illustrating a schematic configuration of a recording apparatus according to Embodiment 1.

The present disclosure will be described below in detail based on embodiments. It is to be noted, however, that the following description merely represents certain aspects of the present disclosure, which can be modified as desired within the scope of the present disclosure. Constituents denoted by the same reference signs in the drawings represent the same constituents, and overlapping explanations thereof are omitted as appropriate. In the drawings, X, Y, and Z represent three spatial axes that are orthogonal to one another. In the present specification, directions along these axes are defined as the X direction, the Y direction, and the Z direction, respectively. A direction indicated by an arrow in each drawing is a positive (+) direction, and a direction opposite to such an arrow is a negative (−) direction. The three directions of the spatial axes without being limited to the positive direction or the negative direction will be denoted as the X-axis direction, the Y-axis direction, and the Z-axis direction, respectively.

Embodiment 1

FIG. 1 is a diagram illustrating a schematic configuration of an ink jet recording apparatus 1 according to Embodiment 1.

As illustrated in FIG. 1, the ink jet recording apparatus 1 is a printing apparatus representing an example of a liquid ejecting apparatus, which is configured to cause an ink, being a type of a liquid, to be ejected in the form of ink droplets so as to land on a medium S such as print paper, thereby printing an image and the like by forming dot arrays on the medium S. Besides the print paper, desired materials such as resin film and cloth can be used as the medium S.

In the following description, of the three spatial axes of the X-axis, the Y-axis, and the Z-axis, a direction of movement (in other words, a main scanning direction) of an ink jet recording head 2 to be described later will be defined as the Y-axis direction while a direction of transportation of the medium S orthogonal to the main scanning direction will be defined as the X-axis direction. A plane parallel to a nozzle surface 21*a* of the ink jet recording head 2 provided with nozzles 21 (see FIG. 3) will be defined as the XY plane while a direction intersecting the nozzle surface 21*a*, which is a direction orthogonal to the XY plane in the present embodiment, will be defined as the Z-axis direction. The ink droplets are assumed to be ejected in the +Z direction.

As illustrated in FIG. 1, the ink jet recording apparatus 1 includes the ink jet recording head (hereinafter also simply referred to as the recording head) 2, liquid supply units 3 that supply the inks to the recording head 2, a control unit 4 serving as a control module, a transportation mechanism 5 that sends out the media S, and a movement mechanism 6.

The recording head 2 ejects the inks supplied from the liquid supply units 3 onto the medium in the form of ink droplets. Details of the recording head 2 will be described later.

The liquid supply units 3 store the respective multiple types (such as multiple colors) of inks to be ejected from the recording head 2. Although FIG. 1 illustrates only one liquid supply unit 3, multiple liquid supply units 3 are actually provided so as to correspond to the multiple types of inks.

Each liquid supply unit 3 mentioned above includes a first liquid storage unit 31, a second liquid storage unit 32, a replenishment pipe 33 provided with a replenishment channel 33*a* for coupling the first liquid storage unit 31 to the second liquid storage unit 32, a supply pipe 34 provided with a first supply channel 34*a* to supply the liquid from the second liquid storage unit 32 to the recording head 2, and a recovery pipe 35 provided with a recovery channel 35*a* to recover the ink from the recording head 2 to the second liquid storage unit 32.

The first liquid storage unit 31 is a so-called main tank that stores the ink being the liquid. The second liquid storage unit 32 is a so-called sub-tank that temporarily stores the ink being the liquid. The ink in the second liquid storage unit 32 is supplied to the recording head 2 through the first supply channel 34*a* provided to the supply pipe 34 by using a first pump 36. Here, the first supply channel 34*a* constitutes part of a supply channel 100 that supplies the ink to the recording head 2. Meanwhile, the ink which is not ejected from the recording head 2 is recovered to the second liquid storage unit 32 through the recovery channel 35*a* provided to the recovery pipe 35. In other words, the ink is circulated between the second liquid storage unit 32 and the recording head 2. Here, the first pump 36 is an example of a pumping mechanism that pumps the ink from the second liquid storage unit 32 to the recording head 2. Examples of the above-mentioned first pump 36 include a tube pump, a diaphragm pump, and the like. In the present embodiment, the first pump 36 is provided in the middle of the first supply channel 34*a*. However, the first pump 36 may be provided to the second liquid storage unit 32 instead.

When the ink is consumed as a result of the recording head 2 ejecting ink droplets, ink for replenishment is pumped from the first liquid storage unit 31 to the second liquid storage unit 32 through the replenishment channel 33*a* provided to the replenishment pipe 33 by using a second pump 37. The second pump 37 is an example of a pumping mechanism that pumps the ink from the first liquid storage unit 31 to the second liquid storage unit 32. Examples of the above-mentioned second pump 37 include a tube pump, a diaphragm pump, and the like. In the present embodiment, the second pump 37 is provided in the middle of the replenishment channel 33*a*. However, the second pump 37 may be provided to the first liquid storage unit 31 instead.

The pumping mechanism is not limited to the first pump 36 and the second pump 37. For example, the pumping mechanism may be a pressurizing unit provided with the first liquid storage unit 31 and the second liquid storage unit 32 formed from a flexible exterior package and may be configured to apply pressure to the ink stored inside by pressing the first liquid storage unit 31 and the second liquid storage unit 32 from outside. Alternatively, an apparatus that applies a difference in hydraulic head pressure generated by adjusting relative positions in a vertical direction between the recording head 2 and the second liquid storage unit 32 and relative positions in the vertical direction between the first liquid storage unit 31 and the second liquid storage unit 32 may be used as the pumping mechanism.

The present embodiment is configured to provide the first liquid storage unit 31 and the second liquid storage unit 32 collectively as the liquid supply unit 3. However, the present disclosure is not limited to this configuration, and only the second liquid storage unit 32 may be provided, for example. Alternatively, the ink may be kept from circulating between the second liquid storage unit 32 and the recording head 2 by not providing the recovery pipe 35 that includes the recovery channel 35*a* between the second liquid storage unit 32 and the recording head 2.

The control unit 4 includes a control device such as a central processing unit (CPU) or a field programmable gate array (FPGA), and a storage device such as a semiconductor memory. The control unit 4 integrally controls respective constituents of the ink jet recording apparatus 1, namely, the recording head 2, the transportation mechanism 5, the movement mechanism 6, and the like by causing the control device to execute programs stored in the storage device.

The transportation mechanism 5 transports the medium S in the X-axis direction and includes a transportation roller 5*a*. Specifically, the transportation mechanism 5 transports the medium S in the X-axis direction by rotation of the transportation roller 5*a*. Here, the transportation mechanism 5 to transport the medium S is not limited to the one provided with the transportation roller 5*a*. For example, the transportation mechanism 5 may be configured to transport the medium S by using a belt or a drum.

The movement mechanism 6 is controlled by the control unit 4 so as to reciprocate the recording head 2 in the +Y direction and the −Y direction.

More precisely, the movement mechanism 6 of the present embodiment includes a support member 7 and a transportation belt 8. The support member 7 is a so-called carriage to support the recording head 2 and is fixed to the transportation belt 8. The transportation belt 8 is an endless belt installed in the Y-axis direction. By rotating the transportation belt 8 under control of the control unit 4, the recording head 2 is reciprocated together with the support member 7 in the +Y direction and the −Y direction along a not-illustrated guide rail. Although the support member 7 is described as the carriage herein, the support member 7 is not limited to the carriage. The support member 7 may be a different member such as a sub-carriage mounted on the carriage and configured to support the recording head 2.

The recording head 2 performs an ejecting operation to eject the inks, which are supplied from the liquid supply units 3, in the form of ink droplets from the respective nozzles 21 onto the medium S in the +Z direction under the control of the control unit 4. This ejecting operation by the recording head 2 is carried out in tandem with the transportation of the medium S by the transportation mechanism 5 and the reciprocating movement of the recording head 2 by the movement mechanism 6. Thus, so-called printing is carried out by forming an image on a surface of the medium S by using the inks.

Figure 2:
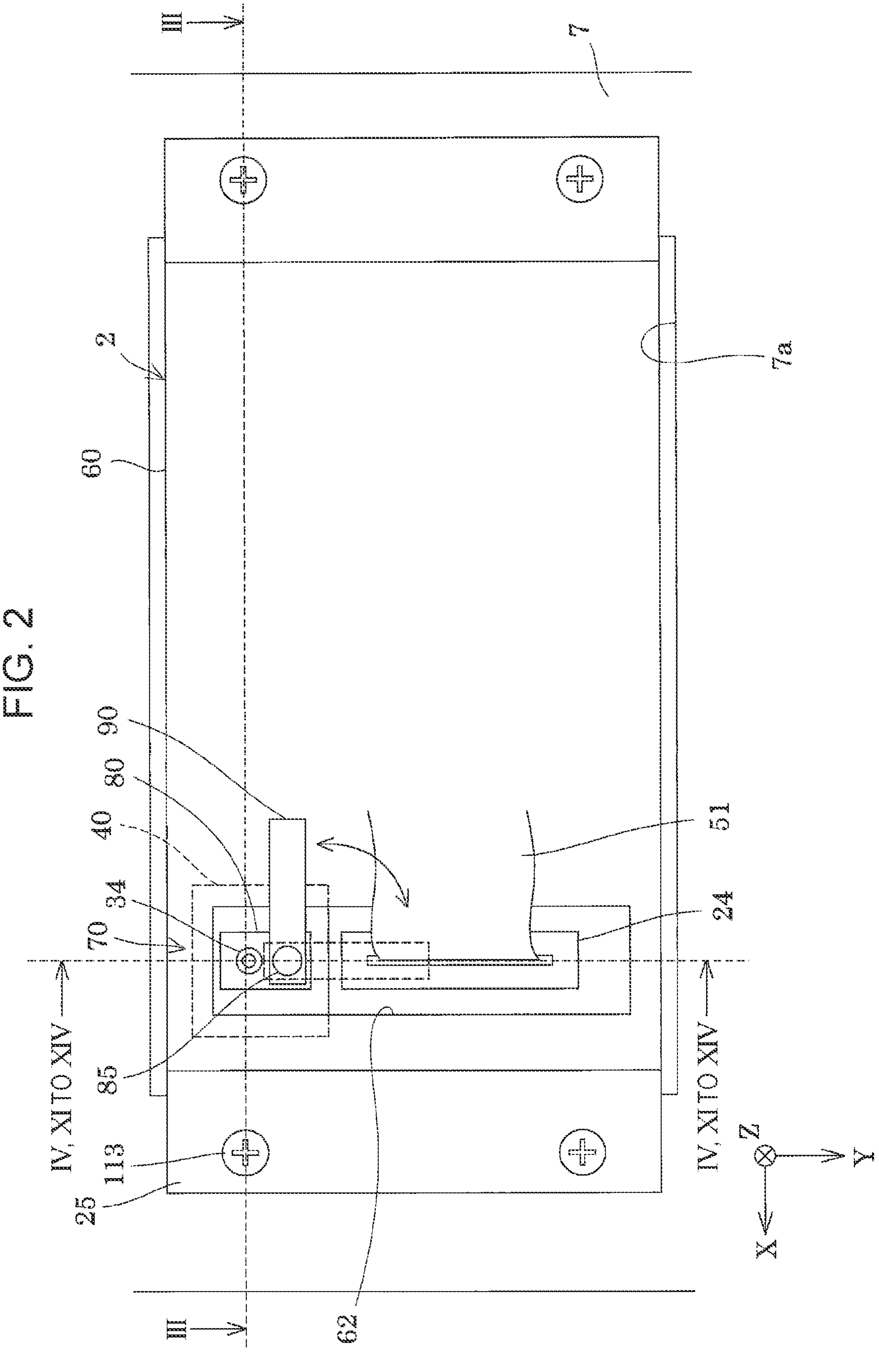
FIG. 2 is a plan view of a substantial part of the recording apparatus according to the Embodiment 1.
Figure 3:
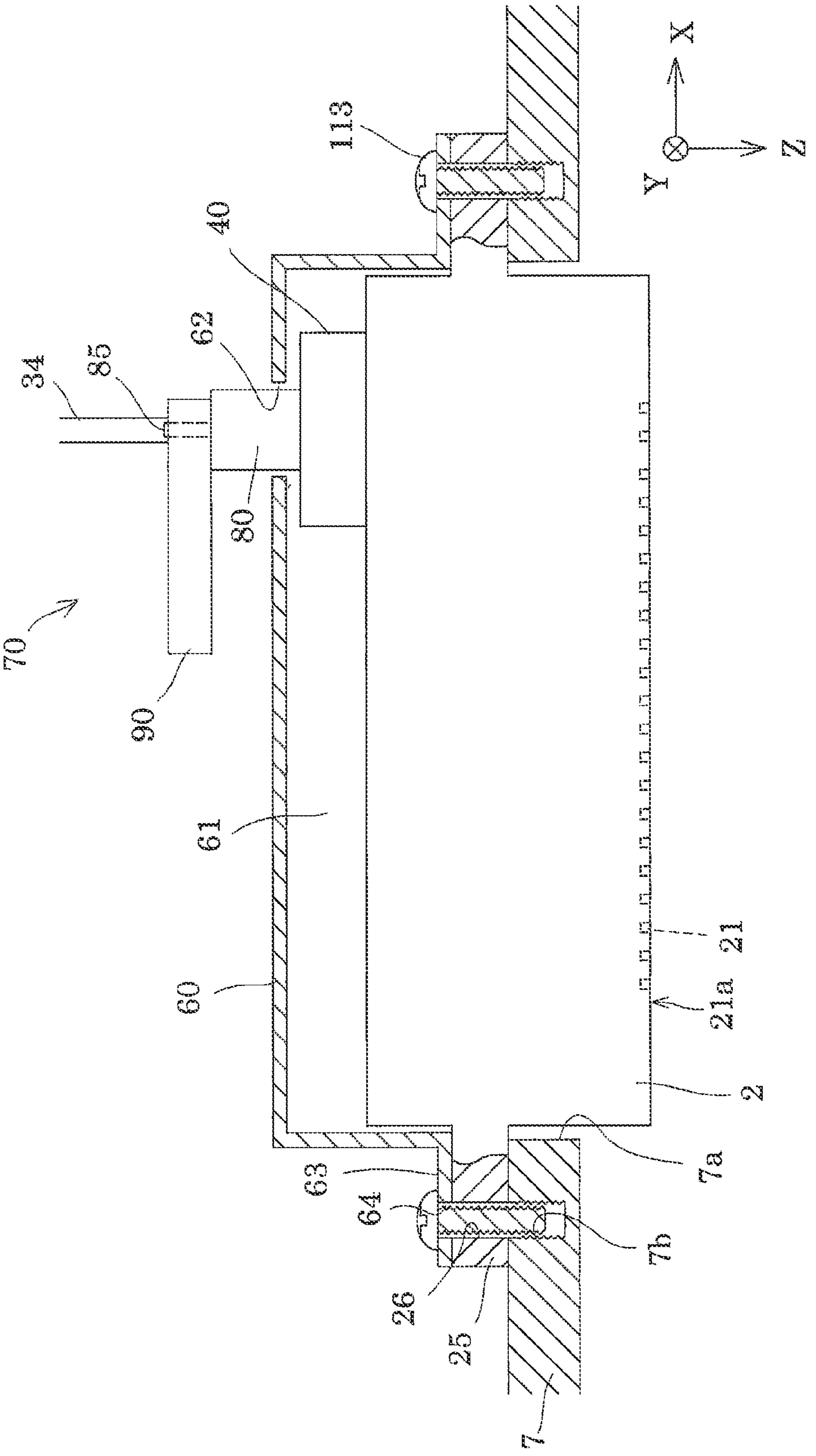
FIG. 3 is a cross-sectional view of the substantial part of the recording apparatus according to the Embodiment 1.
Figure 4:
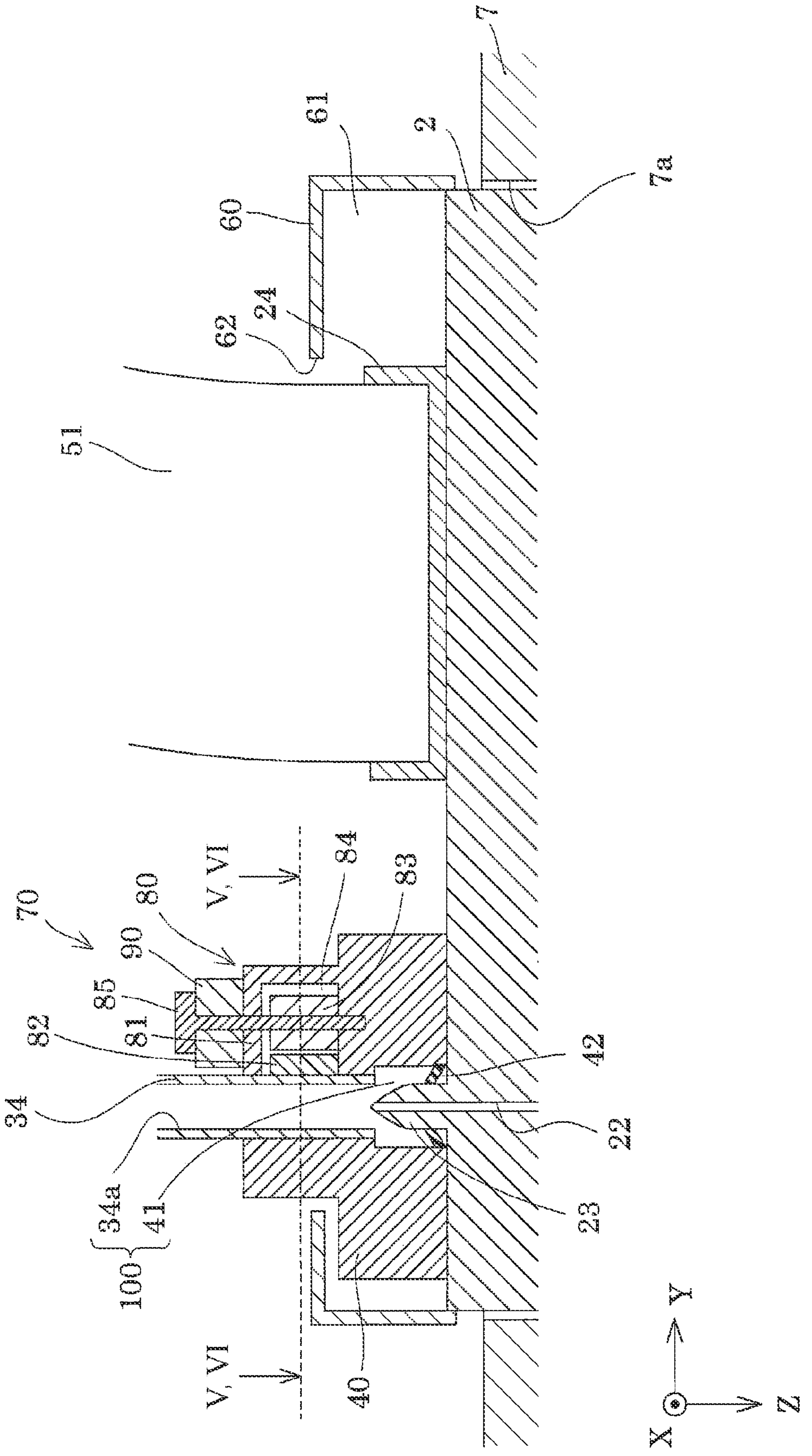
FIG. 4 is another cross-sectional view of the substantial part of the recording apparatus according to the Embodiment 1.
Figure 5:
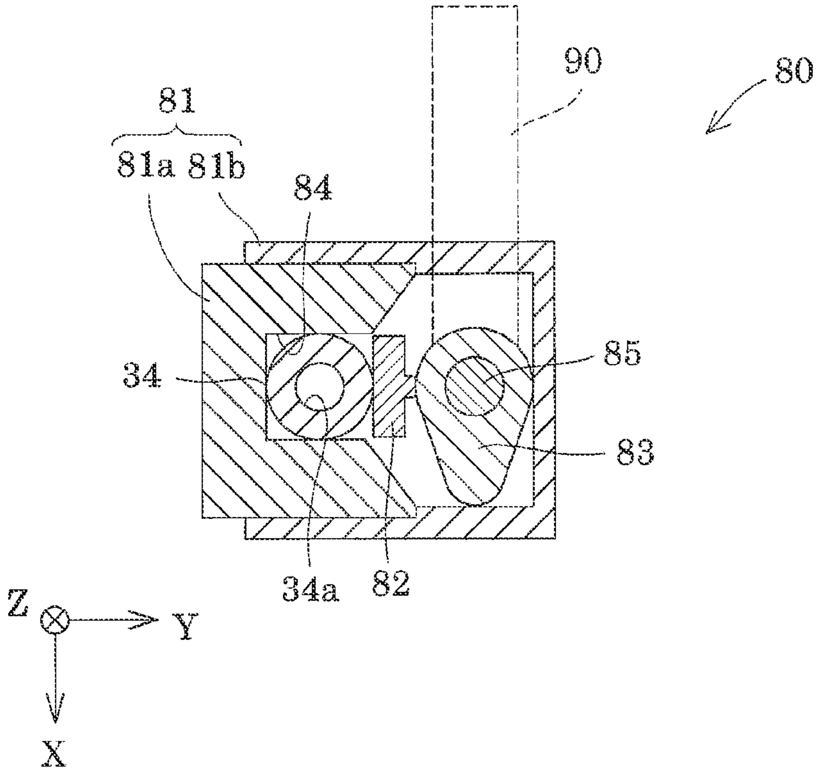
FIG. 5 is a cross-sectional view for explaining an open state of a valve mechanism according to the Embodiment 1.
Figure 6:
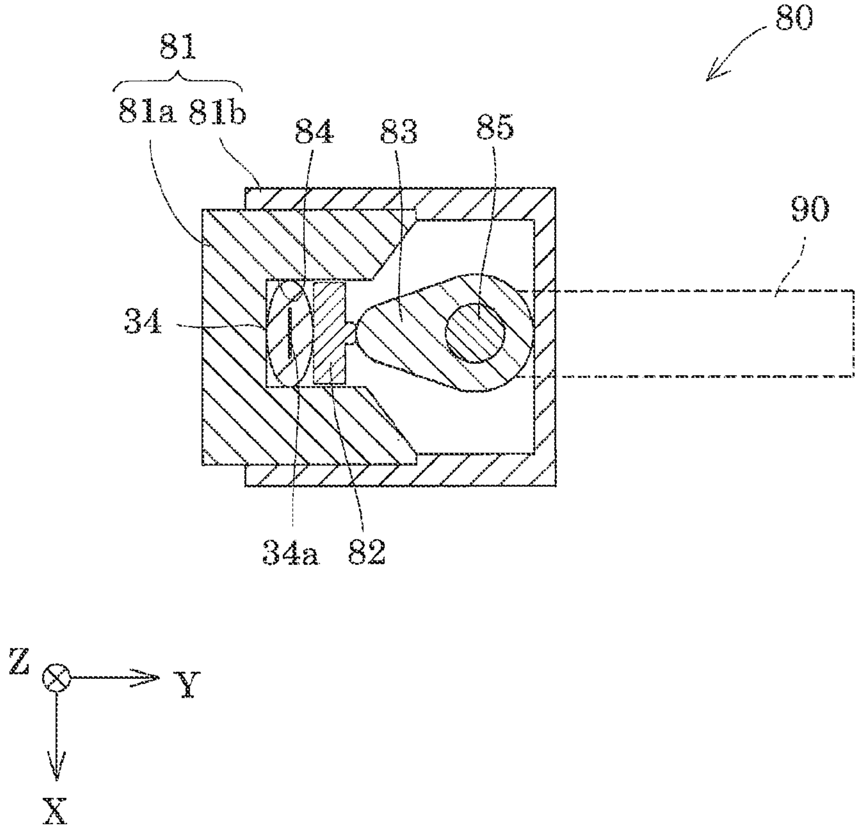
FIG. 6 is a cross-sectional view for explaining a closed state of the valve mechanism according to the Embodiment 1.

FIG. 2 is a plan view of the recording head 2, a cover member 60, a flow channel member 70, and a wiring member as viewed in the +Z direction. FIG. 3 is a cross-sectional view of a substantial part taken along line III-III in FIG. 2. FIG. 4 is a cross-sectional view of a substantial part taken along line IV-IV in FIG. 2. FIGS. 5 and 6 are cross-sectional views taken along lines V-V and VI-VI in FIG. 4.

As illustrated in FIGS. 2, 3, and 4, the recording head 2 includes the nozzles 21 that eject the ink as ink droplets, a first flow channel 22 that communicates with the nozzles 21, and a not-illustrated pressure generation unit that generates a change in pressure in the ink inside the first flow channel 22. The nozzles 21 are provided in a surface in the +Z direction of the recording head 2. In the present embodiment, this surface provided with the nozzles 21 will be referred to as the nozzle surface 21*a*. Meanwhile, a piezoelectric actuator including a piezoelectric material that exhibits electromechanical conversion functionality and being configured to generate a change in pressure in the ink inside the flow channel by changing a volume of the flow channel through deformation of the piezoelectric actuator so as to eject an ink droplet from the corresponding nozzle 21 can be used as the pressure generation unit, for example. Alternatively, a component formed by disposing a heat generation element inside the first flow channel 22 and configured to eject an ink droplet from a nozzle 21 by using a bubble formed through heat generation by the heat generation element can be used as the heat generation unit, for example.

A first flow channel coupling unit 23 is provided on a surface on the −Z direction side of the recording head 2. The first flow channel coupling unit 23 is formed of a flow channel needle, which has a pointed tip end and is provided on the surface on the −Z direction side of the recording head 2 so as to project in the −Z direction. The first flow channel 22 is provided so as to be open on a tip end surface of the first flow channel coupling unit 23, and the ink is supplied from the first supply channel 34*a* to an opening of the first flow channel 22 at the tip end of the first flow channel coupling unit 23. Here, the first flow channel coupling unit 23 may be formed integrally with the recording head 2 or may be formed separately from the recording head 2 and fixed thereto by adhesion, welding, and the like. A second flow channel coupling unit 40 provided at an end portion of the supply pipe 34 to be described later in detail is coupled to the above-described first flow channel coupling unit 23 in a liquid-tight manner.

Meanwhile, a first connector 24 to be coupled to a flexible cable 51 being an example of the wiring member is provided on the surface on the −Z direction side of the recording head 2. The first connector 24 is electrically coupled to the not-illustrated pressure generation unit provided in the recording head 2. The flexible cable 51 being the wiring member is electrically coupled to the first connector 24, and a control signal such as a drive signal for driving the pressure generation unit is supplied through the flexible cable 51. In other words, the first connector 24 is configured to electrically couple multiple wires at the same time. Meanwhile, the flexible cable 51 is attachable to and detachable from the first connector 24. A direction of insertion and extraction of the flexible cable 51 to or from the first connector 24 is set to the Z-axis direction. Specifically, the direction of insertion of the flexible cable 51 into the first connector 24 is the +Z direction, and the direction of extraction thereof is the −Z direction. Here, a component such as a drive circuit provided with a switching element and a sensor for measuring temperature may be provided between the first connector 24 and the pressure generation unit in the recording head 2. In the present embodiment, the single first connector 24 is provided to the single recording head 2. However, the present disclosure is not limited to this configuration, and two or more first connectors 24 may be provided instead. Meanwhile, the first connector 24 is provided longitudinally aligned in the Y-axis direction. Moreover, in the present embodiment, the first connector 24 and the second flow channel coupling unit 40 are arranged in the Y-axis direction and are disposed to overlap each other at least partially as viewed in the Y-axis direction. In this way, it is possible to reduce an opening area of an opening 62 of the cover member 60 to be described later in detail, thereby suppressing intrusion of the ink or mist from the opening 62 into the cover member 60.

The recording head 2 also includes first flange units 25 provided on two side surfaces in the X-axis direction so as to each project in the +X direction and the −X direction. Each of the first flange units 25 is provided with two first through holes 26 that pass through the first flange unit 25 in the Z-axis direction.

The cover member 60 is formed into a box shape that is open in the +Z direction. The cover member 60 covers the recording head 2 and enables insertion of the −Z direction side of the recording head 2 into the opening, thereby defining a housing space 61 in which the second flow channel coupling unit 40 is housed between the recording head 2 and the cover member 60. In other words, the housing space 61 is defined between the surface in the −Z direction of the recording head 2 and the cover member 60, and the first flow channel coupling unit 23 and the first connector 24 of the recording head 2 are housed in the housing space 61. Meanwhile, the cover member 60 includes the opening 62 that enables insertion of the flexible cable 51 as well as the supply pipe 34 provided with the first supply channel 34*a*. The first connector 24 is exposed to the outside of the cover member 60, or in other words, to the outside of the housing space 61 through the opening 62. That is, the first connector 24 is enclosed in the opening 62 as viewed in the Z-axis direction. Here, the state of the first connector 24 being exposed to the outside of the housing space 61 does not entail a state of the first connector 24 being located outside the housing space 61 but rather a state of the first connector 24 being located in the housing space 61 and visible to the outside through the opening 62. Moreover, in the present embodiment, the first flow channel coupling unit 23 is exposed to the outside of the cover member 60, that is, to the outside of the housing space 61 through the opening 62. In other words, the first flow channel coupling unit 23 is enclosed in the opening 62 as viewed in the Z-axis direction. Although details will be described later, the first flow channel coupling unit 23 and the second flow channel coupling unit 40 are coupled or disconnected in the state where the cover member 60 is detached from the recording head 2. Therefore, the first flow channel coupling unit 23 does not always have to be exposed to the outside through the opening 62. Meanwhile, the opening 62 of the present embodiment is configured to enable insertion of the supply pipe 34 and the flexible cable 51, and a single opening 62 is provided thereto in common. The number of the openings 62 is not limited to this example. For instance, the openings 62 may be each independently provided to the supply pipe 34 and to the flexible cable 51. Meanwhile, in the present embodiment, the first flow channel coupling unit 23 is juxtaposed to the first connector 24 in the Y-axis direction in the recording head 2. Accordingly, as viewed in the Z-axis direction, the opening 62 takes on a rectangular shape longitudinally aligned in the Y-axis direction. However, the layout of the first flow channel coupling unit 23 and the first connector 24 as well as the shape of the opening 62 are not limited to this configuration. The opening 62 longitudinally aligned in the X-axis direction may be provided when the first flow channel coupling unit 23 and the first connector 24 are juxtaposed in the X-axis direction. The opening 62 is not limited to the above-described configuration. For example, the opening 62 may be formed into a so-called cutout shape that extends to an end portion of the cover member 60 as viewed in the Z-axis direction. Moreover, the shape of the opening 62 viewed in the Z-axis direction is not limited to a rectangular shape or to any particular shape and may take any of a circular shape, an elliptical shape, an oval shape, a polygonal shape, and the like.

Meanwhile, the cover member 60 includes second flange portions 63 provided on two sides in the X-axis direction so as to each project in the +X direction and the −X direction. Each of the second flange portions 63 is provided with two second through holes 64 that pass through the second flange portion 63 in the Z-axis direction. Each second through hole 64 is located at a position overlapping the first through hole 26 as viewed in the Z-axis direction. Consequently, the first flange unit 25 overlaps the second flange portion 63 in the Z-axis direction when the cover member 60 covers the −Z direction side of the recording head 2, such that each first through hole 26 communicates with the corresponding second through hole 64.

The support member 7 that supports the recording head 2 is provided with an exposure opening 7*a* that exposes the nozzle surface 21*a* of the recording head 2, and a first fixation hole 7*b* for fixing the recording head 2 to the support member 7. The recording head 2 is held by the support member 7 in a state of exposing the nozzle surface 21*a* in the +Z direction through the exposure opening 7*a*. The recording head 2 and the cover member 60 are fixed to the support member 7 by causing a third fixation member 113 being another fixation member to pass through the second through hole 64 and the first through hole 26, thereby bringing the recording head 2 and the cover member 60 into engagement with the first fixation hole 7*b*. In other words, the third fixation member 113 fixes the recording head 2 and the cover member 60 to the support member 7 such that the recording head 2 is interposed between the cover member 60 and the support member 7. In the present embodiment, the above-described third fixation member 113 is formed from a male screw while the first fixation hole 7*b* is formed from a female screw in which screw threads to be engaged with the third fixation member 113 are helically formed on an inner peripheral surface thereof. In other words, the recording head 2 and the cover member 60 are fixed to the support member 7 with the third fixation member 113 provided in common thereto. A total of the four third fixation members 113 and the four first fixation holes 7*b* described above are provided in two pairs to the respective first flange units 25 of the recording head 2. This makes it possible to decrease the number of components compared with a case of individually fixing the recording head 2 and the cover member 60 to the support member 7 by using fixation members, and to reduce costs by decreasing assembly procedures. Meanwhile, the cover member 60 is detached from the recording head 2 by disengaging each third fixation member 113 from the corresponding first fixation hole 7*b* and then moving the cover member 60 in the −Z direction relative to the recording head 2. In other words, a direction of detachment of the cover member 60 from the recording head 2 is the −Z direction.

The flow channel member 70 includes the supply pipe 34, the second flow channel coupling unit 40, a valve mechanism 80, and a displacement member 90. As described above, the supply pipe 34 is a flexible tube forming the first supply channel 34*a*. As mentioned above, the one end portion of the first supply channel 34*a* is coupled to the second liquid storage unit 32 while the other end portion is coupled to the second flow channel coupling unit 40. The supply pipe 34 and the second flow channel coupling unit 40 are fixed by adhesion, welding, and the like so as not to be detached easily.

The second flow channel coupling unit 40 includes a second supply channel 41 that communicates with the first supply channel 34*a*. An end portion in the −Z direction of the second supply channel 41 communicates with the first supply channel 34*a* while an end portion in the +Z direction thereof is open to a surface in the +Z direction of the second flow channel coupling unit 40. A first sealing member 42 is provided at an end portion in the +Z direction of this second supply channel 41. The first flow channel coupling unit 23 of the recording head 2 is inserted into the first sealing member 42, thus communicating with the second supply channel 41. In other words, a direction of insertion and extraction of the second flow channel coupling unit 40 is set to the Z-axis direction. Moreover, the direction of insertion of the second flow channel coupling unit 40 to the recording head 2 is the +Z direction, and the direction of extraction thereof is the −Z direction. Meanwhile, the supply channel 100 that supplies the ink to the recording head 2 includes the first supply channel 34*a* and the second supply channel 41. In other words, the second flow channel coupling unit 40 of the present embodiment corresponds to a flow channel coupling member, and the second flow channel coupling unit 40 is detachably coupled to the first flow channel coupling unit 23 of the recording head 2. Meanwhile, the second flow channel coupling unit 40 and the first flow channel coupling unit 23 of the recording head 2 couple the supply channel 100 to the first flow channel 22 in a liquid-tight manner.

The valve mechanism 80 is provided on a surface in the −Z direction of the second flow channel coupling unit 40. The valve mechanism 80 of the present embodiment is formed integrally with the second flow channel coupling unit 40 on the −Z direction side of the second flow channel coupling unit 40. However, the valve mechanism 80 may be formed separately from the second flow channel coupling unit 40 instead.

As illustrated in FIGS. 5 and 6, the valve mechanism 80 includes a body unit 81, a pressurizing unit 82, and an eccentric cam 83.

The body unit 81 includes a first body unit 81*a* and a second body unit 81*b* and is formed by combining the first body unit 81*a* and the second body unit 81*b* together. A valve housing unit 84 that can house the supply pipe 34 is provided in the body unit 81. In other words, the valve housing unit 84 is provided to pass through the valve mechanism 80 in the Z-axis direction.

Meanwhile, the pressurizing unit 82 and the eccentric cam 83 are housed in the valve housing unit 84. The eccentric cam 83 is fixed to a shaft portion 85 that is provided along the Z-axis, and the shaft portion 85 is provided to be pivotally rotatable around the Z-axis relative to the body unit 81. The pressurizing unit 82 is provided between the eccentric cam 83 and the supply pipe 34 so as to be capable of reciprocating in the Y-axis direction. As illustrated in FIG. 6, the pressurizing unit 82 moves toward the supply pipe 34 being in the −Y direction along with rotation of the eccentric cam 83, thereby constricting the supply pipe 34 between the pressurizing unit 82 and the body unit 81. In this way, the first supply channel 34*a* provided inside the supply pipe 34 is closed in the valve mechanism 80. Meanwhile, when restriction of movement in the +Y direction of the pressurizing unit 82 is released by the rotation of the eccentric cam 83, as illustrated in FIG. 5, and an elastic force of the supply pipe 34 causes the pressurizing unit 82 to move in the +Y direction, thereby opening the first supply channel 34*a*.

In the present embodiment, the displacement member 90 is formed from an elongated lever. One end portion of the lever is fixed on the outside of the valve housing unit 84 to the fixed shaft portion 85 of the eccentric cam 83. In other words, the displacement member 90 is pivotally rotatable together with the eccentric cam 83 around the Z-axis serving as the center axis by using the shaft portion 85. That is, the rotation of the eccentric cam 83 is carried out by operating the displacement member 90. In the present embodiment, the displacement member 90 is displaceable by being rotated around the shaft portion 85 to an opening position at which the displacement member 90 opens the first supply channel 34*a* as illustrated in FIG. 5 and to a closing position at which the displacement member 90 closes the first supply channel 34*a* as illustrated in FIG. 6. Meanwhile, the displacement of the displacement member 90 is carried out by rotating the displacement member 90 by 90 degrees around the shaft portion 85. When the displacement member 90 is set to the opening position, the displacement member 90 is located so as to be elongated in the X-axis direction as indicated by a solid line in FIG. 2. On the other hand, when the displacement member 90 is set to the closing position, the displacement member 90 is located so as to be elongated in the Y-axis direction as indicated by a dashed line in FIG. 2.

Here, the second flow channel coupling unit 40 has a width that is larger than a width of the opening 62 of the cover member 60, which is larger than a width in the X-axis direction in the present embodiment. Consequently, it is not possible to detach the second flow channel coupling unit 40 from the recording head 2, that is, to disconnect the coupling between the first flow channel coupling unit 23 and the second flow channel coupling unit 40 unless the cover member 60 is detached from the recording head 2.

The valve mechanism 80 is provided internally and externally across the housing space 61 through the opening 62 of the cover member 60. Meanwhile, the displacement member 90 is disposed outside of the housing space 61 through the opening 62 of the cover member 60. This makes the displacement member 90 displaceable to the closing position and to the opening position without having to detach the cover member 60 from the recording head 2.

Here, the displacement member 90 is disposed at a position where the one end portion fixed to the shaft portion 85 overlaps the opening 62 of the cover member 60 as viewed in the Z-axis direction. Meanwhile, when the displacement member 90 is located at the closing position at which the displacement member 90 closes the first supply channel 34*a* as indicated by the dashed line in FIG. 2, the entire displacement member 90 overlaps the opening 62 as viewed in the Z-axis direction. In other words, when the displacement member 90 is located at the closing position as viewed in the Z-axis direction, the entire outer periphery of the displacement member 90 is located within the inner periphery of the opening 62. Accordingly, when the displacement member 90 is located at the closing position, the displacement member 90 can pass through the opening 62 to detach the cover member 60 from the recording head 2. Hence, the displacement member 90 enables the cover member 60 to move in the −Z direction relative to the recording head 2. Consequently, it is possible to detach the cover member 60 in the −Z direction from the recording head 2 and to disconnect the coupling between the first flow channel coupling unit 23 and the second flow channel coupling unit 40. In other words, when the displacement member 90 is located at the closing position, the displacement member 90 does not restrict disconnection of the coupling between the first flow channel coupling unit 23 and the second flow channel coupling unit 40 of the recording head 2.

When the displacement member 90 is located at the opening position at which the displacement member 90 opens the first supply channel 34*a* as indicated by the solid line in FIG. 2, the displacement member 90 is rotated by 90 degrees around the shaft portion 85 compared with the displacement member 90 located at the closing position. In this instance, an end portion of the displacement member 90 on a side opposite to the side pivotally supported by the shaft portion 85 does not overlap the opening 62 but overlaps the cover member 60 instead. Accordingly, when the displacement member 90 is located at the opening position, the displacement member 90 restricts the movement in the −Z direction of the cover member 60 relative to the recording head 2, and the cover member 60 cannot be detached from the recording head 2. Consequently, detachment of the second flow channel coupling unit 40 from the first flow channel coupling unit 23 is restricted by the cover member 60. In other words, when the displacement member 90 is located at the opening position, the displacement member 90 restricts disconnection of the coupling between the first flow channel coupling unit 23 and the second flow channel coupling unit 40 of the recording head 2 by way of the cover member 60. Specifically, the restriction of disconnection of the coupling between the first flow channel coupling unit 23 and the second flow channel coupling unit 40 by the displacement member 90 also encompasses restriction by the displacement member 90 by the intermediary action of other components such as the cover member 60.

Moreover, in the present embodiment, the displacement member 90 overlaps the first connector 24 as viewed in the Z-axis direction when the displacement member 90 is located at the closing position as indicated by the dashed line in FIG. 2. Consequently, the insertion or extraction of the flexible cable 51 to or from the first connector 24 is restricted when the displacement member 90 is located at the closing position. That is, the flexible cable 51 can be easily inserted into and extracted from the first connector 24 by using the displacement member 90 when the displacement member 90 is located at the closing position. Meanwhile, the insertion or extraction of the flexible cable 51 to or from the first connector 24 is enabled when the displacement member 90 is located at the opening position as indicated by the solid line in FIG. 2.

A method of detaching the flow channel member 70 and the flexible cable 51 from the recording head 2 in the above-described ink jet recording apparatus 1 will be described with reference to FIGS. 7 to 14. Here, FIGS. 7 to 10 are plan views which are viewed in the +Z direction for explaining the method of detaching the flow channel member 70 and the flexible cable 51 from the recording head 2. FIGS. 11 to 14 are cross-sectional views which are taken along lines XI-XI to XIV-XIV in FIG. 2 for explaining the method of detaching the flow channel member 70 and the flexible cable 51 from the recording head 2.

Figure 7:
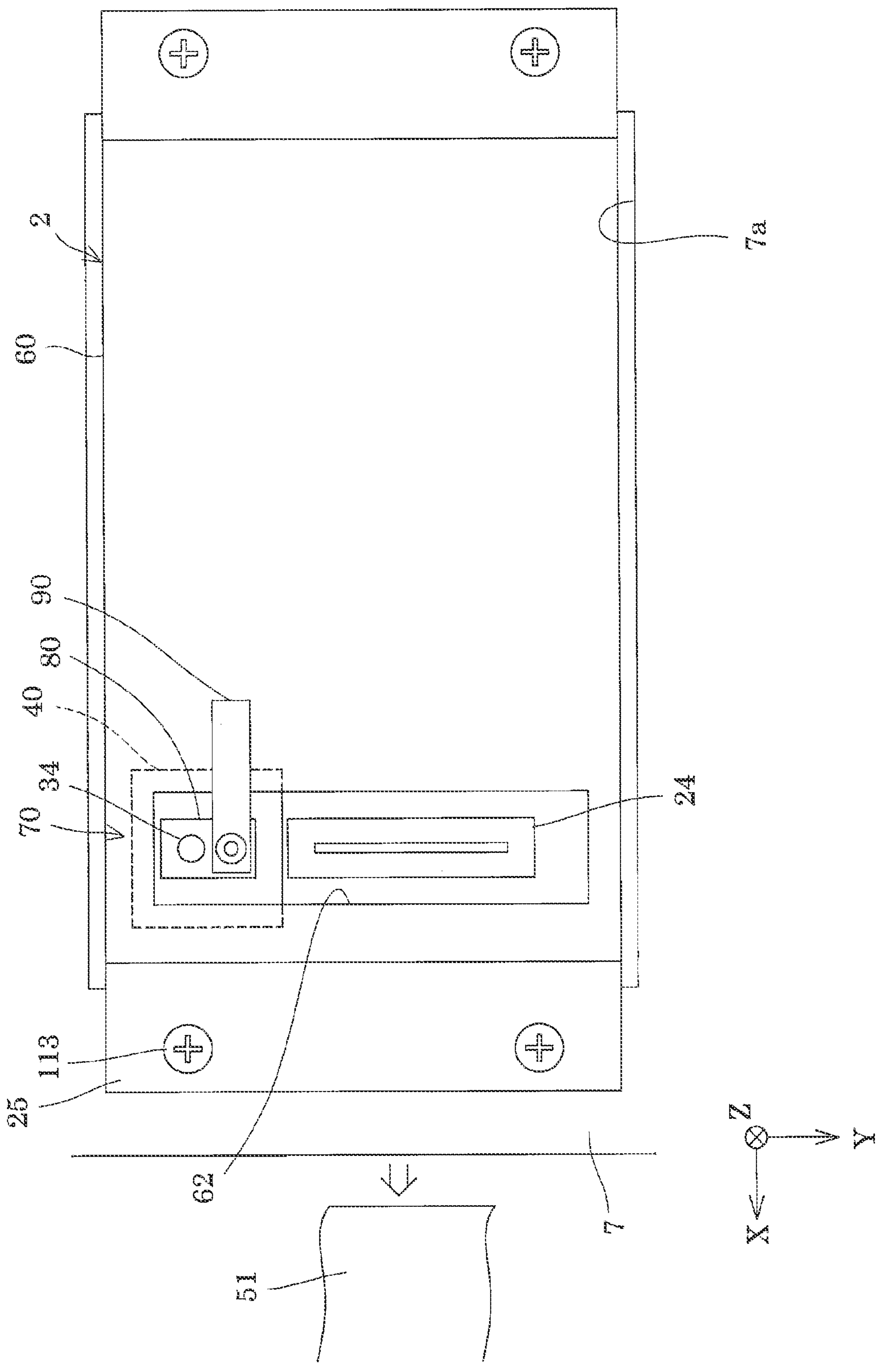
FIG. 7 is a plan view for explaining a method of detaching a flow channel member and the like according to the Embodiment 1.
Figure 11:
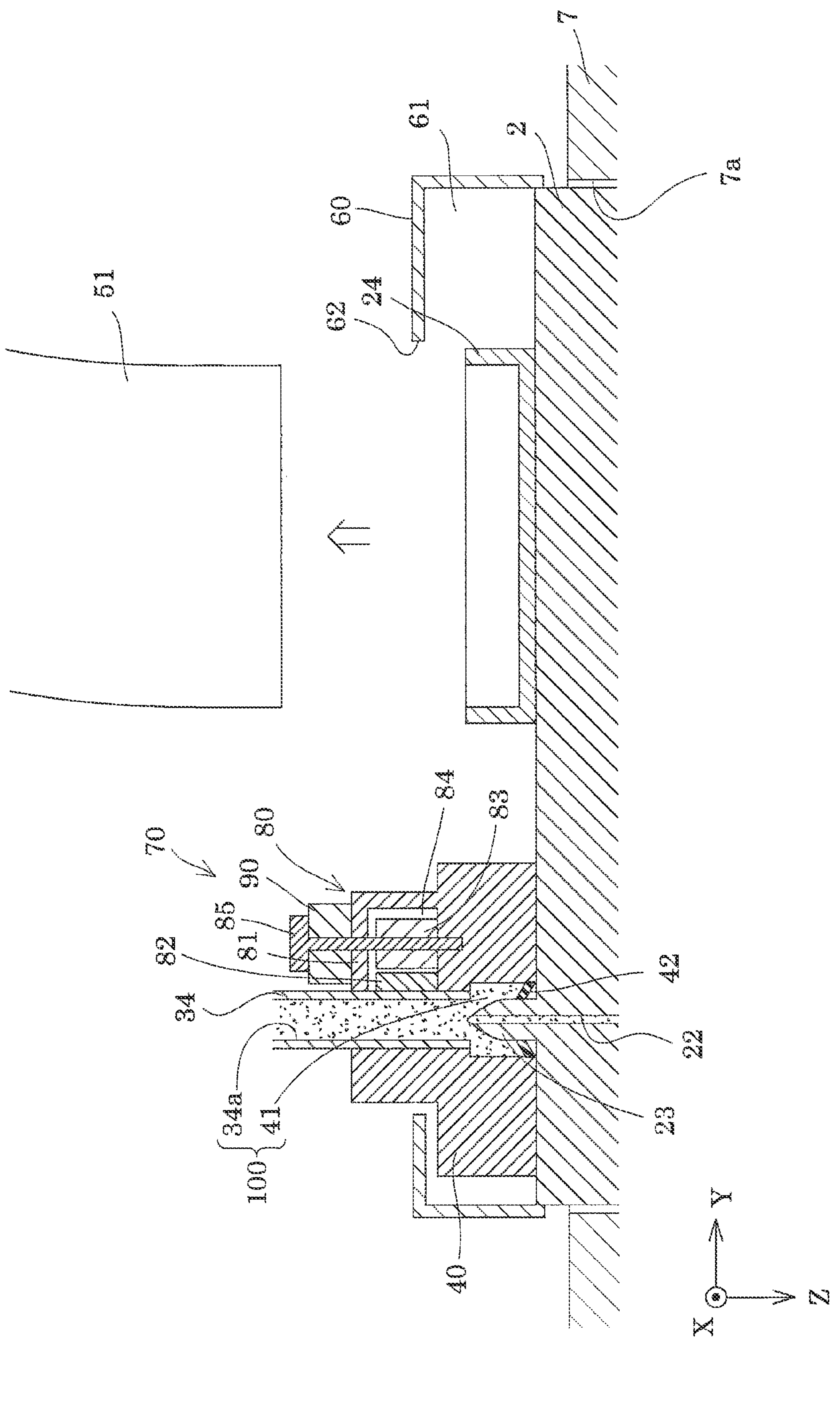
FIG. 11 is a cross-sectional view for explaining the method of detaching the flow channel member and the like according to the Embodiment 1.

First, the flexible cable 51 is detached from the first connector 24 in the state where the displacement member 90 is located at the opening position as illustrated in FIGS. 7 and 11. When the displacement member 90 is located at the opening position, the displacement member 90 does not overlap the first connector 24 as viewed in the Z-axis direction. Accordingly, the displacement member 90 does not restrict detachment of the flexible cable 51 from the first connector 24.

Figure 8:
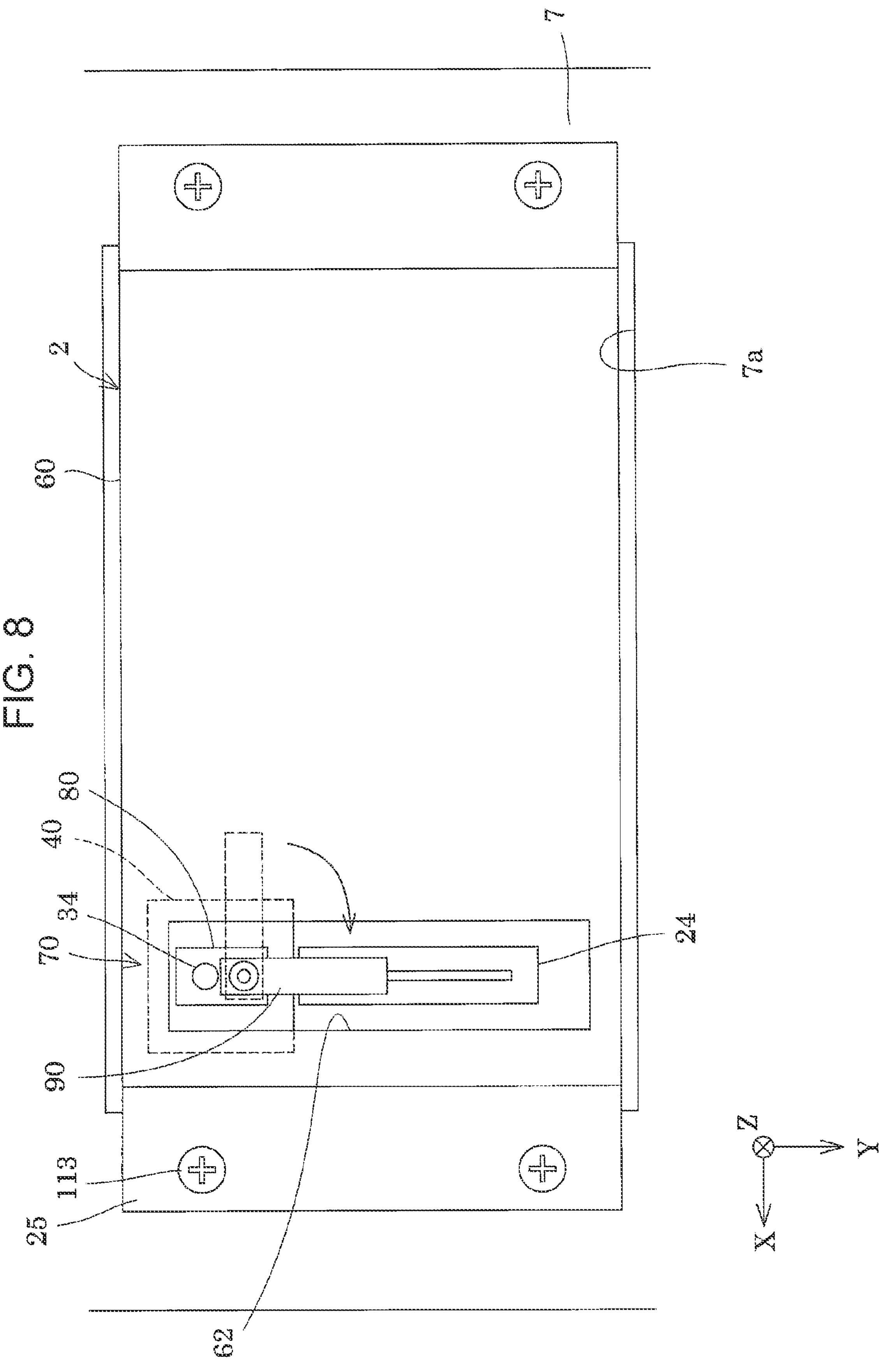
FIG. 8 is another plan view for explaining the method of detaching the flow channel member and the like according to the Embodiment 1.
Figure 12:
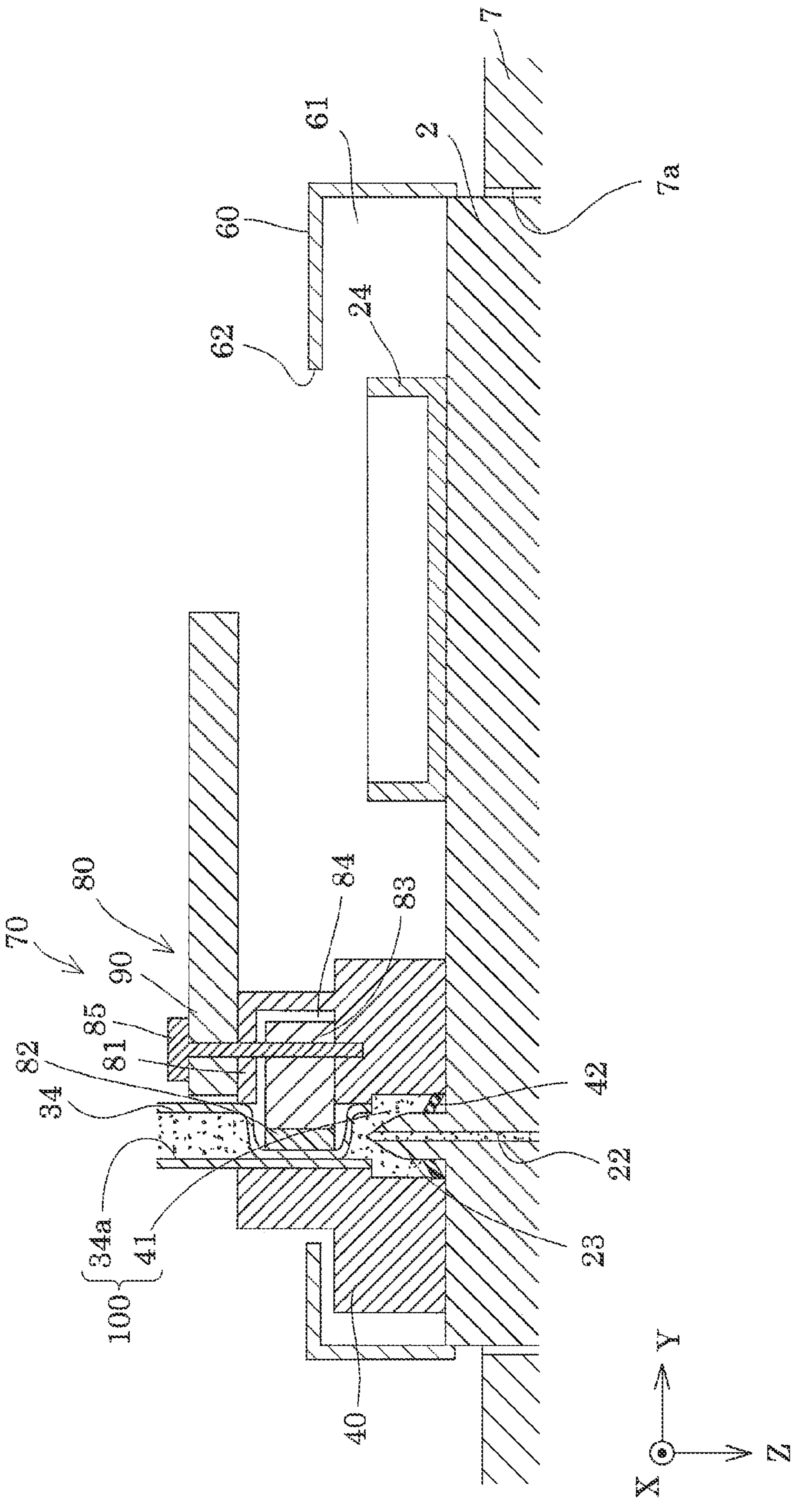
FIG. 12 is another cross-sectional view for explaining the method of detaching the flow channel member and the like according to the Embodiment 1.

Next, the displacement member 90 is moved from the opening position to the closing position as illustrated in FIGS. 8 and 12. Thus, the supply channel 100 is closed by the valve mechanism 80.

Figure 9:
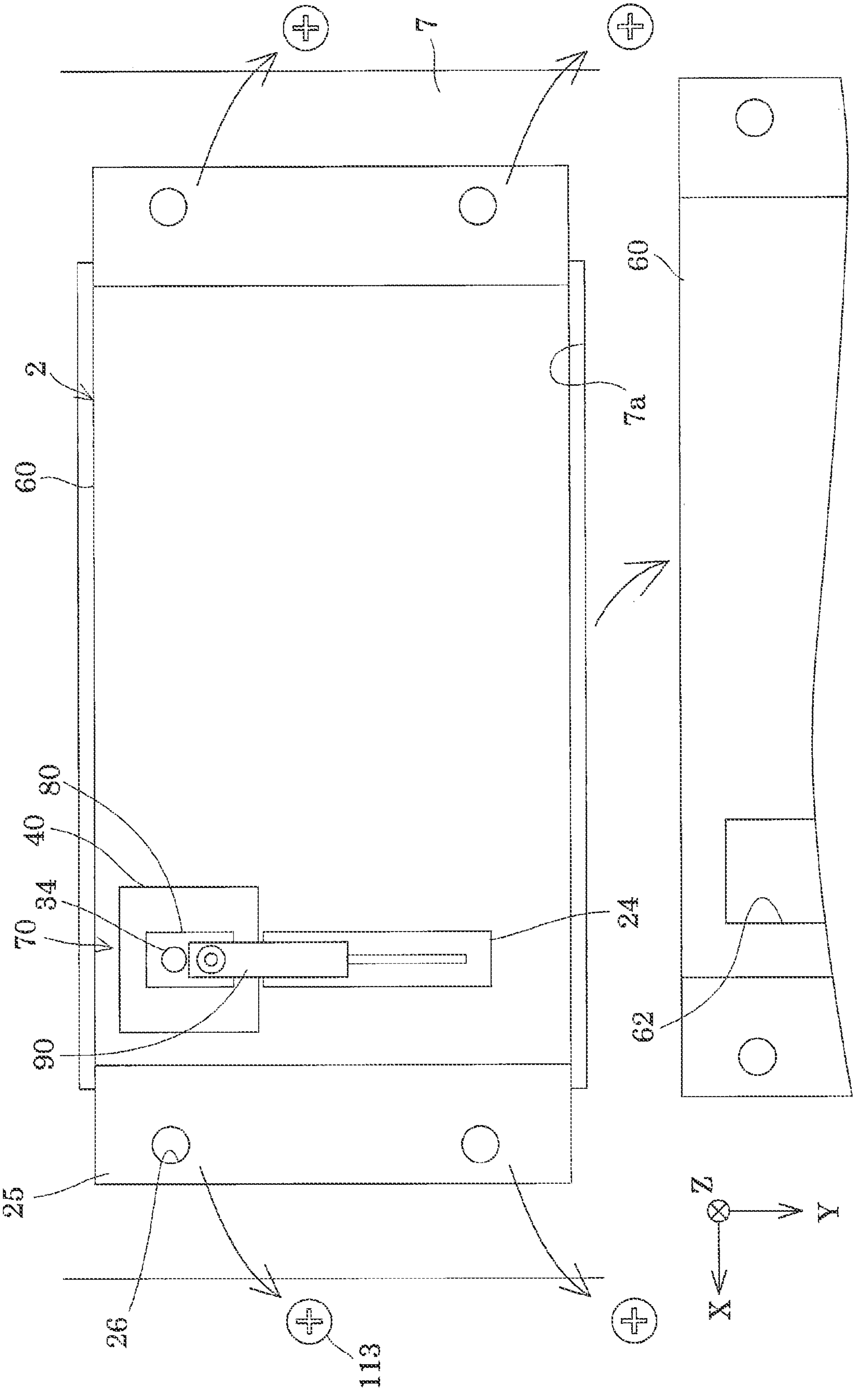
FIG. 9 is another plan view for explaining the method of detaching the flow channel member and the like according to the Embodiment 1.
Figure 13:
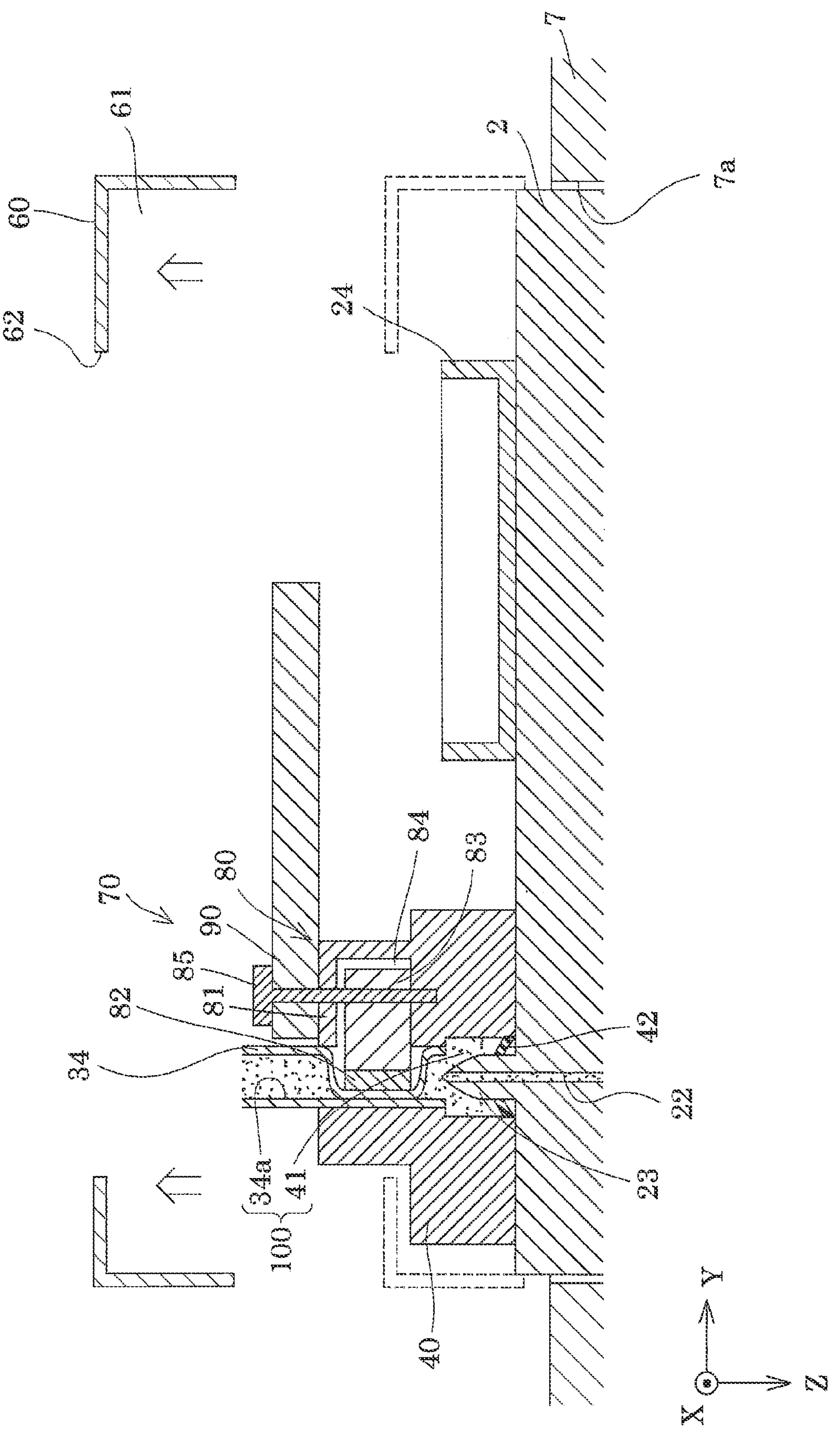
FIG. 13 is another cross-sectional view for explaining the method of detaching the flow channel member and the like according to the Embodiment 1.

Next, the cover member 60 is detached from the recording head 2 in the state where the displacement member 90 is located at the closing position as illustrated in FIGS. 9 and 13. Specifically, the cover member 60 is detached from the recording head 2 by detaching the third fixation members 113 and moving the cover member 60 in the −Z direction. In this instance, the displacement member 90 is located at the closing position, so that the displacement member 90 passes through the opening 62 when detaching the cover member 60 from the recording head 2, thus enabling detachment of the cover member 60. Incidentally, when the displacement member 90 is located at the opening position, the displacement member 90 restricts the movement of the cover member 60 in the −Z direction despite an attempt to detach the cover member 60 from the recording head 2, thereby complicating the detachment of the cover member 60.

Figure 10:
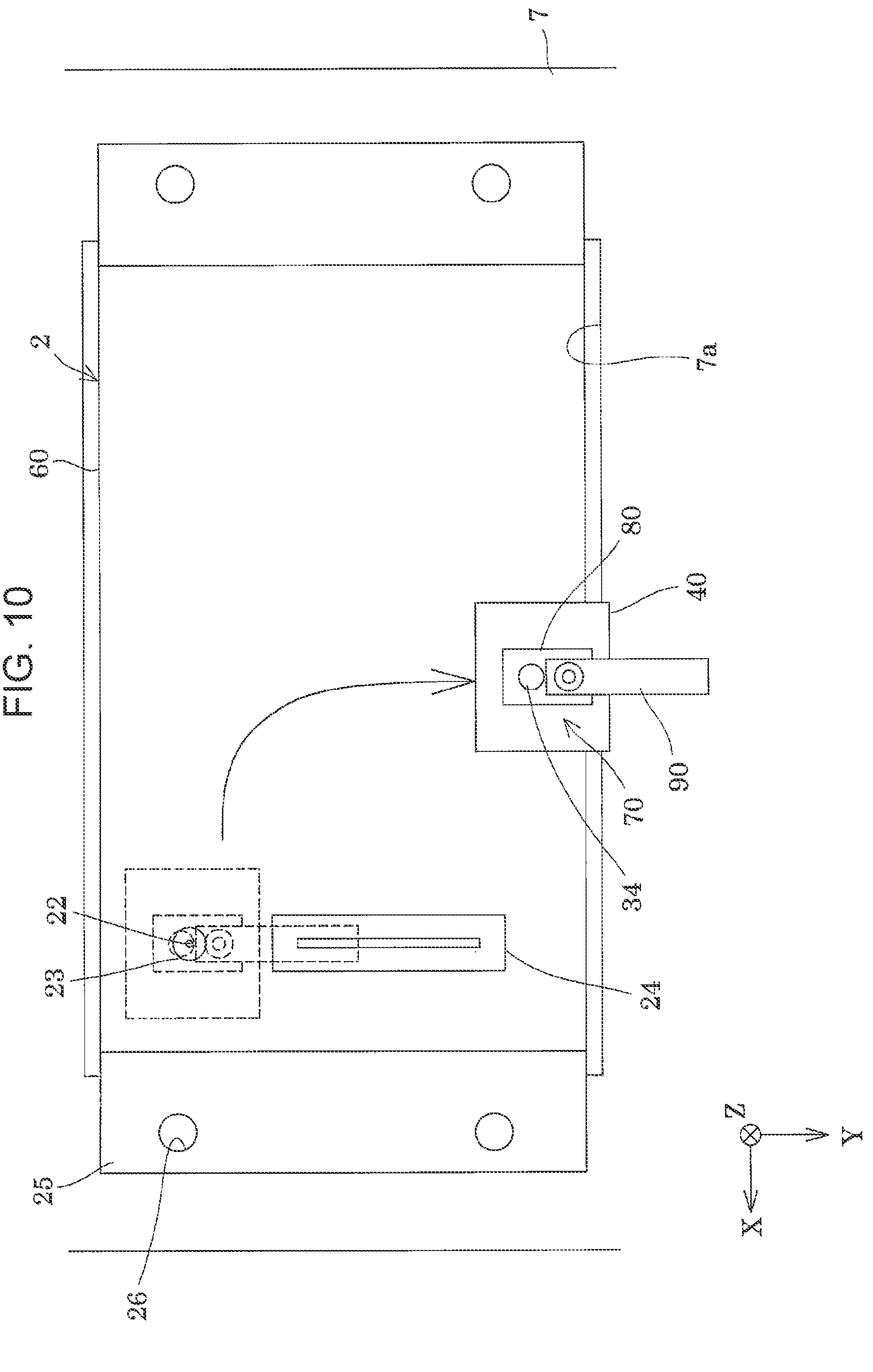
FIG. 10 is another plan view for explaining the method of detaching the flow channel member and the like according to the Embodiment 1.
Figure 14:
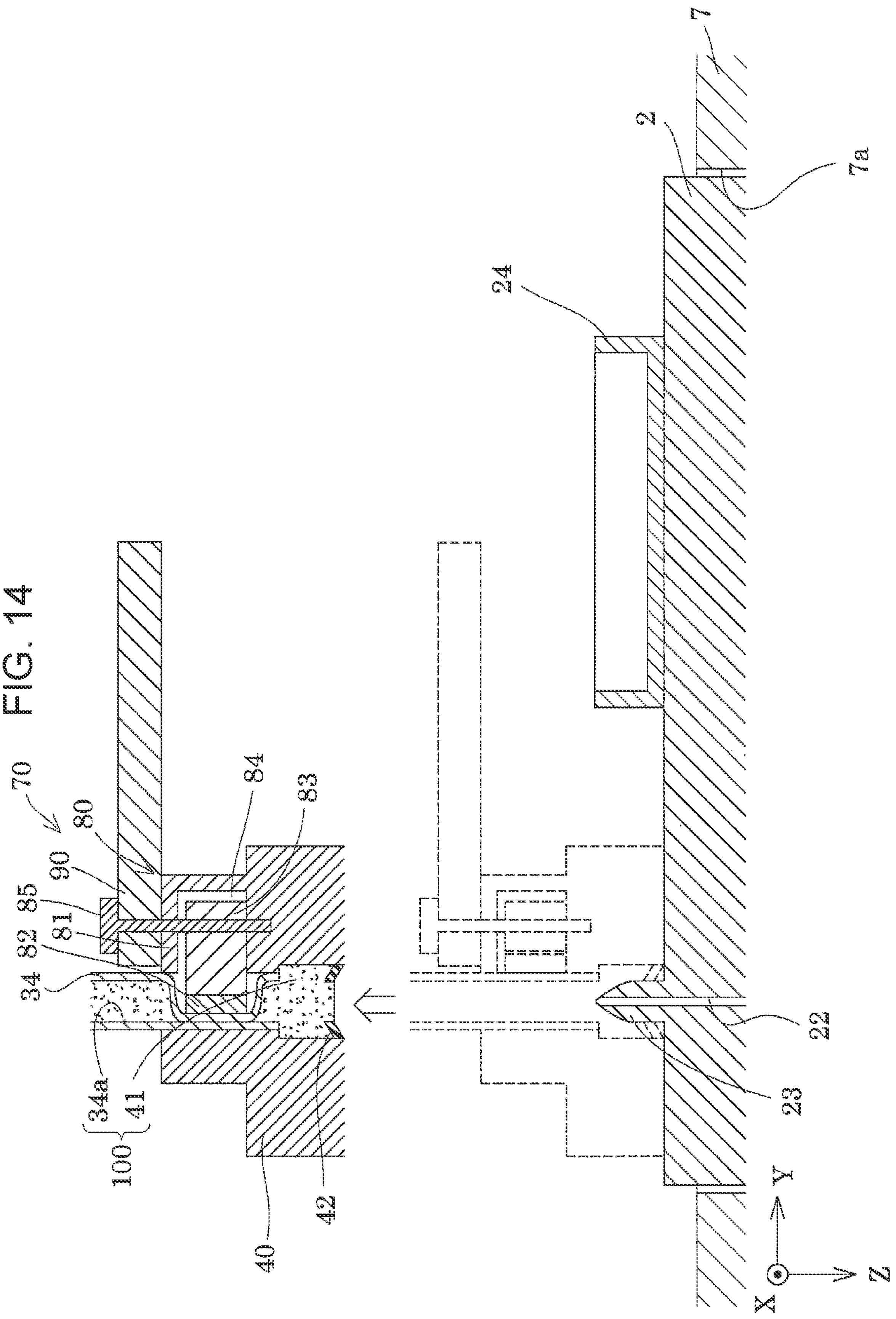
FIG. 14 is another cross-sectional view for explaining the method of detaching the flow channel member and the like according to the Embodiment 1.

Next, the flow channel member 70 is detached from the recording head 2 as illustrated in FIGS. 10 and 14. Specifically, the second flow channel coupling unit 40 is detached from the first flow channel coupling unit 23. In this instance, the movement in the direction of extraction of the second flow channel coupling unit 40 is not restricted by the cover member 60, so that the second flow channel coupling unit 40 can be detached from the first flow channel coupling unit 23. Since the displacement member 90 is located at the closing position and the supply channel 100 is closed by the valve mechanism 80, the ink inside the supply channel 100 is kept from leaking even when the flow channel member 70 is detached from the recording head 2. In other words, when the second flow channel coupling unit 40 is detached from the first flow channel coupling unit 23 in a state of not closing the supply channel 100, the ink is supplied from the second liquid storage unit 32 to the supply channel 100 even though the second pump 37 is stopped. Consequently, the ink inside the supply channel 100 leaks. On the other hand, when the supply channel 100 is closed, the ink is not supplied from the second liquid storage unit 32 to the supply channel 100. In this way, it is possible to keep the ink inside the supply channel 100 from leaking.

Incidentally, when the displacement member 90 is located at the opening position, the displacement member 90 restricts the movement in the −Z direction of the cover member 60 relative to the recording head 2. Hence, it is not possible to detach the cover member 60 from the recording head 2 or to detach the second flow channel coupling unit 40 from the first flow channel coupling unit 23. Accordingly, when the displacement member 90 is located at the opening position, the ink inside the supply channel 100 can be kept from leaking by suppressing detachment of the flow channel member 70 from the recording head 2.

On the other hand, a method of attaching the flow channel member 70 and the flexible cable 51 to the recording head 2 after detaching the flow channel member 70 and the flexible cable 51 therefrom can be carried out in reverse order to the aforementioned method. Now, the method of attaching the flow channel member 70 and the flexible cable 51 to the recording head 2 will also be described with reference to FIGS. 7 to 14. While FIGS. 7 to 14 illustrate arrows that represent detachment of the respective components, these arrows should be directed to opposite orientations when attaching these components. Illustration of such reverse arrows is omitted therein.

First, the second flow channel coupling unit 40 of the flow channel member 70 is attached to the first flow channel coupling unit 23 of the recording head 2 in the state where the displacement member 90 is located at the closing position as illustrated in FIGS. 10 and 14. Since the cover member 60 is not attached to the recording head 2 in this instance, the coupling of the second flow channel coupling unit 40 to the first flow channel coupling unit 23 is not restricted. Moreover, since the displacement member 90 is located at the closing position, the ink inside the supply channel 100 does not leak.

Next, the cover member 60 is attached to the recording head 2 while retaining the displacement member 90 at the closing position as illustrated in FIGS. 9 and 13. Since the displacement member 90 is located at the closing position in this instance, the attachment of the cover member 60 to the recording head 2 is not restricted by the displacement member 90. In other words, the cover member 60 enables the displacement member 90 to pass through the opening 62 and to be attached to the recording head 2.

Next, as illustrated in FIGS. 8 and 12, the displacement member 90 is moved from the closing position indicated by the solid line to the opening position indicated by the dashed line, thereby exposing the first connector 24 hidden by the displacement member 90 as viewed in the Z-axis direction, and opening the supply channel 100 at the same time. Thereafter, the flexible cable 51 is coupled to the first connector 24 as illustrated in FIGS. 7 and 11. In other words, in the present embodiment, the flexible cable 51 cannot be coupled to the first connector 24 without moving the displacement member 90 to the opening position and opening the supply channel 100. For this reason, by moving the displacement member 90 to the opening position to couple the flexible cable 51 to the first connector 24, it is possible to avoid forgetting to open the supply channel 100, thereby suppressing the occurrence of a printing defect due to a failure to supply the ink.

Although FIGS. 2 to 6 concerning the present embodiment do not illustrate the recovery pipe 35 provided with the recovery channel 35*a*, the recovery channel 35*a* may be configured to be openable and closable in conjunction with the first supply channel 34*a* by using the second flow channel coupling unit 40, the valve mechanism 80, and the displacement member 90. This makes it possible to keep the ink remaining in the recovery channel 35*a* from leaking when detaching the flow channel member 70 from the recording head 2. The first supply channel 34*a* and the recovery channel 35*a* may be closed and opened by using the single displacement member 90, or the first supply channel 34*a* and the recovery channel 35*a* may be closed and opened individually by using different displacement members 90. Meanwhile, the valve mechanism 80 that closes and opens the first supply channel 34*a* may serve as a valve mechanism that closes and opens the recovery channel 35*a*, or different valve mechanisms 80 may be used to conduct closing and opening operations individually. Nevertheless, the ink inside the recovery channel 35*a* hardly leaks after detachment of the recovery channel 35*a* from the recording head 2 as long as a negative pressure directed toward the second liquid storage unit 32 is applied to the ink inside the recovery channel 35*a*. In this regard, the valve mechanism 80 for closing the recovery channel 35*a* and the displacement member 90 need not be provided.

As described above, the ink jet recording apparatus 1 that represents an example of the liquid ejecting apparatus according to the Embodiment 1 of the present disclosure includes the recording head 2 being the liquid ejecting head to eject the ink being the liquid, and the flow channel member 70. The flow channel member 70 includes the second flow channel coupling unit 40 being the flow channel coupling member to be detachably coupled to the recording head 2, the first supply channel 34*a* being the supply channel coupled to the second supply channel 41 serving as the flow channel inside the second flow channel coupling unit 40, and the displacement member 90 being displaceable between the closing position at which the displacement member 90 closes the first supply channel 34*a* and the opening position at which the displacement member 90 opens the first supply channel 34*a*. When the displacement member 90 is located at the opening position, the displacement member 90 restricts disconnection of the coupling between the recording head 2 and the second flow channel coupling unit 40. When the displacement member 90 is located at the closing position, the displacement member 90 does not restrict disconnection of the coupling between the recording head 2 and the second flow channel coupling unit 40. Since the coupling between the recording head 2 and the second flow channel coupling unit 40 is disconnected only when the displacement member 90 is located at the closing position at which the displacement member 90 closes the first supply channel 34*a*, it is possible to suppress the disconnection of the coupling between the recording head 2 and the second flow channel coupling unit 40 in the state where the first supply channel 34*a* is open. Accordingly, the ink inside the first supply channel 34*a* can be kept from leaking when the coupling between the recording head 2 and the second flow channel coupling unit 40 is disconnected.

Meanwhile, the ink jet recording apparatus 1 of the present embodiment further includes the cover member 60 that can define the housing space 61 in which the second flow channel coupling unit 40 being the flow channel coupling member is housed between the cover member 60 and the recording head 2 being the liquid ejecting head. Moreover, the displacement member 90 is provided outside of the housing space 61. Here, the displacement member 90 preferably restricts the movement of the cover member 60 when the displacement member 90 is located at the opening position, and the displacement member 90 preferably enables the movement of the cover member 60 when the displacement member 90 is located at the closing position. According to this configuration, the coupling between the recording head 2 and the second flow channel coupling unit 40 cannot be disconnected without moving the cover member 60, and it is therefore possible to suppress the disconnection of the coupling between the recording head 2 and the second flow channel coupling unit 40 with the simple mechanism and in the state where the first supply channel 34*a* is open.

Meanwhile, in the ink jet recording apparatus 1 of the present embodiment, the cover member 60 includes the opening 62 that enables passages of the displacement member 90. The displacement member 90 overlaps the cover member 60 as viewed in the Z-axis direction being the direction of insertion and extraction of the second flow channel coupling unit 40 being the flow channel coupling member when the displacement member 90 is located at the opening position. Meanwhile, the displacement member 90 is preferably located within the inner periphery of the opening 62 of the cover member 60 as viewed in the Z-axis direction when the displacement member 90 is located at the closing position. According to this configuration, the displacement member 90 restricts and enables the movement of the cover member 60. Thus, the cover member 60 can restrict and enable the disconnection of the coupling between the second flow channel coupling unit 40 and the recording head 2.

The ink jet recording apparatus 1 of the present embodiment further includes the flexible cable 51, which is the wiring member detachably attached to the recording head 2 being the liquid ejecting head and electrically coupled to the recording head 2. The recording head 2 includes the first connector 24, which is the connector disposed in the housing space 61 and electrically coupled to the flexible cable 51. The first connector 24 is exposed to the outside of the cover member 60 through the opening 62 of the cover member 60. Moreover, the displacement member 90 being located at the closing position preferably overlaps the first connector 24 as viewed in the +Z direction being the direction of insertion of the flexible cable 51. According to this configuration, the flexible cable 51 cannot be attached to the first connector 24 unless the displacement member 90 is moved from the closing position to the opening position after the second flow channel coupling unit 40 is coupled to the recording head 2. Thus, it is possible to avoid forgetting to open the first supply channel 34*a*, thereby suppressing a printing defect due to a failure to supply the ink.

Meanwhile, the ink jet recording apparatus 1 of the present embodiment preferably includes the support member 7 that supports the recording head 2 being the liquid ejecting head, and the third fixation member 113 being the fixation member for fixing the recording head 2 and the cover member 60 to the support member 7 such that the recording head 2 is interposed between the cover member 60 and the support member 7. According to this configuration, the recording head 2 can be fixed to the support member 7 and the cover member 60 can be fixed to the recording head 2 by using the third fixation member 113. Thus, it is possible to reduce costs by decreasing the number of components and decreasing assembly procedures.

Embodiment 2

Figure 15:
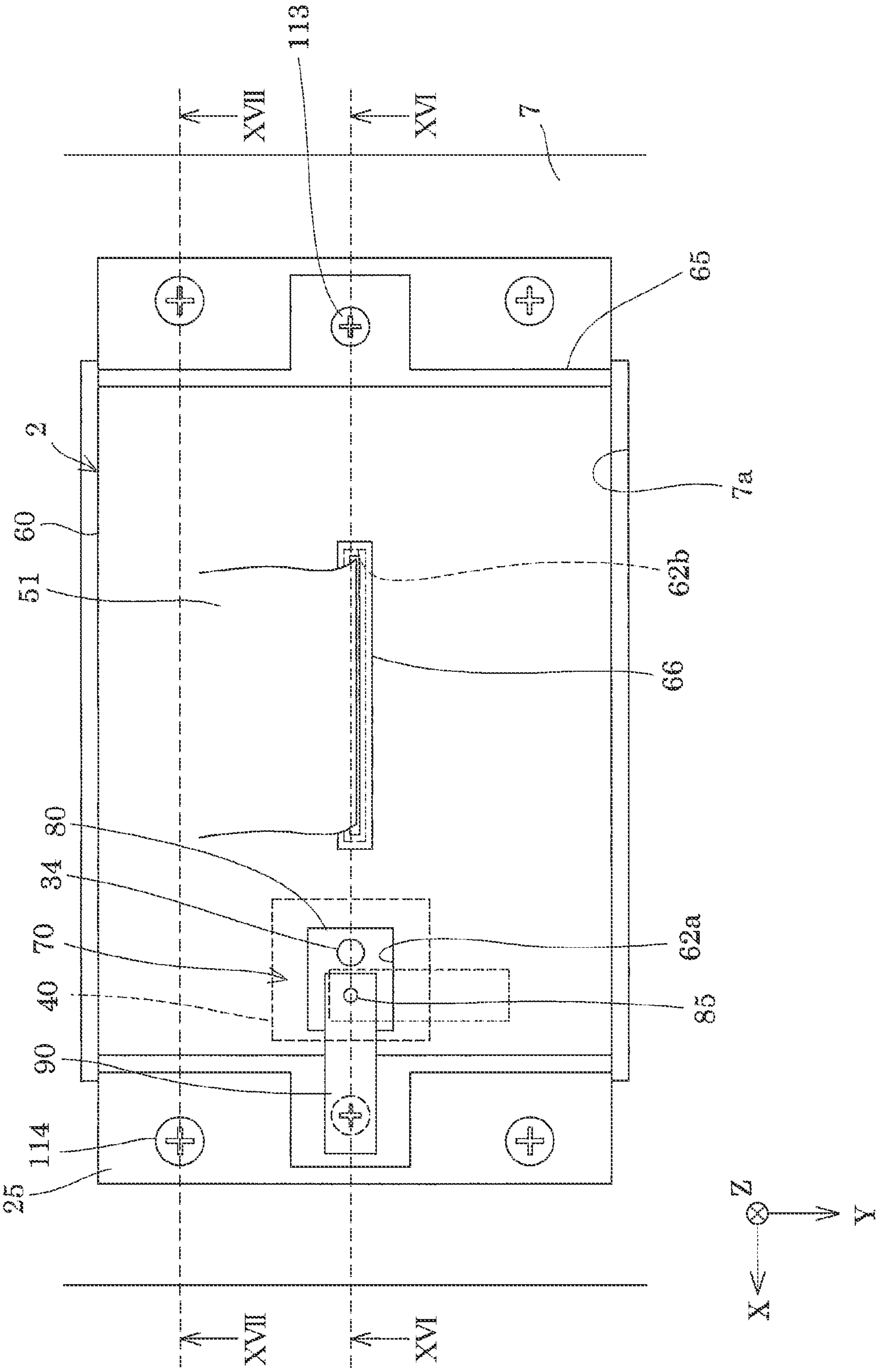
FIG. 15 is a plan view of a substantial part of a recording apparatus according to Embodiment 2.
Figure 16:
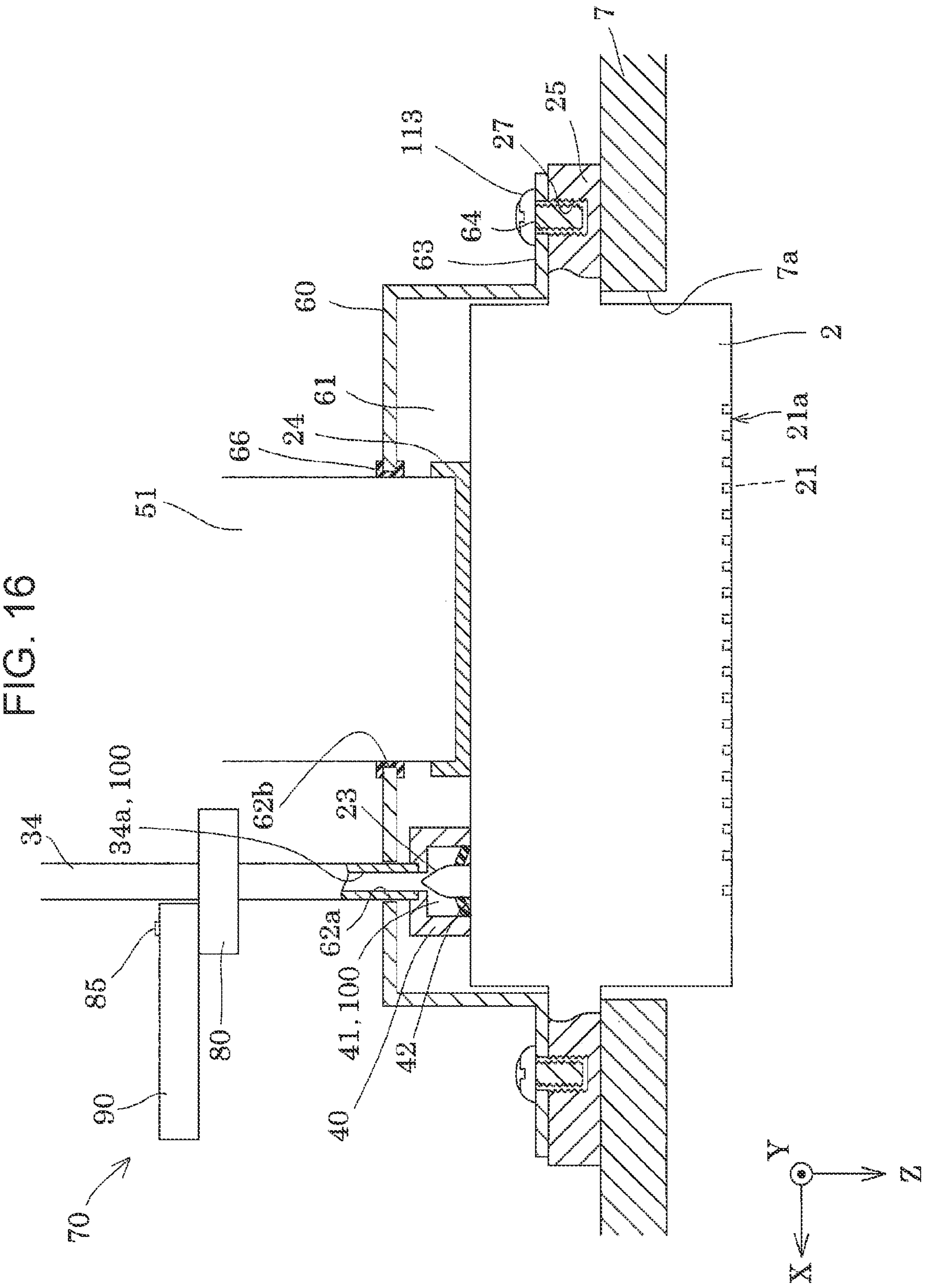
FIG. 16 is a cross-sectional view of the substantial part of the recording apparatus according to the Embodiment 2.
Figure 17:
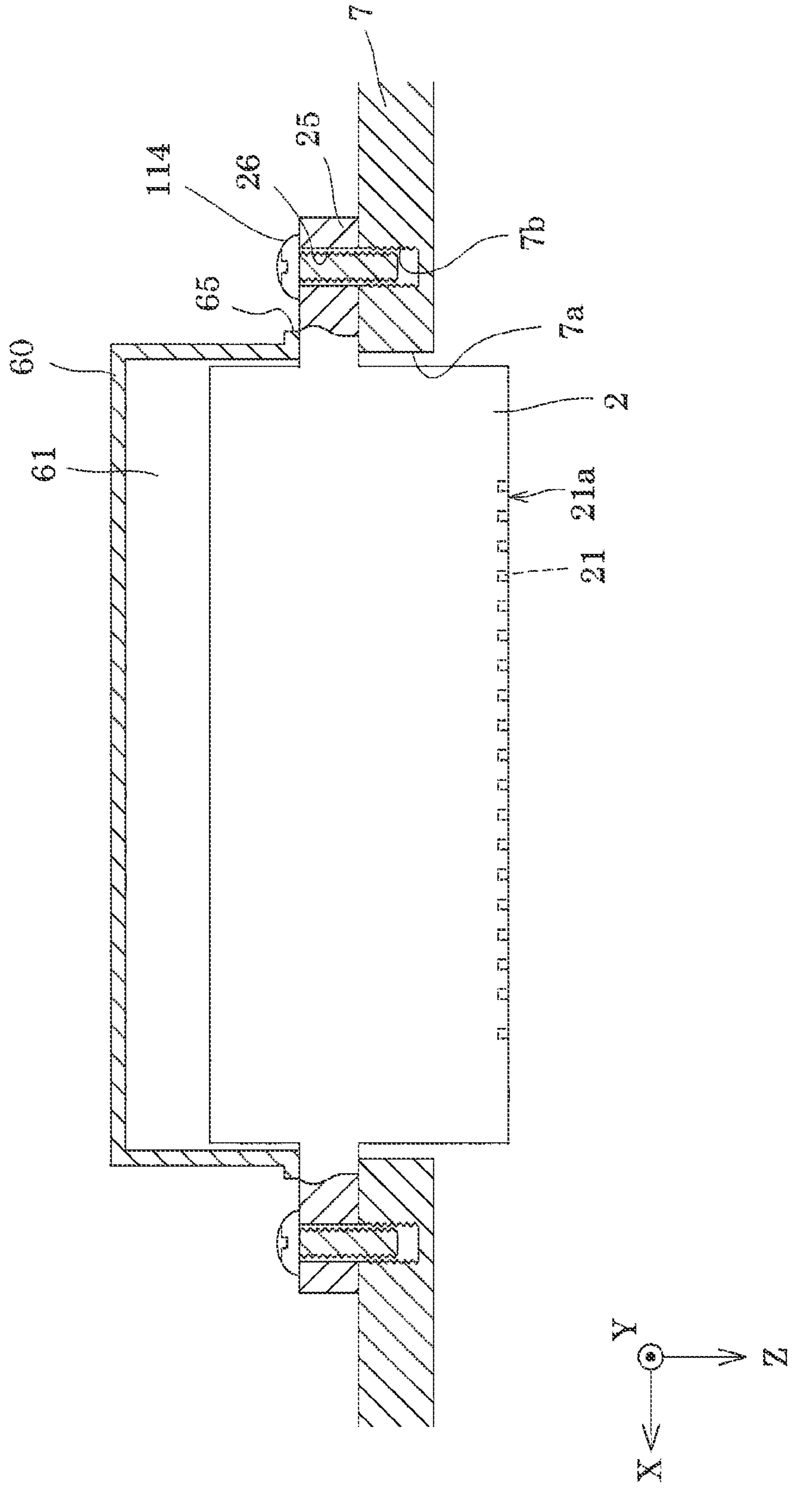
FIG. 17 is another cross-sectional view of the substantial part of the recording apparatus according to the Embodiment 2.

FIG. 15 is a plan view of the recording head 2, the flow channel member 70, and the wiring member of Embodiment 2 of the present disclosure as viewed in the +Z direction. FIG. 16 is a cross-sectional view taken along line XVI-XVI in FIG. 15. FIG. 17 is a cross-sectional view taken along line XVII-XVII in FIG. 15. Note that the same constituents as those in the above-described embodiment will be denoted by the same reference signs and overlapping explanations will be omitted.

As illustrated in FIGS. 15 to 17, the recording head 2 is fixed to the support member 7 by using fourth fixation members 114. The recording head 2 is fixed to the support member 7 by inserting the fourth fixation members 114 of the present embodiment into the first through holes 26 in the recording head 2 and bringing the fourth fixation members 114 into engagement with the first fixation holes 7*b* in the support member 7. The above-described fourth fixation member 114 is formed from a male screw while the first fixation hole 7*b* is formed from a female screw in which screw threads to be engaged with the fourth fixation member 114 are helically formed on an inner peripheral surface thereof. In the present embodiment, a total of four first through holes 26 are provided in two pairs to the respective first flange units 25. Meanwhile, four fourth fixation members 114 and four first fixation holes 7*b* are provided as many as the first through holes 26. Moreover, a second fixation hole 27 for fixing the cover member 60 is provided to each first flange unit 25 of the recording head 2. The second fixation hole 27 is disposed between the two first through holes 26 in the Y-axis direction.

Cutout portions 65 for exposing the fourth fixation members 114 in the −Z direction are provided to the second flange portions 63 of the cover member 60. Specifically, the cutout portions 65 are provided to an end portion in the +Y direction and an end portion in the −Y direction of each of the second flange portions 63. Meanwhile, the second through hole 64 is provided to each second flange portion 63 of the cover member 60. The second through hole 64 is disposed between the two cutout portions 65 in the Y-axis direction, which is disposed as such a position that overlaps the second fixation hole 27 as viewed in the Z-axis direction when the −Z direction side of the recording head 2 is covered with the cover member 60.

In the above-described cover member 60, the third fixation members 113 are inserted into the second through holes 64 and engaged with the second fixation holes 27 of the recording head 2. Thus, the cover member 60 is fixed to the recording head 2. The above-described third fixation member 113 is formed from a male screw while the second fixation hole 27 is formed from a female screw in which screw threads to be engaged with the third fixation member 113 are helically formed on an inner peripheral surface thereof. Detachment of the cover member 60 from the recording head 2 is carried out by releasing engagement between each third fixation member 113 and the corresponding second fixation hole 27 and then moving the cover member 60 in the −Z direction relative to the recording head 2. In other words, the direction of detachment of the cover member 60 from the recording head 2 is the −Z direction.

Meanwhile, the housing space 61 is defined between the cover member 60 and the recording head 2. Moreover, the cover member 60 is provided with a first opening 62*a* passing through the cover member 60 in the Z-axis direction so as to enable insertion of the supply pipe 34 from outside into the housing space 61, and a second opening 62*b* passing through the cover member 60 in the Z-axis direction so as to enable insertion of the flexible cable 51 from outside into the housing space 61. In the present embodiment, the first opening 62*a* and the second opening 62*b* are independently provided. Instead, the first opening 62*a* and the second opening 62*b* may be formed from a single opening in common as with the above-described Embodiment 1. However, by independently providing the first opening 62*a* and the second opening 62*b* as in the present embodiment, it is possible to suppress intrusion of paper powder, dust, ink mist, and the like from the opening into the housing space 61 by providing a relatively small opening area. It is preferable to press fit the supply pipe 34 into the first opening 62*a*. Moreover, it is preferable to provide a flexible second sealing member 66 in a gap between the inner periphery of the second opening 62*b* and the outer periphery of the flexible cable 51 so as to seal this gap. As described above, by press fitting the supply pipe 34 into the first opening 62*a* and providing the second sealing member 66 in the gap between the flexible cable 51 and the second opening 62*b* as described above, it is possible to further suppress intrusion of paper powder, dust, ink mist, and the like into the housing space 61 through the first opening 62*a* and the second opening 62*b*.

The flow channel member 70 includes the supply pipe 34, the second flow channel coupling unit 40, a valve mechanism 80, and a displacement member 90.

The supply pipe 34 is formed from the flexible tube provided with the first supply channel 34*a* inside thereof.

The second flow channel coupling unit 40 is coupled to the supply pipe 34, and is provided with the second supply channel 41 in the inside, which communicates with the first supply channel 34*a*. The supply channel 100 is formed from the first supply channel 34*a* and the second supply channel 41. Meanwhile, the first sealing member 42 is provided at the end portion in the +Z direction of the second supply channel 41 of the second flow channel coupling unit 40. The first flow channel coupling unit 23 of the recording head 2 is inserted into the first sealing member 42, thus communicating with the second supply channel 41. In other words, the direction of insertion and extraction of the second flow channel coupling unit 40 is set to the Z-axis direction.

Meanwhile, the second flow channel coupling unit 40 is disposed in the housing space 61. The valve mechanism 80 and the displacement member 90 are disposed on the outside of the housing space 61. In other words, the valve mechanism 80 and the displacement member 90 are disposed on the outside of the housing space 61 of the supply pipe 34 while providing a gap with the cover member 60 in the Z-axis direction.

Here, the opening position of the displacement member 90 to open the first supply channel 34*a* is a position indicated by a solid line in FIG. 15, where the displacement member 90 overlaps the third fixation member 113 as viewed in the Z-axis direction. Thus, the displacement member 90 restricts access to the third fixation member 113.

Meanwhile, the closing position of the displacement member 90 to close the first supply channel 34*a* is a position indicated by a dashed line in FIG. 15, where the displacement member 90 does not overlap the third fixation member 113 as viewed in the Z-axis direction. Thus, the displacement member 90 enables access to the third fixation member 113.

Here, the direction of insertion of the third fixation member 113 into the second through hole 64 is the +Z direction while the direction of extraction thereof is the −Z direction. In other words, the direction of insertion and extraction of the third fixation member 113 to and from the second through hole 64 is set to the Z-axis direction. Moreover, the state where the displacement member 90 restricts access to the third fixation member 113 entails a state where the displacement member 90 is located in the −Z direction being the direction of extraction of the third fixation member 113 from the second through hole 64 and the displacement member 90 makes it difficult to touch the third fixation member 113 from the −Z direction side either directly or by using a tool.

On the other hand, the state where the displacement member 90 enables access to the third fixation member 113 entails a state where the displacement member 90 is not located in the −Z direction being the direction of extraction of the third fixation member 113 from the second through hole 64 so that it is possible to touch the third fixation member 113 from the −Z direction side either directly or by using a tool.

Figure 18:
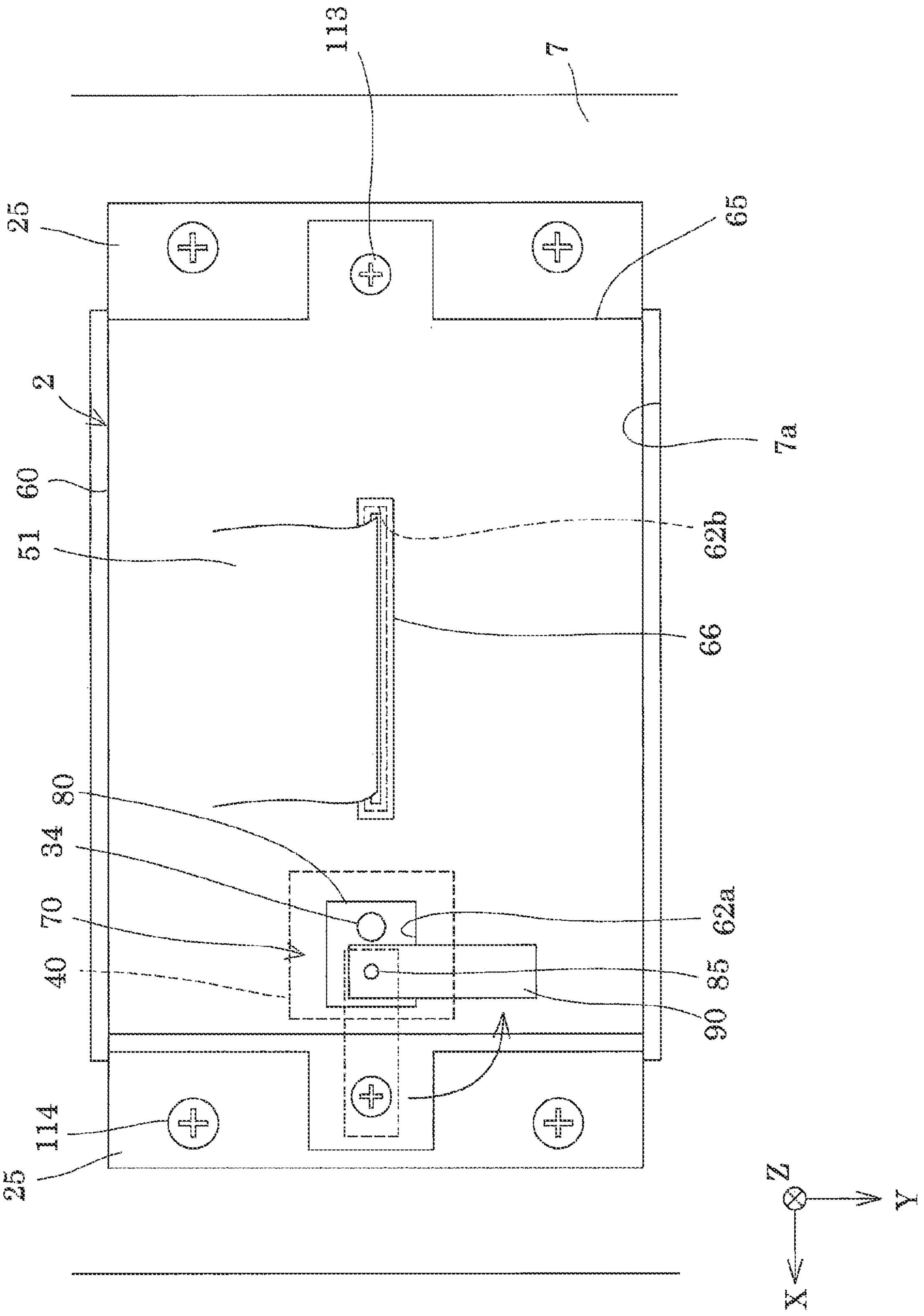
FIG. 18 is a plan view for explaining a method of detaching a flow channel member and the like according to the Embodiment 2.
Figure 19:
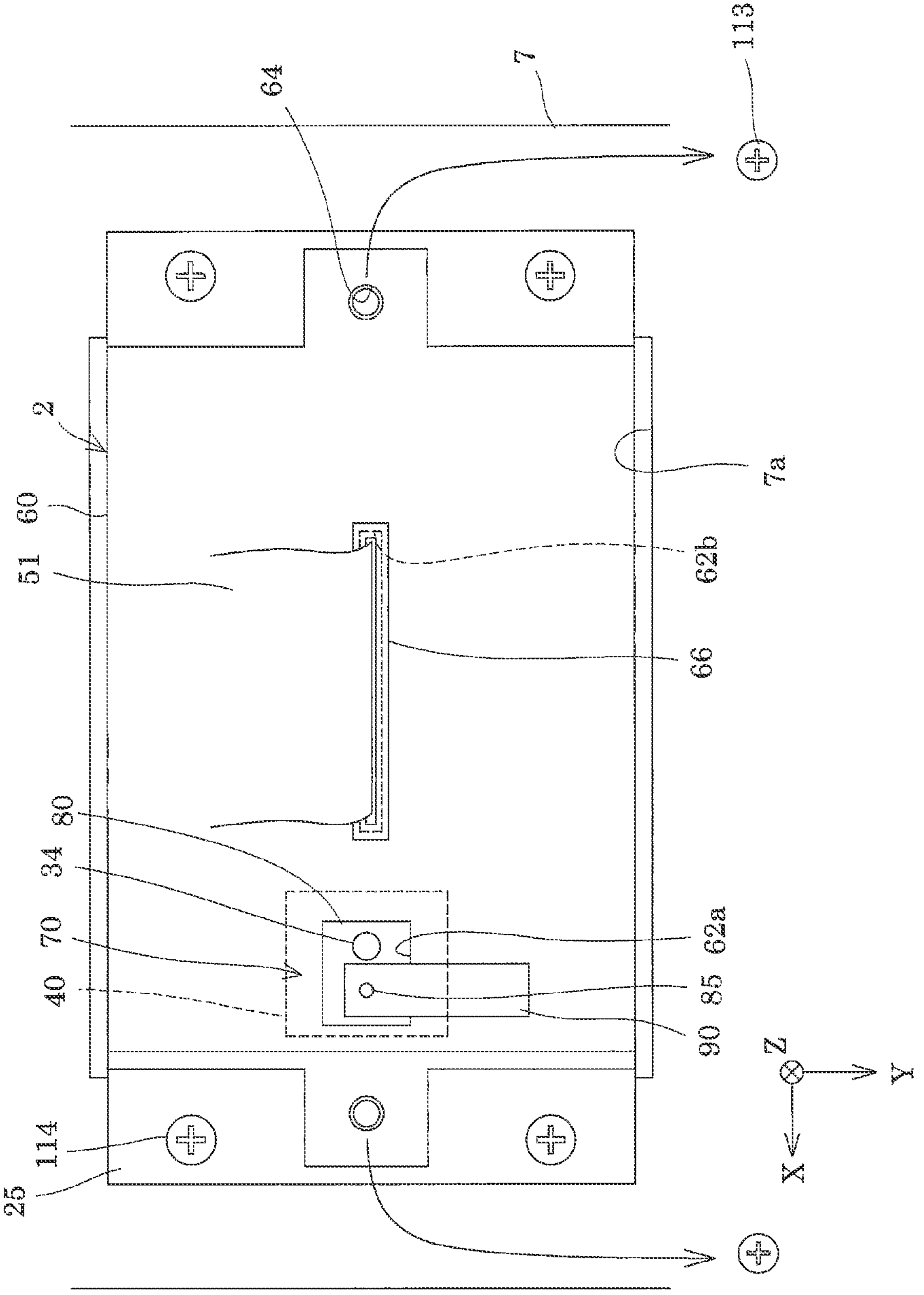
FIG. 19 is another plan view for explaining the method of detaching the flow channel member and the like according to the Embodiment 2.
Figure 20:
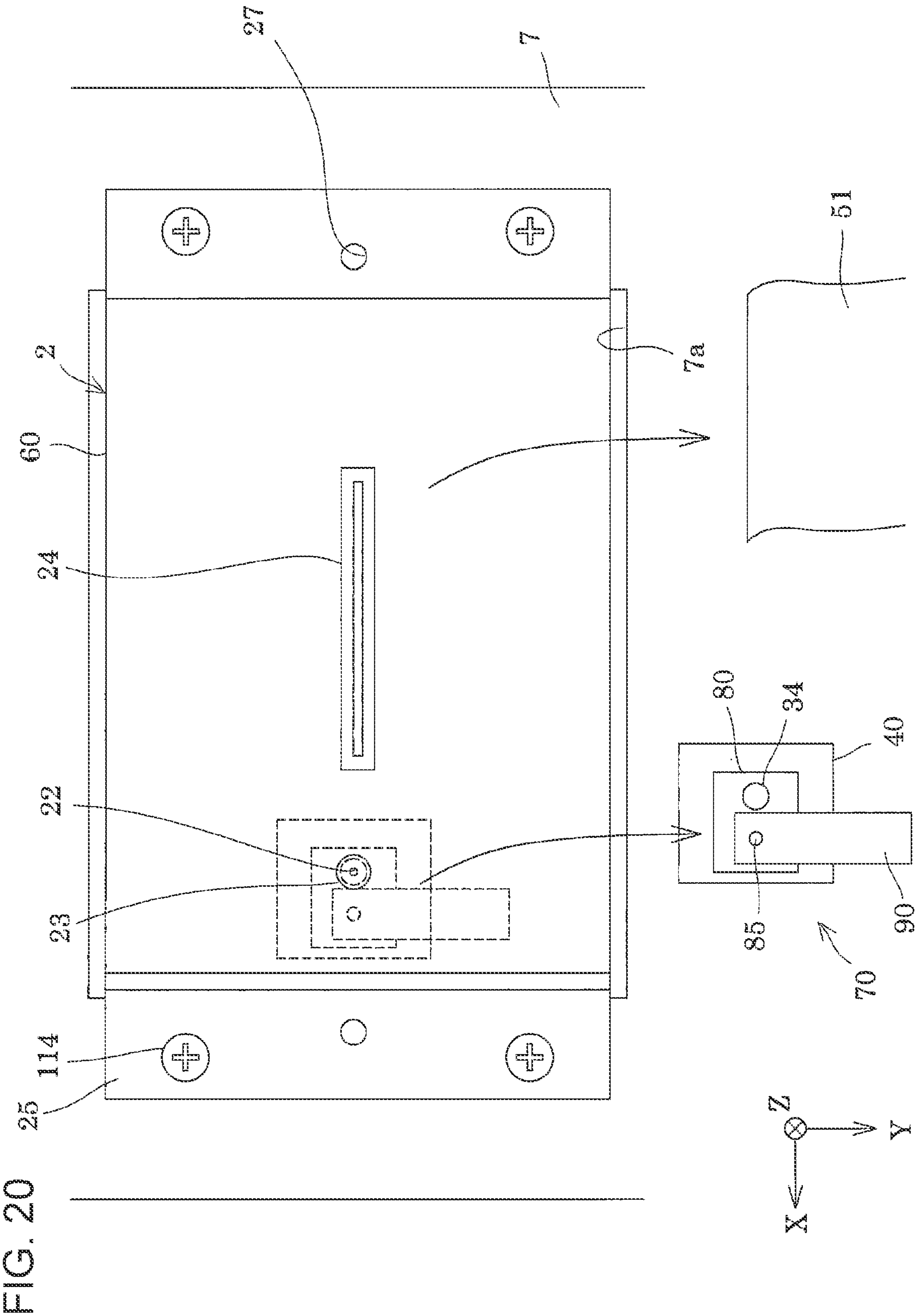
FIG. 20 is another plan view for explaining the method of detaching the flow channel member and the like according to the Embodiment 2.

A method of detaching the flow channel member 70 and the flexible cable 51 from the recording head 2 in the above-described ink jet recording apparatus 1 of the present embodiment will be described with reference to FIGS. 18 to 24. Here, FIGS. 18 to 20 are plan views which are viewed in the +Z direction for explaining the method of detaching the flow channel member 70 and the flexible cable 51 from the recording head 2. FIGS. 21 to 24 are cross-sectional views for explaining the method of detaching the flow channel member 70 and the flexible cable 51 from the recording head 2.

Figure 21:
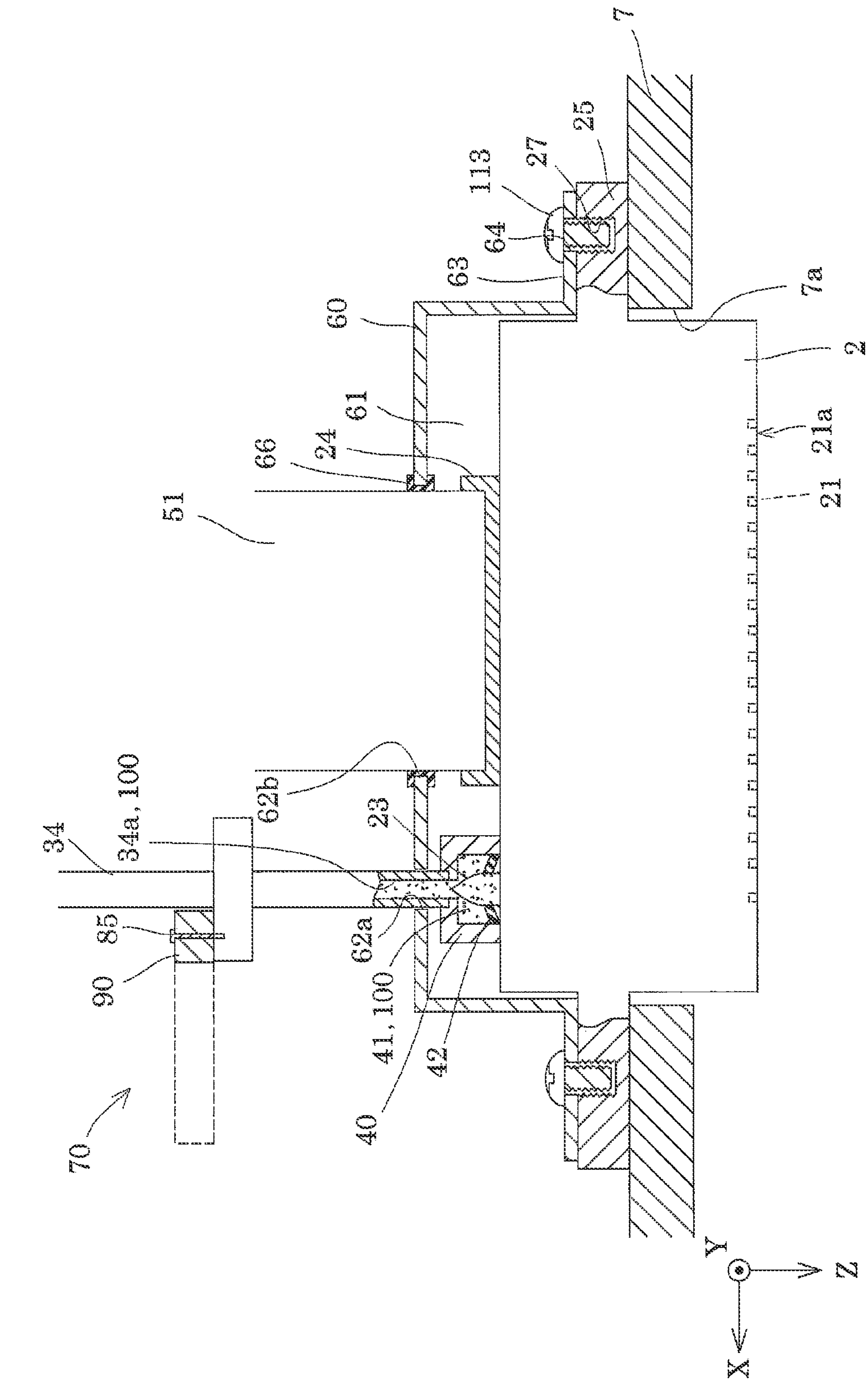
FIG. 21 is a cross-sectional view for explaining the method of detaching the flow channel member and the like according to the Embodiment 2.

First, the displacement member 90 is moved to the closing position as illustrated in FIGS. 18 and 21. Thus, the third fixation member 113 is exposed in the −Z direction being the direction of extraction from the second fixation hole 27 so that the third fixation member 113 is accessible in the state where the supply channel 100 is closed by the valve mechanism 80.

Figure 22:
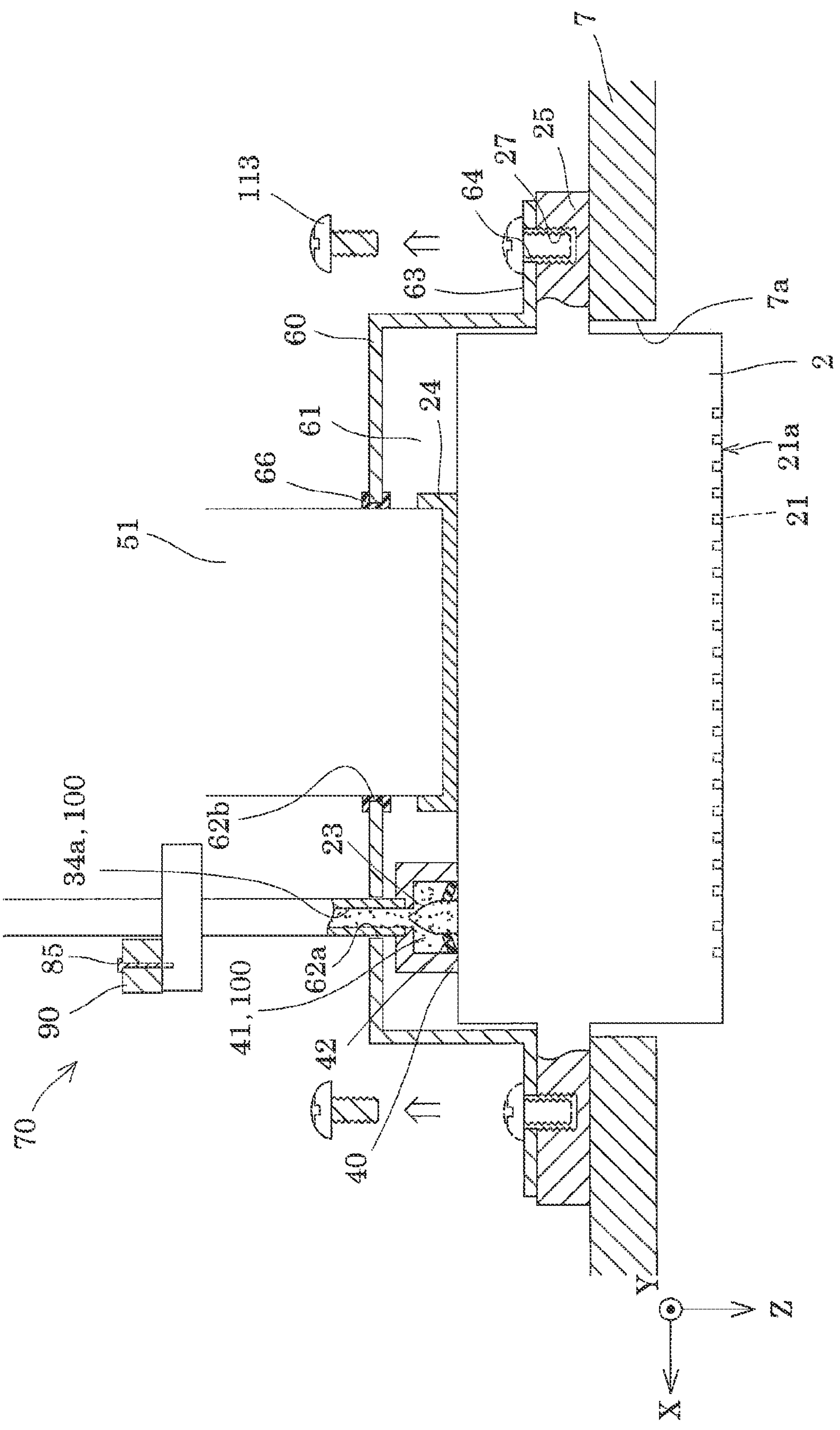
FIG. 22 is another cross-sectional view for explaining the method of detaching the flow channel member and the like according to the Embodiment 2.

Next, the engagement between the third fixation member 113 and the second fixation hole 27 is released as illustrated in FIGS. 19 and 22. In other words, the third fixation member 113 is detached in the −Z direction from the second fixation hole 27 and the second through hole 64.

Figure 23:
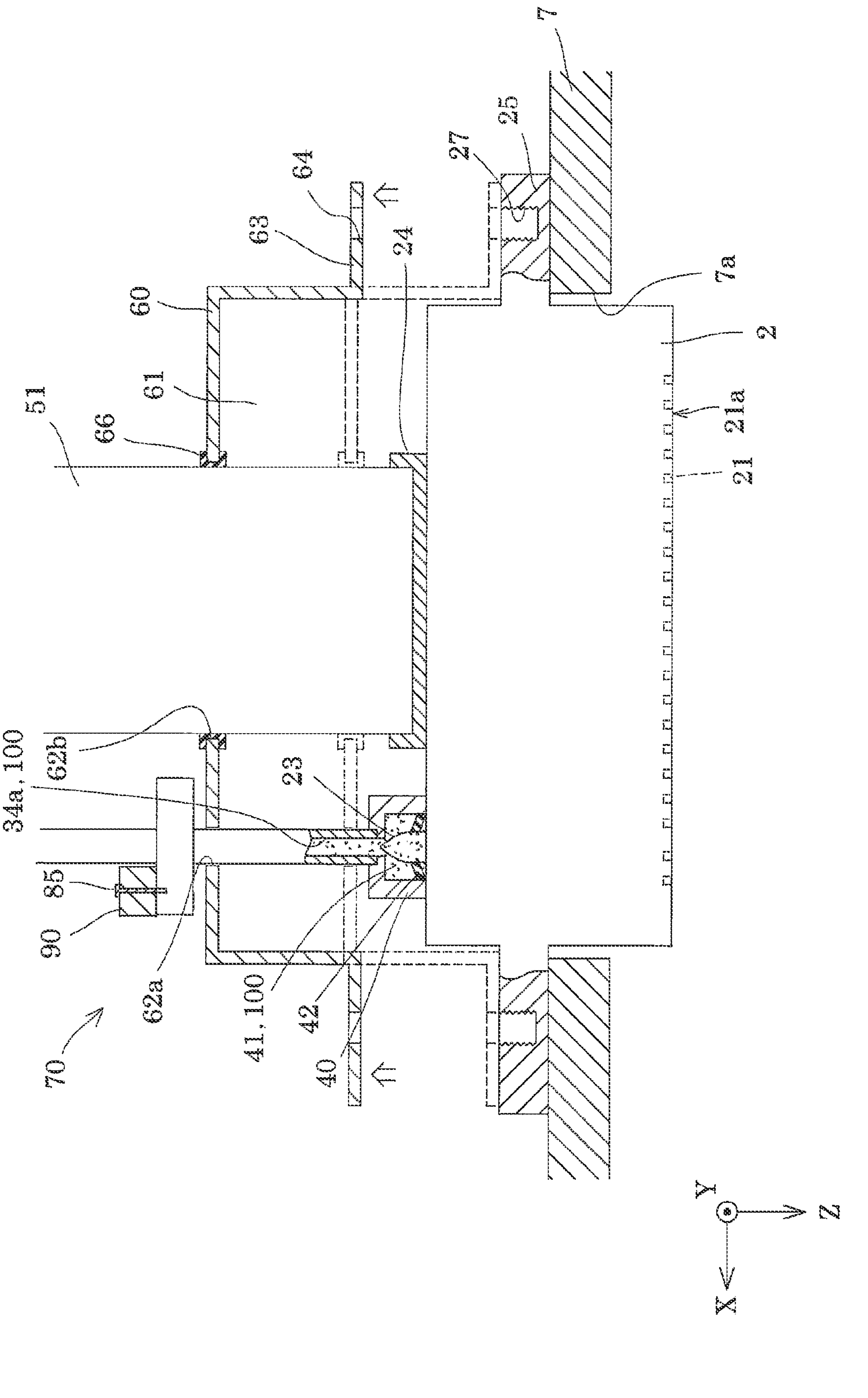
FIG. 23 is another cross-sectional view for explaining the method of detaching the flow channel member and the like according to the Embodiment 2.

Next, the cover member 60 is detached from the recording head 2 as illustrated in FIG. 23. In the present embodiment, the cover member 60 is moved in the −Z direction relative to the recording head 2, thereby spacing the cover member 60 in the −Z direction from the recording head 2.

Figure 24:
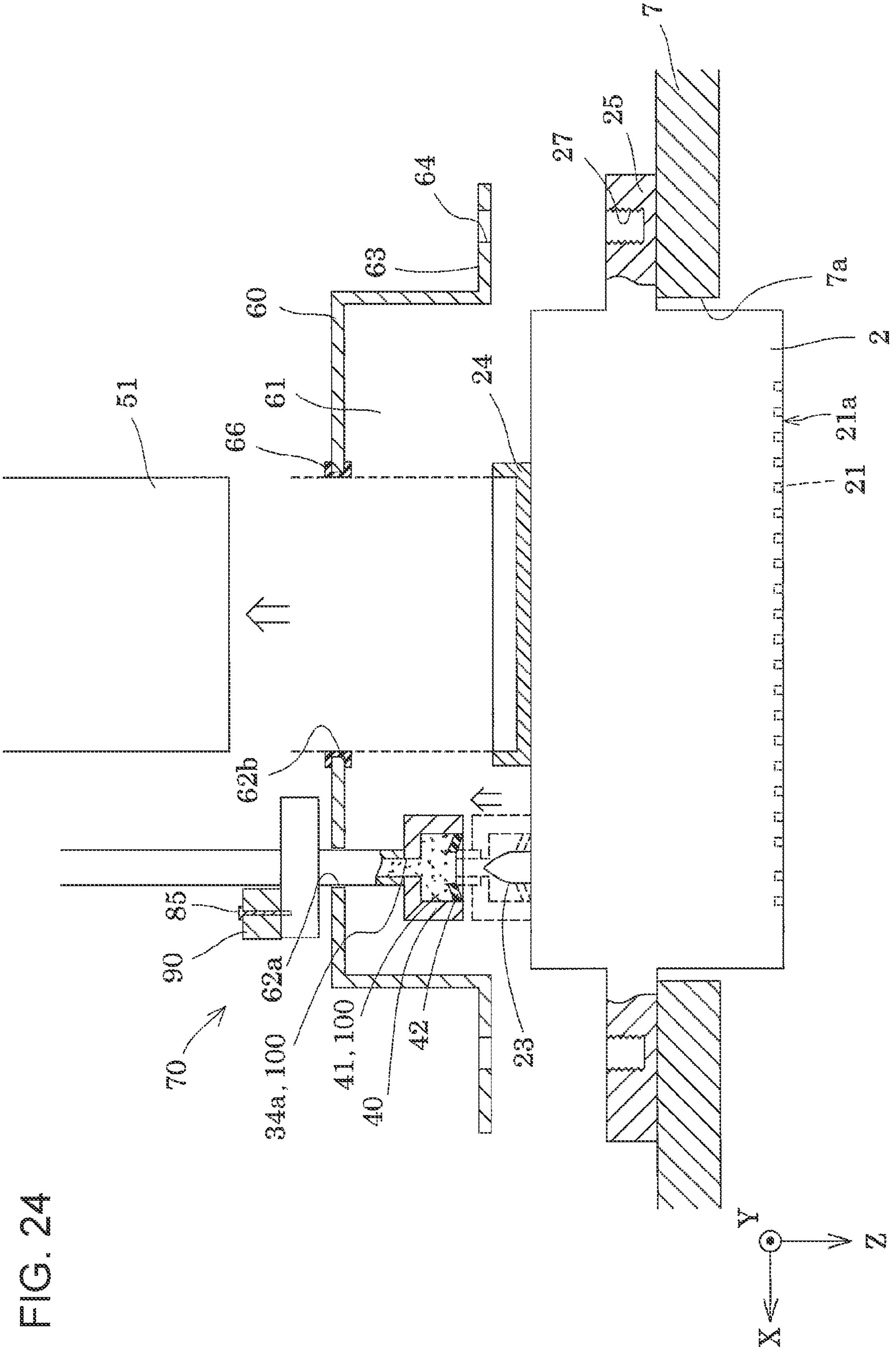
FIG. 24 is another cross-sectional view for explaining the method of detaching the flow channel member and the like according to the Embodiment 2.

Thereafter, the flow channel member 70 is detached from the recording head 2 and the flexible cable 51 is also detached as illustrated in FIGS. 20 and 24. Specifically, the second flow channel coupling unit 40 is detached from the first flow channel coupling unit 23 by moving the second flow channel coupling unit 40 in the −Z direction relative to the recording head 2. The flexible cable 51 is detached from the first connector 24 by moving the flexible cable 51 in the −Z direction relative to the recording head 2. In this instance, the supply channel 100 is closed by the valve mechanism 80. Accordingly, it is possible to keep the ink inside the supply channel 100 from leaking.

On the other hand, a method of attaching the flow channel member 70 and the flexible cable 51 to the recording head 2 after detaching the flow channel member 70 and the flexible cable 51 therefrom can be carried out in reverse order to the aforementioned method. Now, the method of attaching the flow channel member 70 and the flexible cable 51 to the recording head 2 will also be described with reference to FIGS. 19 to 24. While FIGS. 19 to 24 illustrate arrows that represent detachment of the respective components, these arrows should be directed to opposite orientations when attaching these components. Illustration of such reverse arrows is omitted therein.

First, the flow channel member 70 and the flexible cable 51 are attached to the recording head 2 in the state where the displacement member 90 is located at the closing position as illustrated in FIG. 24. Since the cover member 60 is detached from the recording head 2 in this instance, attachment of the flow channel member 70 and the flexible cable 51 to the recording head 2 is not restricted. Moreover, since the displacement member 90 is located at the closing position, the ink inside the supply channel 100 does not leak even when the ink remains inside the supply channel 100.

Next, the cover member 60 is attached to the recording head 2 while retaining the displacement member 90 at the closing position as illustrated in FIG. 23.

Next, as illustrated in FIGS. 19 and 22, the cover member 60 is fixed to the recording head 2 by using the third fixation members 113 while retaining the displacement member 90 at the closing position. Specifically, the cover member 60 is fixed to the recording head 2 by inserting the third fixation members 113 in the +Z direction into the second through holes 64, and bringing the third fixation members 113 into engagement with the second fixation holes 27. Since the displacement member 90 is located in the closing position in this instance, access to the third fixation members 113 is enabled so that the cover member 60 can be fixed to the recording head 2 by using the third fixation members 113.

Next, as illustrated in FIGS. 18 and 21, the displacement member 90 is moved from the closing position indicated by the solid line to the opening position indicated by the dashed line, thereby opening the supply channel 100 that has been closed by the valve mechanism 80. Thus, the displacement member 90 overlaps the third fixation members 113 as viewed in the Z-axis direction and access to the third fixation members 113 is restricted accordingly.

As described above, in the ink jet recording apparatus 1 of the present embodiment, it is not possible to detach the cover member 60 from the recording head 2 and to detach the flow channel member 70 from the recording head 2 without closing the supply channel 100 by setting the displacement member 90 to the closing position. Thus, the ink inside the supply channel 100 can be kept from leaking when detaching the flow channel member 70.

In the present embodiment, the third fixation member 113 is configured to fix the cover member 60 to the recording head 2. However, the present disclosure is not limited to this configuration. The third fixation member 113 may be configured to fix the cover member 60 to the support member 7 instead. Alternatively, as with the above-described Embodiment 1, the recording head 2 may be fixed to the support member 7 and the cover member 60 may be fixed to the recording head 2 by using the third fixation member 113 provided in common thereto.

As described above, the ink jet recording apparatus 1 that represents an example of the liquid ejecting apparatus according to the Embodiment 2 of the present disclosure includes the recording head 2 being the liquid ejecting head to eject the ink being the liquid, and the flow channel member 70. The flow channel member 70 includes the second flow channel coupling unit 40 being the flow channel coupling member to be detachably coupled to the recording head 2, the first supply channel **34*a* being the supply channel coupled to the second supply channel 41 serving as the flow channel inside the second flow channel coupling unit 40, and the displacement member 90 being displaceable between the closing position at which the displacement member 90 closes the first supply channel 34*a* and the opening position at which the displacement member 90 opens the first supply channel 34*a*. When the displacement member 90 is located at the opening position, the displacement member 90 restricts disconnection of the coupling between the recording head 2 and the second flow channel coupling unit 40. When the displacement member 90 is located at the closing position, the displacement member 90 does not restrict disconnection of the coupling between the recording head 2 and the second flow channel coupling unit 40. Since the coupling between the recording head 2 and the second flow channel coupling unit 40 is disconnected only when the displacement member 90 is located at the closing position at which the displacement member 90 closes the first supply channel 34*a*, it is possible to suppress the disconnection of the coupling between the recording head 2 and the second flow channel coupling unit 40 in the state where the first supply channel 34*a* is open. Accordingly, the ink inside the first supply channel 34*a* can be kept from leaking when the coupling between the recording head 2 and the second flow channel coupling unit 40** is disconnected.

Meanwhile, the ink jet recording apparatus 1 of the present embodiment includes the cover member 60 which can define the housing space 61 in which the second flow channel coupling unit 40 being the flow channel coupling member is housed between the cover member 60 and the recording head 2 being the liquid ejecting head. Meanwhile, the ink jet recording apparatus 1 includes the support member 7 that supports the recording head 2, and the third fixation member 113 for fixing the cover member 60 to at least one of the recording head 2 and the support member 7. Moreover, the displacement member 90 is provided outside of the housing space 61. Here, the displacement member 90 preferably restricts access to the third fixation member 113 when the displacement member 90 is located at the opening position, and the displacement member 90 preferably enables access to the third fixation member 113 when the displacement member 90 is located at the closing position. As described above, since the displacement member 90 restricts access to the third fixation member 113 when the displacement member 90 is located at the opening position, it is possible to suppress detachment of the cover member 60 from the recording head 2 in the state where the first supply channel **34*a* is open, and to suppress detachment of the second flow channel coupling unit 40 from the recording head 2**.

In the ink jet recording apparatus 1 of the present embodiment, the third fixation member 113 can be inserted into and extracted from the second through hole 64 formed in the cover member 60. Here, the displacement member 90 located at the opening position preferably overlaps the third fixation member 113 as viewed in the +Z direction being the direction of insertion of the third fixation member 113. This configuration makes it possible to restrict detachment of the third fixation member 113 and to restrict detachment of the cover member 60 and the second flow channel coupling unit 40 from the recording head 2 when the displacement member 90 is located at the opening position.

Meanwhile, the ink jet recording apparatus 1 of the present embodiment further includes the flexible cable 51, which is the wiring member detachably attached to the recording head 2 being the liquid ejecting head and electrically coupled to the recording head 2. The recording head 2 includes the first connector 24, which is the connector disposed in the housing space 61 and electrically coupled to the flexible cable 51. The first supply channel **34*a* is the flow channel formed inside the supply pipe 34 being the flexible tube. The cover member 60 preferably includes the first opening 62*a* into which the supply pipe 34 is press fitted, the second opening 62*b* into which the flexible cable 51 is inserted, and the second sealing member 66 being the flexible sealing member that seals the gap between the inner periphery of the second opening 62*b* and the outer periphery of the flexible cable 51. By press fitting the supply pipe 34 into the first opening 62*a* of the cover member 60 and providing the second sealing member 66 between the second opening 62*b* and the flexible cable 51, it is possible to suppress intrusion of dust such as paper powder, ink mist, and the like into the housing space 61 of the cover member 60. Moreover, it is possible to reduce costs by decreasing the number of components compared with the case of designing the cover member 60 as the member only having a function to restrict detachment of the flow channel member 70 from the recording head 2**.

In the ink jet recording apparatus 1 of the present embodiment, the third fixation member 113 preferably fixes the recording head 2 and the cover member 60 to the support member 7 such that the recording head 2 being the liquid ejecting head is interposed between the cover member 60 and the support member 7. According to this configuration, the recording head 2 can be fixed to the support member 7 and the cover member 60 ca be fixed to the recording head 2 by using the third fixation member 113. Thus, it is possible to reduce costs by decreasing the number of components and decreasing assembly procedures.

Embodiment 3

Figure 25:
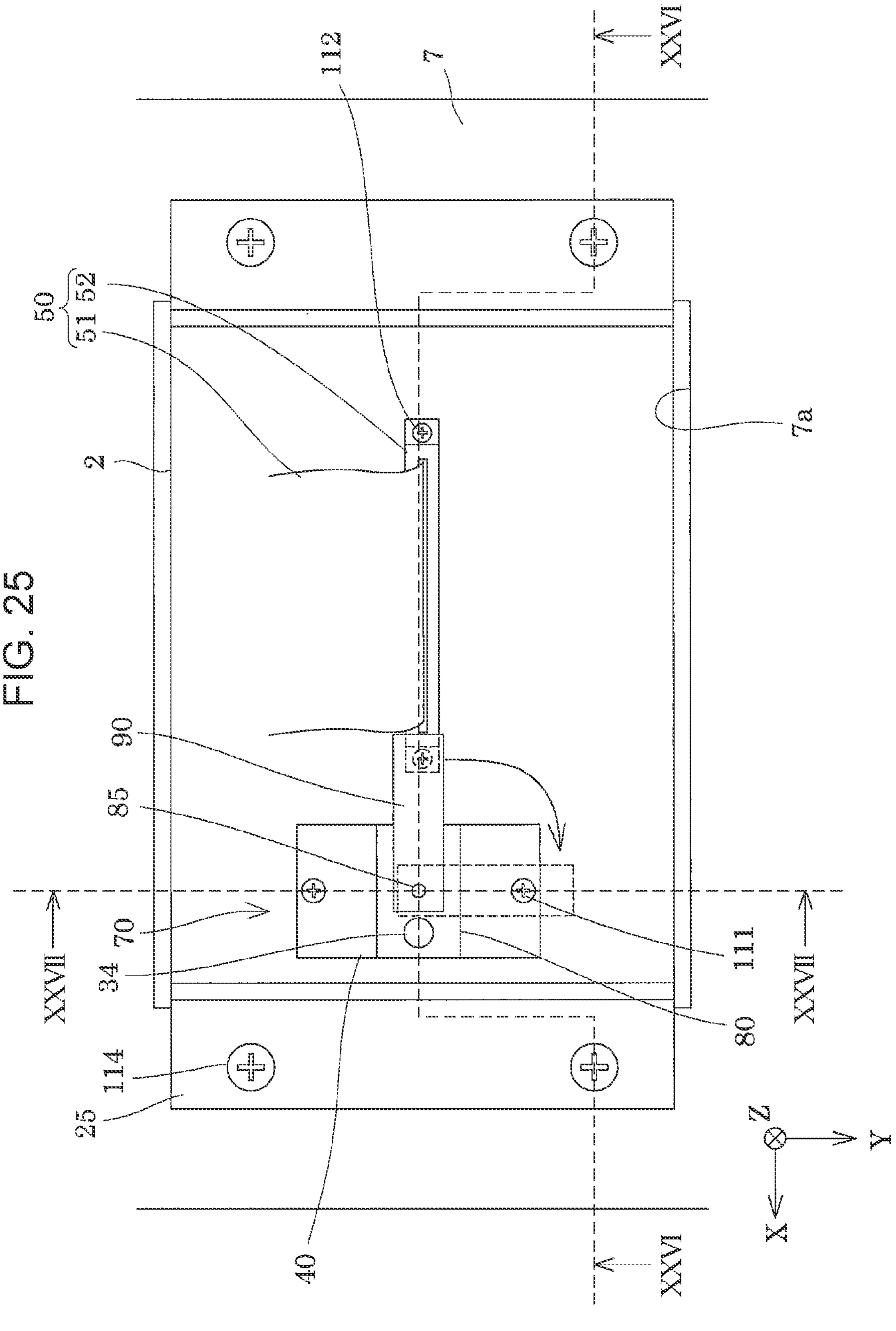
FIG. 25 is a plan view of a substantial part of a recording apparatus according to Embodiment 3.
Figure 26:
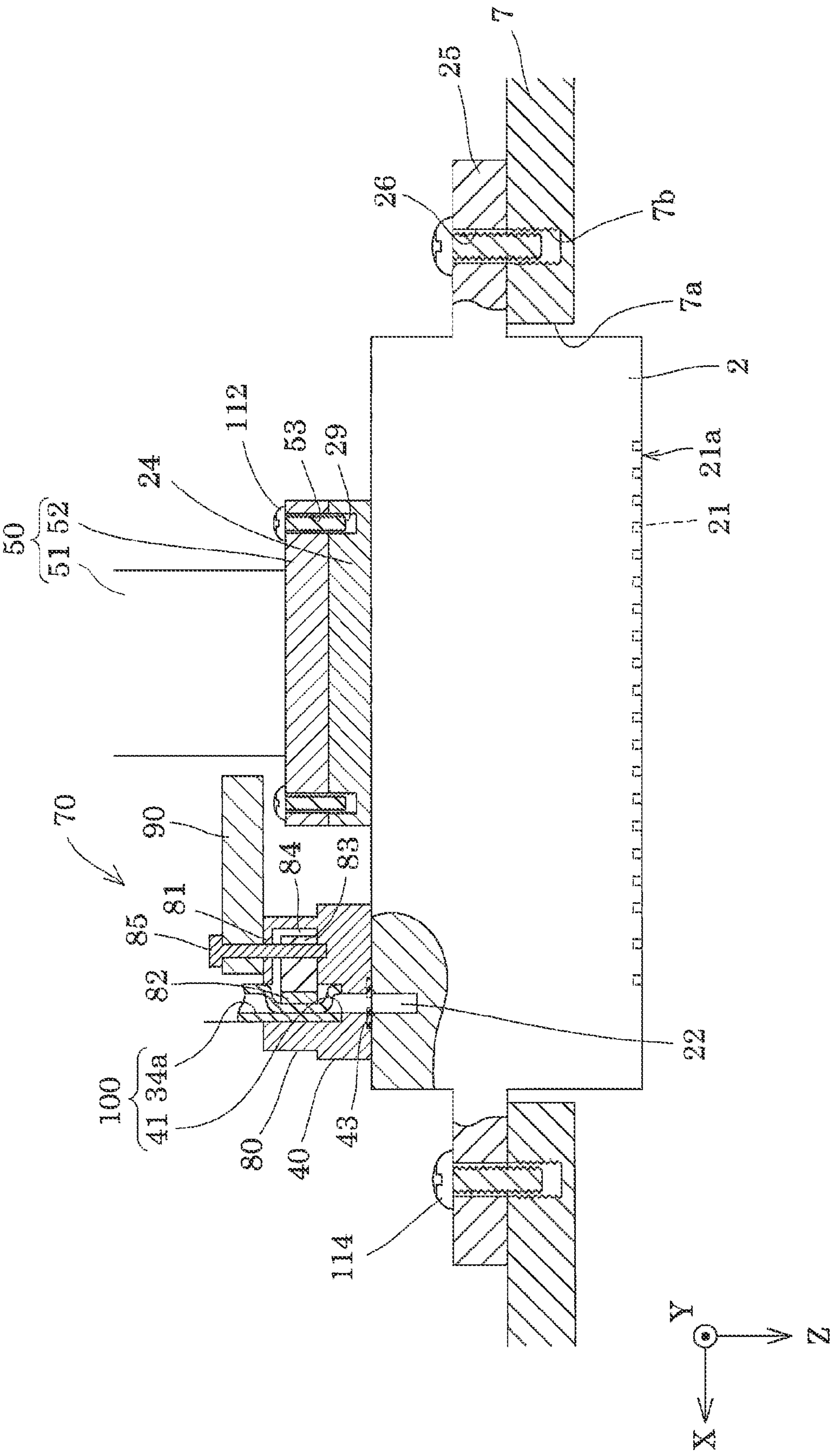
FIG. 26 is a cross-sectional view of the substantial part of the recording apparatus according to the Embodiment 3.
Figure 27:
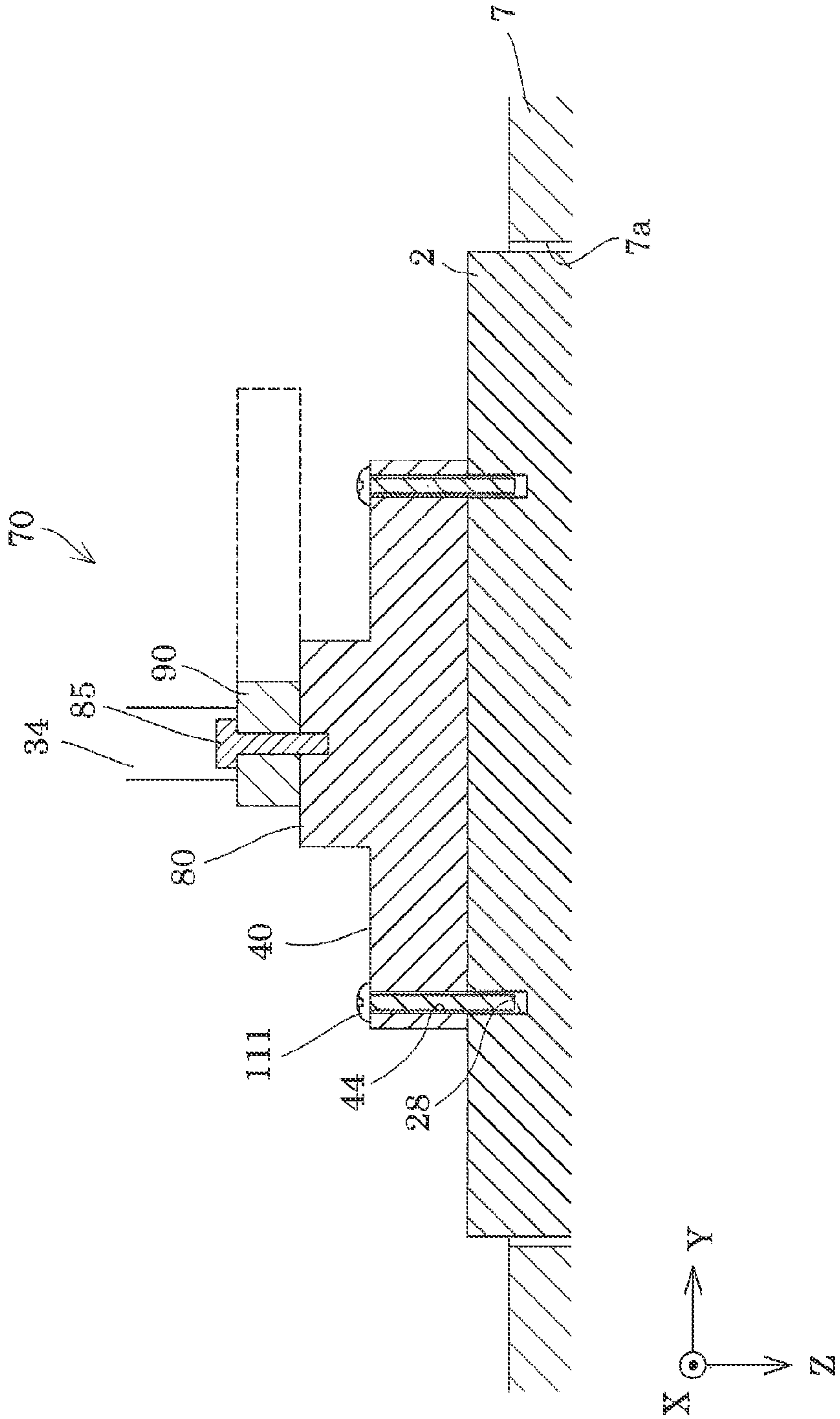
FIG. 27 is another cross-sectional view of the substantial part of the recording apparatus according to the Embodiment 3.

FIG. 25 is a plan view of the recording head 2, the flow channel member 70, and the wiring member 50 of Embodiment 3 of the present disclosure as viewed in the +Z direction. FIG. 26 is a cross-sectional view of a substantial part taken along line XXVI-XXVI in FIG. 25. FIG. 27 is a cross-sectional view of a substantial part taken along line XXVII-XXVII in FIG. 25. Note that the same constituents as those in the above-described embodiment will be denoted by the same reference signs and overlapping explanations will be omitted.

As illustrated in FIGS. 25 to 26, the ink jet recording apparatus 1 of the present embodiment includes the recording head 2, the flow channel member 70, and a wiring member 50.

As with the Embodiment 2, the recording head 2 is fixed to the support member 7 by using the fourth fixation members 114. In other words, the recording head 2 is fixed to the support member 7 by inserting the fourth fixation members 114 of the present embodiment into the first through holes 26 in the recording head 2 and bringing the fourth fixation members 114 into engagement with the first fixation holes **7*b* in the support member 7**.

The flow channel member 70 includes the supply pipe 34, the second flow channel coupling unit 40, a valve mechanism 80, and a displacement member 90.

The second flow channel coupling unit 40 includes the second supply channel 41 to be coupled to the first flow channel 22 of the recording head 2. The second supply channel 41 is provided passing through the second flow channel coupling unit 40 in the Z-axis direction, and an end portion of the second supply channel 41 communicates with the first supply channel **34*a* provided inside the supply pipe 34. The supply channel 100 of the present embodiment includes the first supply channel 34*a* and the second supply channel 41. Meanwhile, another end portion of the second supply channel 41 communicates with the first flow channel 22 that is open in the −Z direction of the recording head 2. Here, the first flow channel 22 is provided to be open on the surface in the −Z direction of the recording head 2. In the present embodiment, this opening of the first flow channel 22 corresponds to a first flow channel coupling unit. This opening of the first flow channel 22 and the opening of the second supply channel 41 of the second flow channel coupling unit 40 communicate with each other, thereby establishing communication between the supply channel 100 and the first flow channel 22. Meanwhile, a flexible third sealing member 43 is provided between an opening edge portion of the second supply channel 41 of the second flow channel coupling unit 40 and an opening edge portion of the first flow channel 22 of the recording head 2. The supply channel 100 is coupled to the first flow channel 22 in a liquid-tight manner by using the third sealing member 43**.

Moreover, the second flow channel coupling unit 40 includes third through holes 44 that pass through the second flow channel coupling unit 40 in the Z-axis direction. In the present embodiment, a total of two third through holes 44 are provided on the respective two end portions in the Y-axis direction. Meanwhile, third fixation holes 28 are provided in a surface in the −Z direction of the recording head 2. Moreover, the second flow channel coupling unit 40 is fixed to the recording head 2 by inserting first fixation members 111 in the +Z direction into the third through holes 44 and bringing the first fixation members 111 into engagement with the third fixation holes 28. In other words, a direction of insertion and extraction of the first fixation member 111 to and from the second flow channel coupling unit 40 is set to the Z-axis direction. In the present embodiment, this first fixation member is formed from a male screw while the third fixation hole 28 is formed from a female screw in which screw threads to be engaged with the first fixation member 111 are helically formed on an inner peripheral surface thereof. The second flow channel coupling unit 40 is fixed to the recording head 2 through the third sealing member 43 by using the above-described first fixation members 111.

The valve mechanism 80 is formed integrally with the second flow channel coupling unit 40 on the −Z direction side of the second flow channel coupling unit 40. The valve mechanism 80 is the same as the one in the above-described Embodiment 1, and overlapping explanations thereof will be omitted.

The first connector 24 is provided on the surface in the −Z direction of the recording head 2. Meanwhile, the wiring member 50 includes the flexible cable 51, and a second connector 52 provided at an end portion of the flexible cable 51 and electrically coupled to the first connector 24. The second connector 52 can be inserted into and extracted from the first connector 24 in the Z-axis direction. In other words, the direction of insertion of the wiring member 50 into the recording head 2 is the +Z direction while the direction of extraction thereof is the −Z direction. Meanwhile, as illustrated in FIG. 26, fourth through holes 53 that pass through the second connector 52 in the Z-axis direction are provided at the respective two end portions in the Y-axis direction of the second connector 52. Then, the first connector 24 is fixed to the recording head 2 by inserting second fixation members 112 in the +Z direction into the fourth through holes 53 and bringing the second fixation members 112 into engagement with fourth fixation holes 29 provided to the first connector 24. The second fixation member 112 is formed from a male screw while the fourth fixation hole 29 is formed from a female screw in which screw threads to be engaged with the second fixation member 112 are helically formed on an inner peripheral surface thereof. In other words, a direction of insertion and extraction of the second fixation member 112 to and from the fourth through hole 53 is set to the Z-axis direction.

In the above-described flow channel member 70, the displacement member 90 restricts access to the first fixation member 111 when the displacement member 90 is located at the opening position at which the displacement member 90 opens the supply channel 100 in the state attached to the recording head 2 as indicated by a dashed line in FIG. 25. In the present embodiment, the direction of insertion and extraction of the first fixation member 111 to and from the second flow channel coupling unit 40 is set to the Z-axis direction. Accordingly, when the displacement member 90 is located at the opening position, the displacement member 90 overlaps the first fixation member 111 as viewed in the Z-axis direction, thereby restricting access to the first fixation member 111. In other words, when the displacement member 90 is located at the opening position, the first fixation member 111 is located between the displacement member 90 and the second flow channel coupling unit 40 in the Z-axis direction.

On the other hand, the displacement member 90 enables access to the first fixation member 111 when the displacement member 90 is located at the closing position at which the displacement member 90 closes the supply channel 100 as indicated by a solid line in FIG. 25. In other words, when the displacement member 90 is located at the closing position, the displacement member 90 does not overlap the first fixation member 111 as viewed in the Z-axis direction, thereby enabling access to the first fixation member 111.

Meanwhile, when the displacement member 90 is located at the closing position at which the displacement member 90 closes the supply channel 100, the displacement member 90 overlaps the wiring member 50 as viewed in the Z-axis direction. In the present embodiment, when the displacement member 90 is located at the closing position, the displacement member 90 overlaps the second connector 52 as viewed in the Z-axis direction. For this reason, when the displacement member 90 is located at the closing position, the displacement member 90 restricts the movement in the −Z direction of the second connector 52, so that the second connector 52 cannot be detached from the first connector 24. Moreover, when the displacement member 90 is located in the closing position in the present embodiment, the displacement member 90 overlaps the second fixation member 112 as viewed in the Z-axis direction. For this reason, when the displacement member 90 is located at the closing position, the second fixation member 112 is not accessible and it is therefore not possible to detach the second fixation member 112. Hence, the wiring member 50 cannot be detached from the recording head 2 due to this reason as well.

A method of detaching the flow channel member 70 and the flexible cable 51 from the recording head 2 in the above-described ink jet recording apparatus 1 of the present embodiment will be described with reference to FIGS. 28 to 30. Here, FIGS. 28 to 30 are plan views for explaining the method of detaching the flow channel member 70 and the wiring member 50 from the recording head 2.

Figure 28:
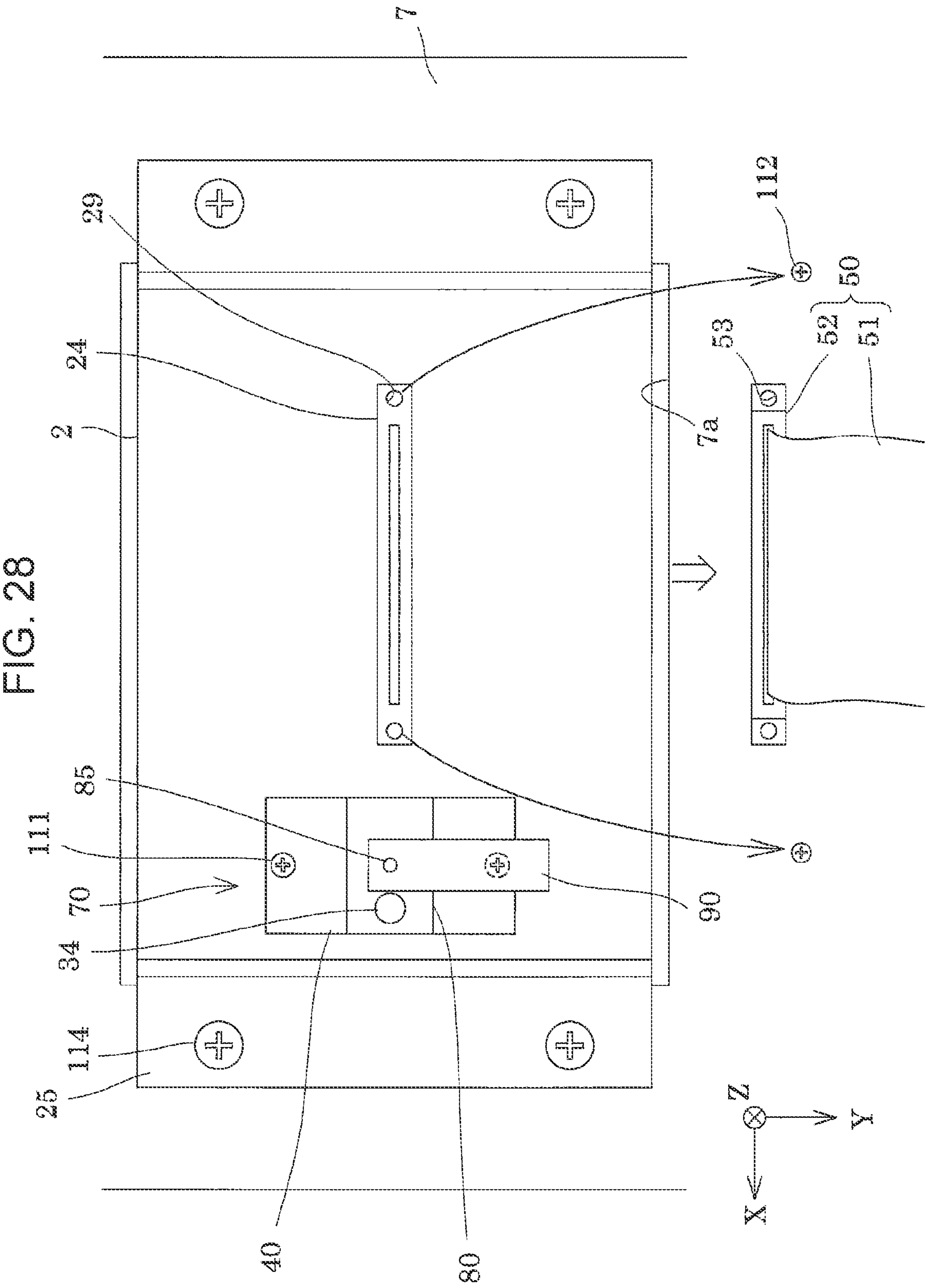
FIG. 28 is a plan view for explaining a method of detaching a flow channel member and the like according to the Embodiment 3.

First, when the displacement member 90 is located at the opening position as illustrated in FIG. 28, the displacement member 90 enables access to the second fixation members 112. Accordingly, the second fixation members 112 are moved in the −Z direction relative to the fourth through holes 53, thereby detaching the second fixation members 112 from the second flow channel coupling unit 40. Meanwhile, when the displacement member 90 is located at the opening position, the displacement member 90 does not overlap the direction of detachment of the wiring member 50 as viewed in the Z-axis direction. Hence, the second connector 52 is detached from the first connector 24 by moving the second connector 52 in the −Z direction relative to the first connector 24.

Figure 29:
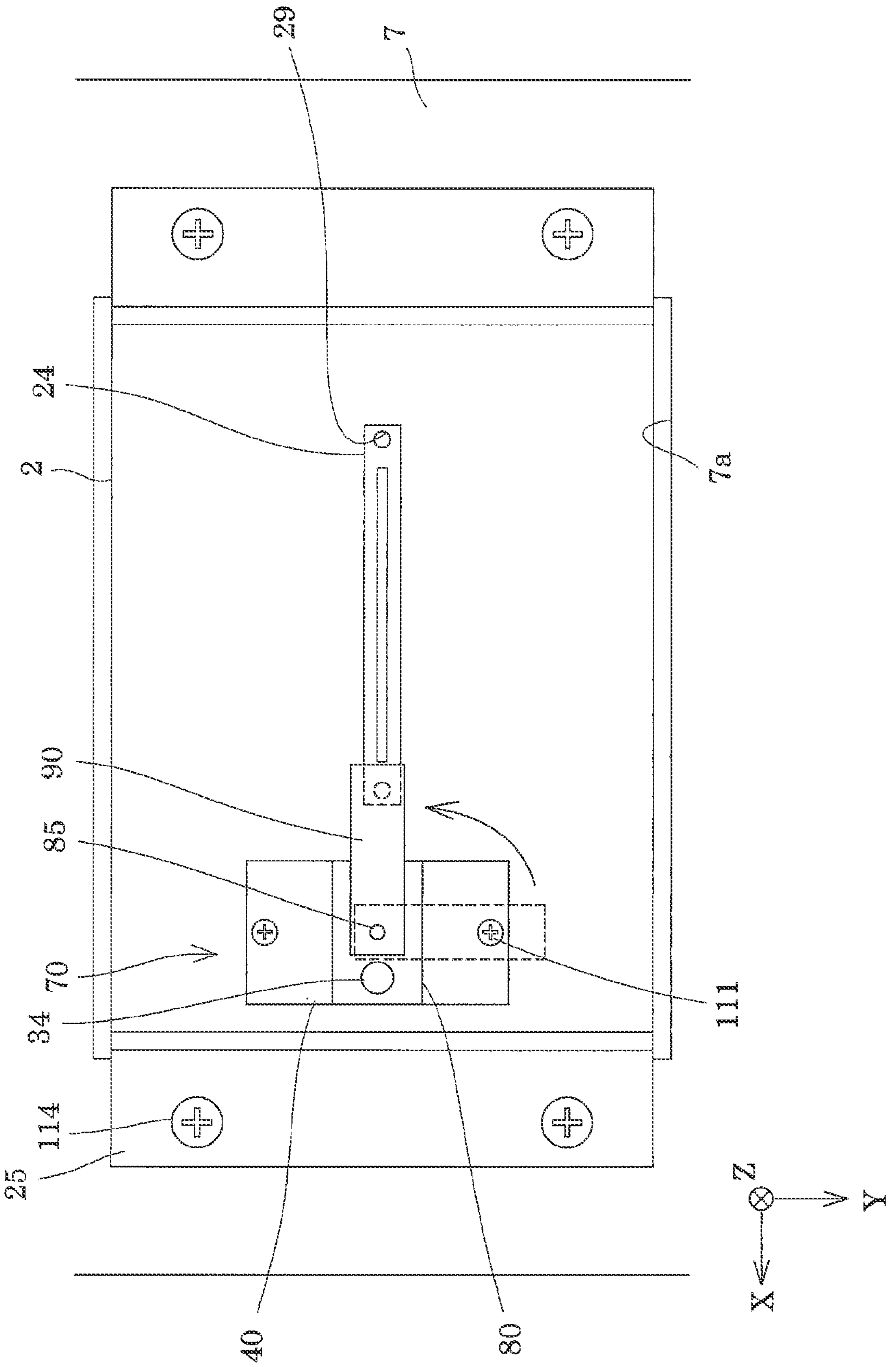
FIG. 29 is another plan view for explaining the method of detaching the flow channel member and the like according to the Embodiment 3.
Figure 30:
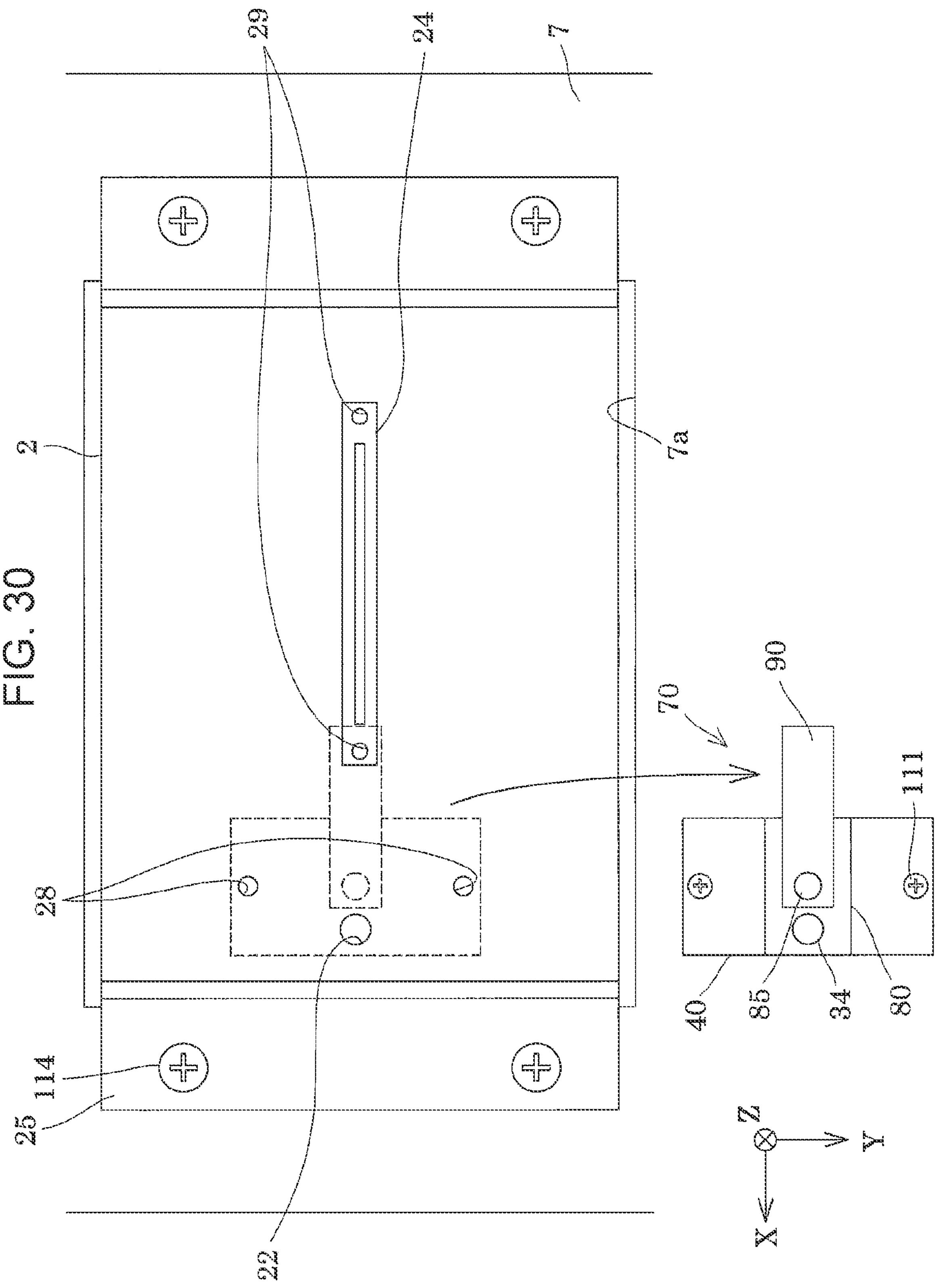
FIG. 30 is another plan view for explaining the method of detaching the flow channel member and the like according to the Embodiment 3.

Next, the displacement member 90 is moved to the closing position as illustrated in FIG. 29. In this way, the displacement member 90 does not overlap the first fixation member 111 as viewed in the Z-axis direction in the state where the supply channel 100 is closed by the valve mechanism 80. Thus, the displacement member 90 enables access to the first fixation member 111. Accordingly, the first fixation member 111 is moved in the −Z direction and is detached from the third through hole 44, and then the second flow channel coupling unit 40 is detached from the recording head 2 as illustrated in FIG. 30. In this instance, the supply channel 100 is closed by the valve mechanism 80. Accordingly, the ink inside the supply channel 100 can be kept from leaking even when the second flow channel coupling unit 40 is detached.

A method of attaching the flow channel member 70 and the wiring member 50 to the recording head 2 after detaching the flow channel member 70 and the wiring member 50 therefrom can be carried out in reverse order to the aforementioned method. Now, the method of attaching the flow channel member 70 and the wiring member 50 to the recording head 2 will also be described with reference to FIGS. 28 to 30. While FIGS. 28 to 30 illustrate arrows that represent detachment of the respective components, these arrows should be directed to opposite orientations when attaching these components. Illustration of such reverse arrows is omitted therein.

First, the flow channel member 70 is attached to the recording head 2 in the state where the displacement member 90 is located at the closing position as illustrated in FIG. 30. In this state, the second flow channel coupling unit 40 is fixed to the recording head 2 by using the first fixation member 111. When the displacement member 90 is located at the closing position, the displacement member 90 does not overlap the third through hole 44 as viewed in the Z-axis direction. Accordingly, it is possible to insert the first fixation member 111 in the +Z direction into the third through hole 44, thereby fixing the second flow channel coupling unit 40 to the recording head 2 by using the first fixation member 111.

Next, as illustrated in FIG. 29, the displacement member 90 is moved from the closing position indicated by the solid line to the opening position indicated by the dashed line. In this way, since the displacement member 90 does not block attachment of the wiring member 50, the wiring member 50 can be attached to the recording head 2 as illustrated in FIG. 28. In other words, since the wiring member 50 cannot be attached to the recording head 2 without setting the displacement member 90 to the opening position, it is possible to open the supply channel 100 just by attaching the wiring member 50 to the recording head 2. Thus, an operation of opening the supply channel 100 will not be forgotten. Consequently, it is possible to suppress the occurrence of a printing defect due to a failure to supply the ink from the second liquid storage unit 32 to the recording head 2 by forgetting to open the supply channel 100.

As described above, the ink jet recording apparatus 1 that represents an example of the liquid ejecting apparatus according to the Embodiment 3 of the present disclosure includes the recording head 2 being the liquid ejecting head to eject the ink being the liquid, and the flow channel member 70. The flow channel member 70 includes the second flow channel coupling unit 40 being the flow channel coupling member to be detachably coupled to the recording head 2, the first supply channel 34*a* being the supply channel coupled to the second supply channel 41 serving as the flow channel inside the second flow channel coupling unit 40, and the displacement member 90 being displaceable between the closing position at which the displacement member 90 closes the first supply channel 34*a* and the opening position at which the displacement member 90 opens the first supply channel 34*a*. When the displacement member 90 is located at the opening position, the displacement member 90 restricts disconnection of the coupling between the recording head 2 and the second flow channel coupling unit 40. When the displacement member 90 is located at the closing position, the displacement member 90 does not restrict disconnection of the coupling between the recording head 2 and the second flow channel coupling unit 40. Since the coupling between the recording head 2 and the second flow channel coupling unit 40 is disconnected only when the displacement member 90 is located at the closing position at which the displacement member 90 closes the first supply channel 34*a*, it is possible to suppress the disconnection of the coupling between the recording head 2 and the second flow channel coupling unit 40 in the state where the first supply channel 34*a* is open. Accordingly, the ink inside the first supply channel 34*a* can be kept from leaking when the coupling between the recording head 2 and the second flow channel coupling unit 40 is disconnected.

Meanwhile, the ink jet recording apparatus 1 of the present embodiment further includes the first fixation member 111 that fixes the second flow channel coupling unit 40 being the flow channel coupling member to the recording head 2 being the liquid ejecting head. Moreover, the displacement member 90 preferably restricts access to the first fixation member 111 when the displacement member 90 is located at the opening position, and the displacement member 90 preferably enables access to the first fixation member 111 when the displacement member 90 is located at the closing position. As described above, since the displacement member 90 restricts access to the first fixation member 111 when the displacement member 90 is located at the opening position, it is possible to suppress detachment of the second flow channel coupling unit 40 from the recording head 2 in the state where the first supply channel 34*a* is open.

In the ink jet recording apparatus 1 of the present embodiment, the first fixation member 111 can be inserted into and extracted from the second flow channel coupling unit 40 being the flow channel coupling member. Here, the displacement member 90 located at the opening position preferably overlaps the first fixation member 111 as viewed in the Z-axis direction being the direction of insertion and extraction of the first fixation member 111. This configuration makes it possible restrict access to the first fixation member 111 and to keep the first fixation member 111 from being pulled out of the second flow channel coupling unit 40 when the displacement member 90 is located at the opening position.

The ink jet recording apparatus 1 of the present embodiment further includes the wiring member 50 detachably attached to the recording head 2 being the liquid ejecting head and electrically coupled to the recording head 2. The displacement member 90 being located at the closing position preferably overlaps the wiring member 50 as viewed in the +Z direction being the direction of insertion of the wiring member 50. According to this configuration, the wiring member 50 cannot be attached to the recording head 2 unless the displacement member 90 is moved from the closing position to the opening position after the second flow channel coupling unit 40 is coupled to the recording head 2. Thus, it is possible to avoid forgetting to open the first supply channel 34*a*, thereby suppressing a printing defect due to a failure to supply the ink.

The ink jet recording apparatus 1 of the present embodiment further includes the wiring member 50 detachably coupled to the recording head 2 being the liquid ejecting head and electrically coupled to the recording head 2, and the second fixation member 112 for fixing the wiring member 50 to the recording head 2. The displacement member 90 located at the closing position preferably overlaps the second fixation member 112 as viewed in the +Z direction being the direction of insertion of the wiring member 50. Since the second fixation member 112 cannot be attached unless the displacement member 90 is set to the opening position, it is possible to avoid forgetting to open the first supply channel 34*a*.

Figure 31:
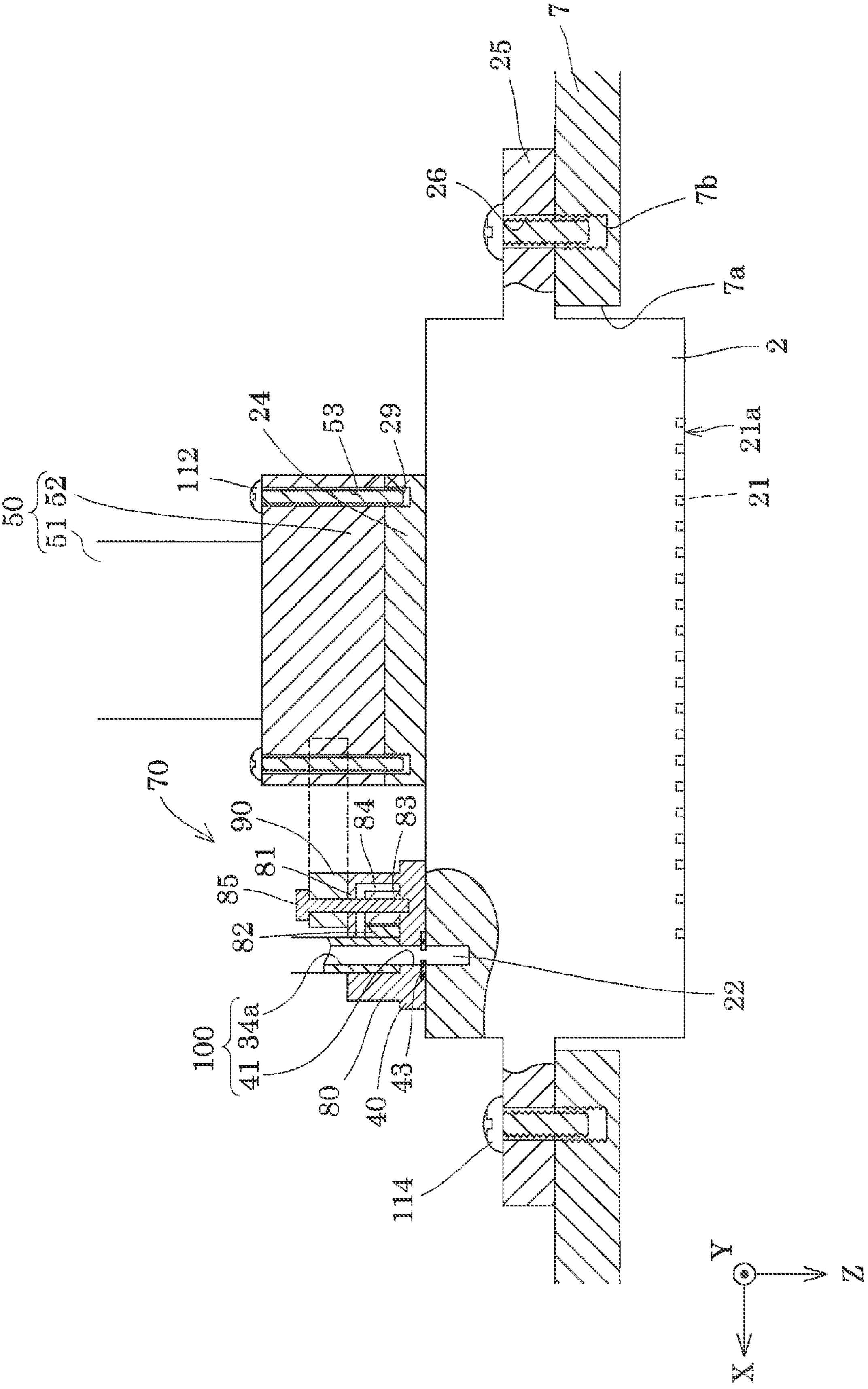
FIG. 31 is a cross-sectional view of a substantial part of a modified example of the recording apparatus according to the Embodiment 3.

In the present embodiment, the displacement member 90 is configured to overlap the second connector 52 of the wiring member 50 and to overlap the second fixation member 112 as viewed in the +Z direction when the displacement member 90 is located at the closing position. However, the present disclosure is not limited to this configuration. FIG. 31 is a cross-sectional view of a substantial part illustrating a modified example of the second connector 52 according to the present embodiment. Note that FIG. 31 indicates the opening position with a solid line and indicates the closing position with a dashed line.

As illustrated in FIG. 31, the closing position of the displacement member 90 indicated by the dashed line abuts on the second connector 52 that is attached to the first connector 24. That is, the second connector 52 restricts the displacement of the displacement member 90 from the opening position to the closing position. In other words, when the displacement member 90 is located at the closing position, the displacement member 90 blocks attachment of the second connector 52 to the recording head 2. Accordingly, when attaching the second flow channel coupling unit 40 and the wiring member 50 to the recording head 2 in this order, the wiring member 50 cannot be attached to the recording head 2 without displacing the displacement member 90 to the opening position. Thus, the occurrence of a printing defect due to keeping the supply channel 100 closed can be prevented more reliably. On the other hand, when the second flow channel coupling unit 40 and the wiring member 50 are detached from the recording head 2, the displacement member 90 cannot be moved to the closing position unless the wiring member 50 is detached from the recording head 2 in advance, so that the second flow channel coupling unit 40 cannot be detached from the recording head 2 while closing the supply channel 100. Consequently, it is possible to detach the wiring member 50 and the second flow channel coupling unit 40 from the recording head 2 in the right order and to attach the wiring member 50 and the second flow channel coupling unit 40 thereto in the right order. Note that the second fixation members 112 may be omitted in the example illustrated in FIG. 31.

As described above, the ink jet recording apparatus 1 illustrated in FIG. 31 further includes the wiring member 50, which is detachably attached to the recording head 2 being the liquid ejecting head and electrically coupled to the recording head 2. Moreover, the wiring member 50 in the state of being coupled to the recording head 2 restricts the displacement of the displacement member 90 from the opening position to the closing position. According to the above-described configuration, when the flow channel member 70 and the wiring member 50 are attached to the recording head 2 in this order, the wiring member 50 cannot be attached to the recording head 2 unless the displacement member 90 is displaced to the opening position. Thus, the occurrence of a printing defect due to keeping the supply channel 100 closed can be prevented more reliably. On the other hand, when the flow channel member 70 and the wiring member 50 are detached from the recording head 2, it is not possible to close the supply channel 100 and to detach the flow channel member 70 from the recording head 2 unless the wiring member 50 is detached from the recording head 2 in advance. Consequently, it is possible to detach the wiring member 50 and the flow channel member 70 from the recording head 2 in the right order.

OTHER EMBODIMENTS

Although certain embodiments of the present disclosure have been described above, basic configurations of the present disclosure are not limited to the above-described embodiments.

For example, in the above-described embodiments, the valve mechanism and the displacement member are provided on the recording head side of the supply channel.

Figure 32:
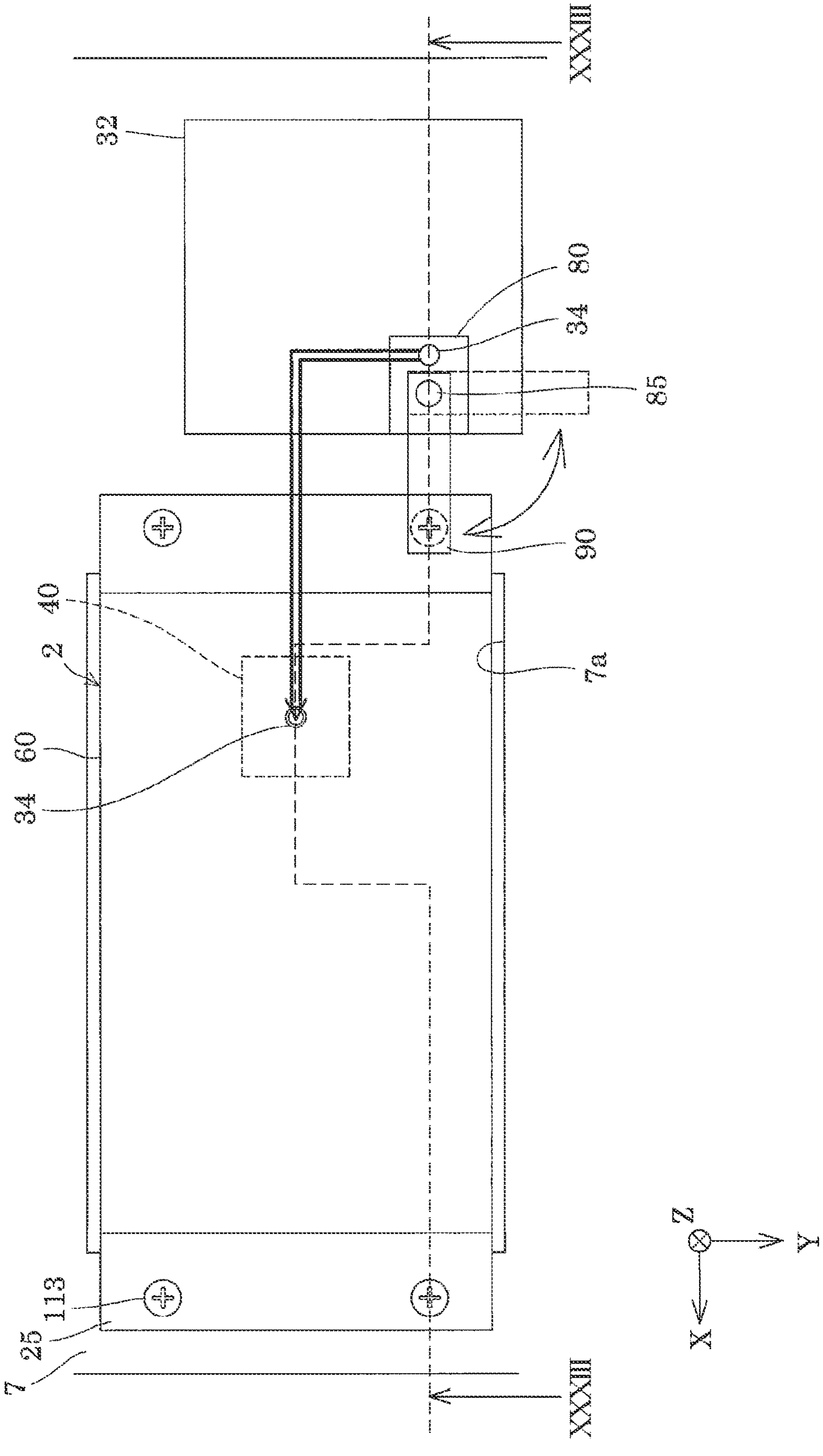
FIG. 32 is a plan view of a modified example of the recording apparatus.
Figure 33:
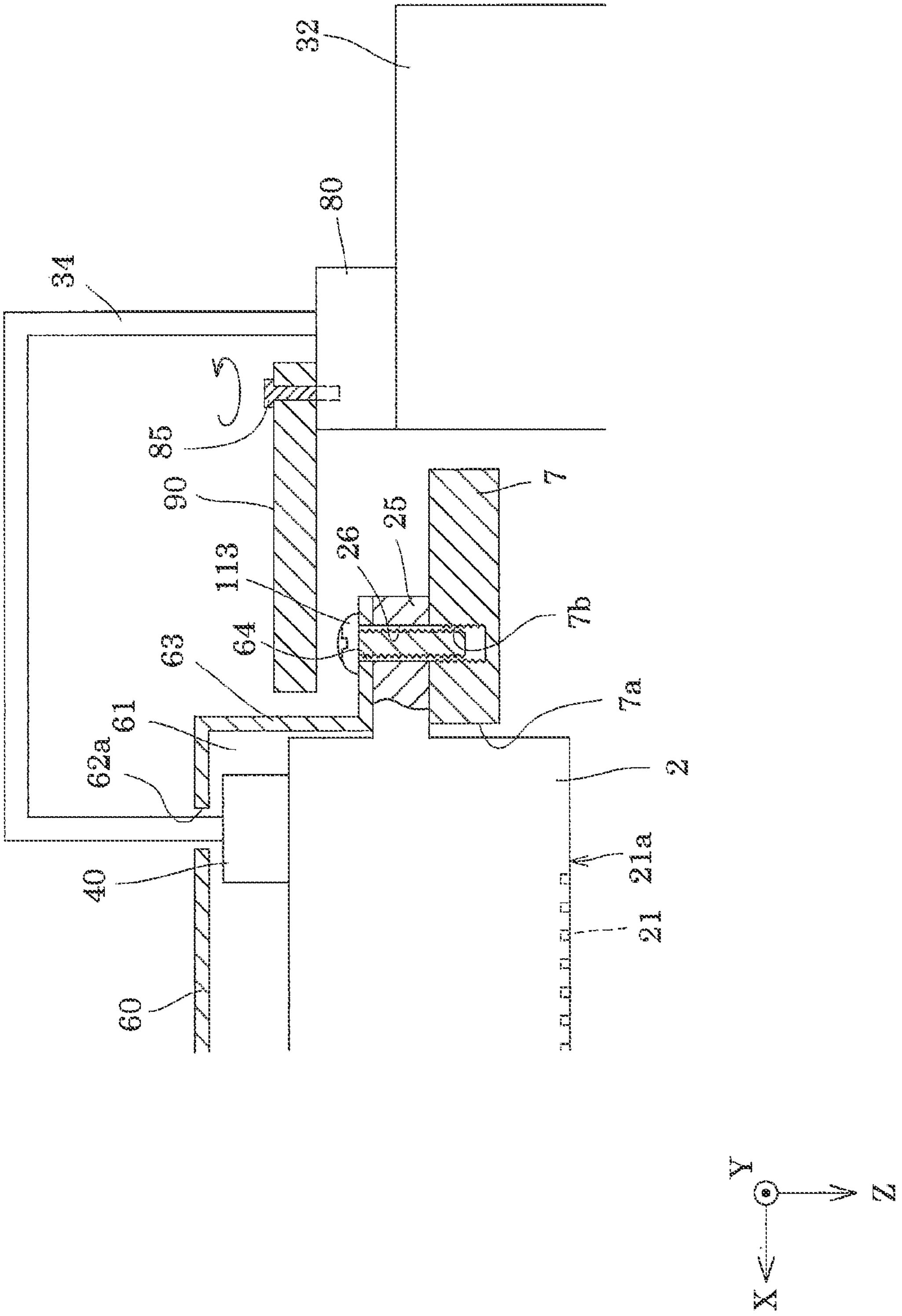
FIG. 33 is a cross-sectional view of the modified example of the recording apparatus.

Instead, the valve mechanism and the displacement member may be provided in the middle of the supply channel, on the second liquid storage unit side, and the like. FIG. 32 is a plan view for explaining a modified example of the ink jet recording apparatus 1, which is viewed in the +Z direction. FIG. 33 is a cross-sectional view of the substantial part taken along line XXXIII-XXXIII in FIG. 32. Note that the same constituents as those described in the embodiments will be denoted by the same reference signs and overlapping explanations thereof will be omitted.

As illustrated in FIGS. 32 and 33, the ink jet recording apparatus 1 includes the second liquid storage unit 32, the recording head 2, the cover member 60, and the flow channel member 70. The flow channel member 70 includes the supply pipe 34 provided with the first supply channel 34*a* inside, and the second flow channel coupling unit 40 provided at the tip end of the supply pipe 34 and capable of attaching to and detaching from the recording head 2. The cover member 60 is provided with the first opening 62*a* that enables insertion of the supply pipe 34. The first opening 62*a* has such a size that blocks insertion of the second flow channel coupling unit 40.

Meanwhile, the valve mechanism 80 and the displacement member 90 which are similar to those described in the Embodiment 1 are provided on the second liquid storage unit 32 side of the supply pipe 34. The internal structure of the valve mechanism 80 is the same as that in the Embodiment 1 and overlapping explanations thereof will be omitted.

The displacement member 90 can be displaced between the opening position indicated by a solid line and the closing position indicated by a dashed line in FIG. 32. In the present embodiment, the displacement member 90 is pivotally rotatable around the shaft portion 85 as with the above-described Embodiment 1.

When the displacement member 90 is located at the opening position indicated by the solid line, the displacement member 90 overlaps the cover member 60 as viewed in the Z-axis direction and restricts movement of the cover member 60 in the −Z direction relative to the recording head 2. In other words, when the displacement member 90 is located at the opening position, the displacement member 90 restricts detachment of the cover member 60 from the recording head 2, thereby restricting detachment of the second flow channel coupling unit 40 from the recording head 2. Meanwhile, in the example illustrated in FIGS. 32 and 33, when the displacement member 90 is located at the opening position, the displacement member 90 overlaps the third fixation member 113 as viewed in the Z-axis direction, the third fixation member 113 being configured to fix the cover member 60 to the support member 7 together with the recording head 2. Accordingly, when the displacement member 90 is located at the opening position, the displacement member 90 restricts access to the third fixation member 113, thereby restricting detachment of the third fixation member 113 from the cover member 60.

When the displacement member 90 is located at the closing position indicated by the dashed line, the displacement member 90 does not overlap the cover member 60 as viewed in the Z-axis direction, thereby enabling the movement of the cover member 60 in the −Z direction relative to the recording head 2. In other words, when the displacement member 90 is located at the closing position, the displacement member 90 enables detachment of the cover member 60 from the recording head 2, thereby enabling detachment of the second flow channel coupling unit 40 from the recording head 2.

Moreover, in the example illustrated in FIGS. 32 and 33, when the displacement member 90 is located at the closing position, the displacement member 90 enables access to the third fixation member 113, so that the third fixation member 113 can be detached from the cover member 60. Accordingly, the second flow channel coupling unit 40 can be detached from the recording head 2 only when the displacement member 90 is located at the closing position. Consequently, it is possible to reliably close the supply channel 100 when detaching the second flow channel coupling unit 40 from the recording head 2, and to keep the ink inside the supply channel 100 from leaking.

As described above, the same effects as those of the above-described embodiments can also be obtained by providing the displacement member 90 to a portion other than the recording head 2 side of the supply channel 100. Although the flexible cable 51 and the wiring member 50 are not illustrated in FIGS. 32 and 33, the flexible cable 51 and the wiring member 50 may be provided as with the above-described Embodiments 1 to 3.

The flexible cable 51 and the wiring member 50 need not be provided in any of the above-described Embodiments 1 to 3.

Figure 34:
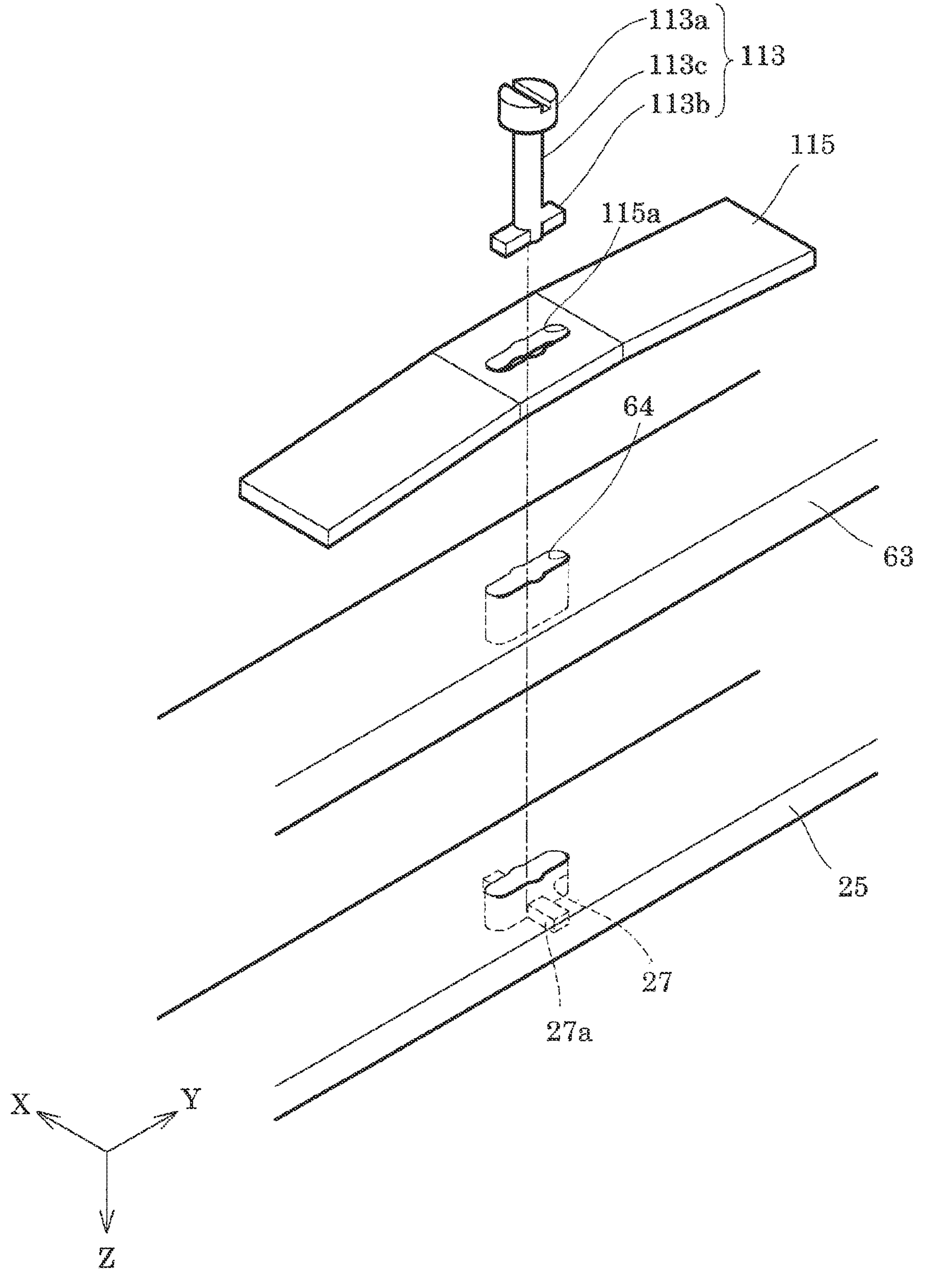
FIG. 34 is an exploded perspective view of a modified example of a third fixation member.
Figure 35:
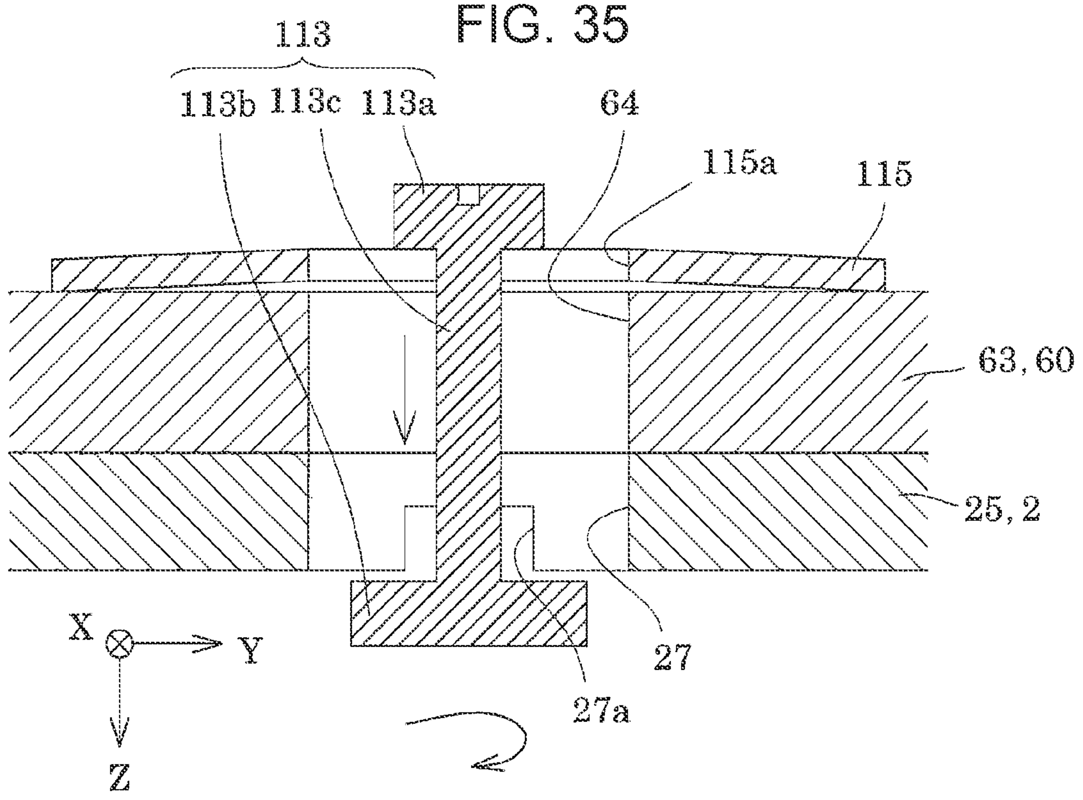
FIG. 35 is a cross-sectional view of the modified example of the third fixation member.
Figure 36:
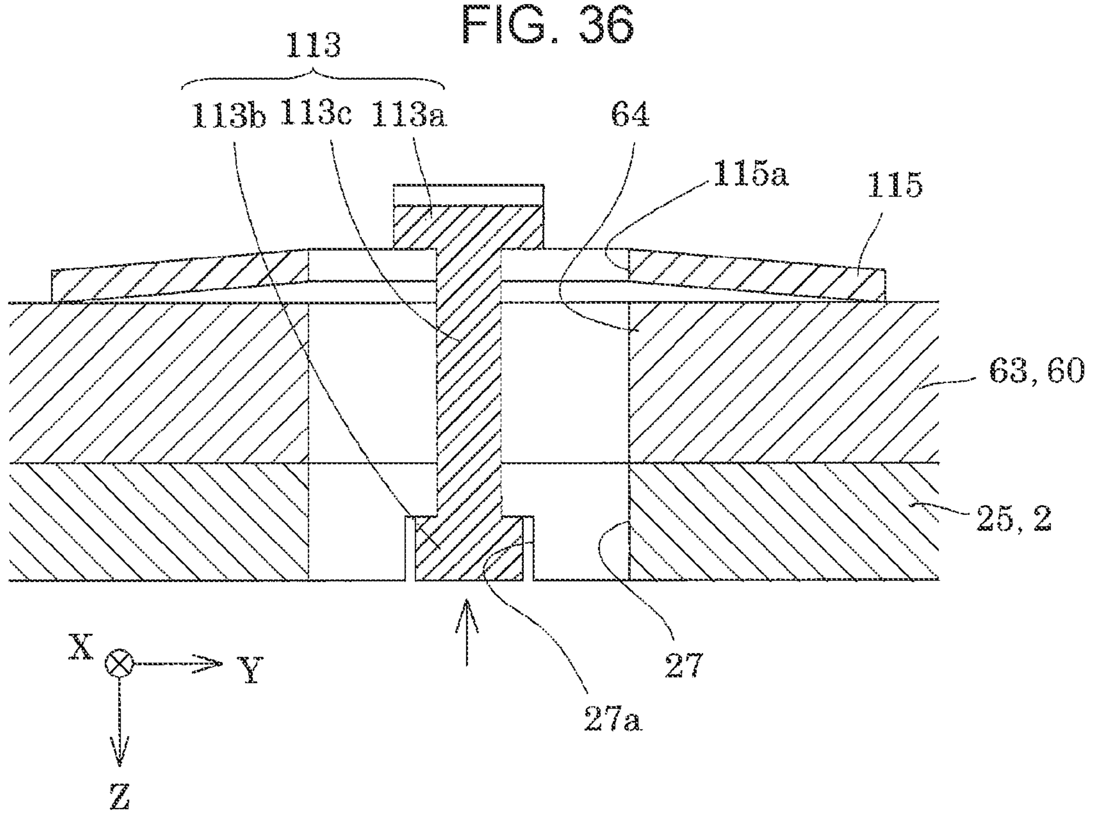
FIG. 36 is another cross-sectional view of the modified example of the third fixation member.

Meanwhile, the first to fourth fixation 111 to 114 are formed from male screws in the above-described embodiments. However, the present disclosure is not limited to this configuration. Now, a modified example of the third fixation member 113 for fixing the cover member 60 to the support member 7 will be described with reference to FIGS. 34 to 36. FIG. 34 is an exploded perspective view illustrating the third fixation member 113, the second flange portion 63, and the first flange unit 25. FIGS. 35 and 36 are cross-sectional views of the third fixation member 113, the second flange portion 63, and the first flange unit 25.

As illustrated in FIGS. 34 to 36, the third fixation member 113 includes a head portion 113*a*, an engaging portion 113*b*, and a shaft portion 113*c*. The shaft portion 113*c* connects the head portion 113*a* to the engaging portion 113*b*. A shape of the head portion 113*a* is almost a columnar shape. Instead, the head portion 113*a* may be of a prism shape, for example. On the other hand, the shaft portion 113*c* is an elongated portion. The engaging portion 113*b* is another elongated portion. A length in a longitudinal direction of the engaging portion 113*b* is larger than a diameter of the shaft portion 113*c*.

The head portion 113*a* is a portion that comes into contact with an elastic member 115. The head portion 113*a* functions as a manipulating portion for rotating the third fixation member 113 in the XY plane when fixing the cover member 60 to the recording head 2. Meanwhile, the engaging portion 113*b* is a portion to be engaged with the first flange unit 25. The elastic member 115 is an elastic spring member. Provision of the elastic member 115 can improve fixation stability when fixing the cover member 60 to the recording head 2 or when using the recording head 2 compared with a case without provision of the elastic member 115.

The elastic member 115 is n flat elongated plate-shaped leaf spring. A portion of the elastic member 115 is bent. The elastic member 115 is in contact with the head portion 113*a* of the third fixation member 113 in the state where the cover member 60 is fixed to the recording head 2 by using the third fixation member 113.

Moreover, the elastic member 115 includes a fifth through hole 115*a* that enables insertion of the shaft portion 113*c*. The fifth through hole 115*a* is formed into a long hole being elongated in the Y-axis direction, which enables insertion of the engaging portion 113*b* and the shaft portion 113*c* as viewed in the Z-axis direction.

The second flange portion 63 of the cover member 60 includes the second through hole 64 that communicates with the fifth through hole 115*a*. The second through hole 64 is formed into a long hole being elongated in the Y-axis direction, which enables insertion of the engaging portion 113*b* and the shaft portion 113*c* of the third fixation member 113 as viewed in the Z-axis direction.

The first flange unit 25 of the recording head 2 includes the second fixation hole 27 that communicates with the second through hole 64. The second fixation hole 27 is formed into a long hole which is elongated in the Y-axis direction, which enables insertion of the engaging portion 113*b* and the shaft portion 113*c* of the third fixation member 113 as viewed in the Z-axis direction. Moreover, the first flange unit 25 includes a groove portion 27*a*, which communicates with the second fixation hole 27 and is open on a surface in the +Z direction. The groove portion 27*a* is formed into a long hole which is elongated in the X-axis direction as viewed in the Z-axis direction. A length in the X-axis direction of this groove portion 27*a* is slightly larger than the length in the longitudinal direction of the engaging portion 113*b*. Accordingly, the engaging portion 113*b* can be inserted in the −Z direction into the groove portion 27*a*.

By inserting the above-described third fixation member 113 into the fifth through hole 115*a* of the elastic member 115, the second through hole 64 provided in the second flange portion 63 of the cover member 60, and the second fixation hole 27 of the first flange unit 25 of the recording head 2 in this order in the +Z direction as illustrated in FIG. 35, and then pressing the elastic member 115 in the +Z direction by using the head portion 113*a*. Thus, the elastic member 115 is elastically deformed until the engaging portion 113*b* is located in the +Z direction relative to the groove portion 27*a*. In this state, the third fixation member 113 is rotated in the XY plane by manipulating the head portion 113*a* until the longitudinal direction of the engaging portion 113*b* coincides with the X-axis direction.

Then, by releasing the pressure in the +Z direction of the third fixation member 113, the head portion 113*a* is moved in the −Z direction by using the elastic member 115, and then the movement in the −Z direction of the third fixation member 113 is regulated Consequently of inserting the engaging portion 113*b* into the groove portion 27*a* as illustrated in FIG. 36. In other words, the cover member 60 is fixed to the recording head 2 by using the third fixation member 113.

The above-described third fixation member 113 can also exert the same effects as those of the above-described Embodiments 1 to 3. While the modified example of the third fixation member 113 has been described with reference to FIGS. 34 to 36, it is also possible to apply the same structure as the third fixation member 113 to the rest, namely, the first fixation member 111, the second fixation member 112, and the fourth fixation member 114.

Meanwhile, the above-described embodiments have exemplified the configuration in which the displacement member 90 is rotated around the shaft portion 85 between the closing position and the opening position. However, the present disclosure is not limited to this configuration. The displacement member 90 may be configured to slide in the longitudinal direction between the closing position and the opening position. Meanwhile, the valve mechanism 80 may apply any of general valves including a ball valve, a globe valve, a diaphragm valve, and the like. The displacement member 90 may be configured to close the first supply channel 34*a* by bending the supply pipe 34 with the displacement of the displacement member 90. The structure of the displacement member 90 is not limited to a particular structure.

The above-described ink jet recording apparatus 1 has exemplified the recording head 2 mounted on the support member 7 and configured to move in the main scanning direction. However, the present disclosure is not limited to this configuration. For example, the present disclosure is also applicable to a so-called line-type recording apparatus configured to fix the recording head 2 and to perform printing just by moving the medium S such as paper in a vertical scanning direction.

Furthermore, the present disclosure is targeted to a broad range of liquid ejecting apparatuses each including a liquid ejecting head. For example, the present disclosure is also applicable to liquid ejecting apparatuses provided with recording heads including various types of ink jet recording heads used in image recording apparatuses such as printers, a coloring material ejecting head used for manufacturing color filters for liquid crystal display units and the like, an electrode material ejecting head for forming electrodes of organic EL display units, field emission display (FED) units, and the like, a bioorganic substance ejecting head used for manufacturing biochips, and so forth.

What is claimed is:

1. A liquid ejecting apparatus comprising:

a liquid ejecting head configured to eject a liquid; and a flow channel member including a flow channel coupling member detachably mounted to a surface of the liquid ejecting head, a supply channel coupled to a flow channel inside the flow channel coupling member, and a displacement member configured to be displaced between a closing position at which the displacement member closes the supply channel and an opening position at which the displacement member opens the supply channel, wherein the displacement member restricts the flow channel coupling member being unmounted from the surface of the liquid ejecting head when the displacement member is located at the opening position, and the displacement member does not restrict the flow channel coupling member being unmounted from the surface of the liquid ejecting head when the displacement member is located at the closing position.

2. The liquid ejecting apparatus according to claim 1, further comprising:

a first fixation member that fixes the flow channel coupling member to the liquid ejecting head, wherein the displacement member restricts access to the first fixation member when the displacement member is located at the opening position, and the displacement member enables access to the first fixation member when the displacement member is located at the closing position.

3. The liquid ejecting apparatus according to claim 2, wherein the first fixation member is configured to be inserted into and extracted from the flow channel coupling member, and the displacement member overlaps the first fixation member as viewed in a direction of insertion and extraction of the first fixation member when the displacement member is located at the opening position.

4. The liquid ejecting apparatus according to claim 2, further comprising:

a wiring member detachably attached to the liquid ejecting head and electrically coupled to the liquid ejecting head, wherein the displacement member overlaps the wiring member as viewed in a direction of insertion of the wiring member when the displacement member is located at the closing position.

5. The liquid ejecting apparatus according to claim 2, further comprising:

a wiring member detachably attached to the liquid ejecting head and electrically coupled to the liquid ejecting head; and a second fixation member that fixes the wiring member to the liquid ejecting head, wherein the displacement member overlaps the second fixation member as viewed in a direction of insertion of the wiring member when the displacement member is located at the closing position.

6. The liquid ejecting apparatus according to claim 2, further comprising:

a wiring member detachably attached to the liquid ejecting head and electrically coupled to the liquid ejecting head, wherein the wiring member in a state of being coupled to the liquid ejecting head restricts displacement of the displacement member from the opening position to the closing position.

7. The liquid ejecting apparatus according to claim 1, further comprising:

a cover member configured to define a housing space in which the flow channel coupling member is housed between the liquid ejecting head and the cover member, wherein the displacement member is provided outside of the housing space, the displacement member restricts movement of the cover member when the displacement member is located at the opening position, and the displacement member enables movement of the cover member when the displacement member is located at the closing position.

8. The liquid ejecting apparatus according to claim 7, wherein the cover member includes an opening configured to pass the displacement member therethrough, wherein the displacement member overlaps the cover member as viewed in a direction of insertion and extraction of the flow channel coupling member when the displacement member is located at the opening position, and the displacement member is located within an inner periphery of the opening of the cover member as viewed in the direction of insertion and extraction of the flow channel coupling member when the displacement member is located at the closing position.

9. The liquid ejecting apparatus according to claim 8, further comprising:

a wiring member detachably attached to the liquid ejecting head and electrically coupled to the liquid ejecting head, wherein the liquid ejecting head includes a connector disposed in the housing space and electrically coupled to the wiring member, the connector is exposed to outside of the cover member through the opening of the cover member, and the displacement member overlaps the connector as viewed in a direction of insertion of the wiring member when the displacement member is located at the closing position.

10. The liquid ejecting apparatus according to claim 7, further comprising:

a support member that supports the liquid ejecting head; and a third fixation member that fixes the liquid ejecting head and the cover member to the support member such that the liquid ejecting head is interposed between the cover member and the support member.

11. The liquid ejecting apparatus according to claim 1, further comprising:

a cover member configured to define a housing space in which the flow channel coupling member is housed between the liquid ejecting head and the cover member;

a support member that supports the liquid ejecting head; and a third fixation member that fixes the cover member to at least one of the liquid ejecting head and the support member, wherein the displacement member is provided outside of the housing space, the displacement member restricts access to the third fixation member when the displacement member is located at the opening position, and the displacement member enables access to the third fixation member when the displacement member is located at the closing position.

12. The liquid ejecting apparatus according to claim 11, wherein the third fixation member is configured to be inserted into and extracted from a hole formed in the cover member, and the displacement member overlaps the third fixation member as viewed in a direction of insertion of the third fixation member when the displacement member is located at the opening position.

13. The liquid ejecting apparatus according to claim 11, further comprising:

a wiring member detachably attached to the liquid ejecting head and electrically coupled to the liquid ejecting head, wherein the liquid ejecting head includes a connector disposed in the housing space and electrically coupled to the wiring member, the supply channel is a flow channel formed inside a flexible tube, and the cover member includes a first opening into which the tube is press fitted, a second opening into which the wiring member is inserted, and a flexible sealing member that seals a gap between an inner periphery of the second opening and an outer periphery of the wiring member.

14. The liquid ejecting apparatus according to claim 11, wherein the third fixation member fixes the liquid ejecting head and the cover member to the support member such that the liquid ejecting head is interposed between the cover member and the support member.

* * * * *